(12) United States Patent
Hoogendoorn et al.

(10) Patent No.: US 11,485,447 B2
(45) Date of Patent: Nov. 1, 2022

(54) RECIPROCATING RAIL MOVEMENT SUSPENSION SYSTEM

(71) Applicant: YETI CYCLING, LLC, Golden, CO (US)

(72) Inventors: Steven W. Hoogendoorn, Evergreen, CO (US); Peter Zawistowski, Lakewood, CO (US)

(73) Assignee: YETI CYCLING, LLC, Golden, CO (US)

( * ) Notice: Subject to any disclaimer, the term of this patent is extended or adjusted under 35 U.S.C. 154(b) by 0 days.

(21) Appl. No.: 17/068,424

(22) Filed: Oct. 12, 2020

(65) Prior Publication Data

US 2021/0024169 A1 Jan. 28, 2021

Related U.S. Application Data

(63) Continuation of application No. 15/818,455, filed on Nov. 20, 2017, now Pat. No. 10,822,048, which is a continuation of application No. 14/385,480, filed as application No. PCT/US2012/066427 on Nov. 21, 2012, now Pat. No. 9,821,879, which is a
(Continued)

(51) Int. Cl.
*B62K 25/28* (2006.01)
*B62K 25/30* (2006.01)
*B62K 3/02* (2006.01)

(52) U.S. Cl.
CPC ............ *B62K 25/28* (2013.01); *B62K 25/286* (2013.01); *B62K 25/30* (2013.01); *B62K 3/02* (2013.01)

(58) Field of Classification Search
CPC ............................. B62K 25/28; B62K 25/286
See application file for complete search history.

(56) References Cited

U.S. PATENT DOCUMENTS

| 421,748 A | 2/1890 | McErlain |
| 519,855 A | 5/1894 | Whitaker |
| 591,306 A | 10/1897 | Tolson |

(Continued)

FOREIGN PATENT DOCUMENTS

| CA | 2293366 A1 | 12/1998 |
| CA | 2980086 A1 | 6/2005 |

(Continued)

OTHER PUBLICATIONS

Author Unknown, "Sarrus Linkage", Wikipedia, http://en.wikipedia.org/wiki/Sarrus_linkage, 1 page, at least as early as Aug. 20, 2010.
(Continued)

*Primary Examiner* — Kevin Hurley
(74) *Attorney, Agent, or Firm* — Dorsey & Whitney LLP

(57) ABSTRACT

Generally, examples described herein may take the form of a bicycle including a front frame, a rear frame operably associated with the front frame and configured for coupling to a rear wheel, and a suspension system operably associated with the front frame and the rear frame. The suspension system includes a first connection structure operably coupling the front frame to the rear frame and a first sliding body pivotally coupled to the rear frame and configured to travel in a first direction along a substantially linear travel path and in a second direction opposite the first direction along the substantially linear travel path as the suspension system is compressed.

23 Claims, 49 Drawing Sheets

Related U.S. Application Data continuation-in-part of application No. 13/215,170, filed on Aug. 22, 2011, now Pat. No. 9,102,378.

(60) Provisional application No. 61/635,800, filed on Apr. 19, 2012, provisional application No. 61/609,927, filed on Mar. 12, 2012, provisional application No. 61/563,292, filed on Nov. 23, 2011, provisional application No. 61/375,278, filed on Aug. 20, 2010.

(56) References Cited

U.S. PATENT DOCUMENTS

| | | |
|---|---|---|
| 630,232 A | 8/1899 | Hughes et al. |
| 712,784 A | 11/1902 | Ellis |
| 724,871 A | 4/1903 | Hunter |
| 944,795 A | 12/1909 | Leet et al. |
| 1,043,269 A | 11/1912 | Stephenson |
| 1,068,583 A | 7/1913 | Harley |
| 1,168,702 A | 1/1916 | Babis, Jr. |
| 1,220,606 A | 3/1917 | Chelstrom |
| 1,261,440 A | 4/1918 | Rigby |
| 1,283,030 A | 10/1918 | Ashton |
| 1,369,356 A | 2/1921 | Rigby |
| 2,173,520 A | 9/1939 | Klatt |
| 3,803,933 A | 4/1974 | Huret et al. |
| 3,813,955 A | 6/1974 | Huret et al. |
| 3,847,028 A | 11/1974 | Bergles |
| 3,917,313 A | 11/1975 | Smith et al. |
| 3,977,697 A | 8/1976 | MacPike et al. |
| 4,058,181 A | 11/1977 | Buell |
| 4,076,271 A | 2/1978 | Doncque |
| 4,114,918 A | 9/1978 | Lutz |
| 4,241,617 A | 12/1980 | Fujimoto et al. |
| 4,265,329 A | 5/1981 | de Cortanze |
| 4,279,172 A | 7/1981 | Nagano et al. |
| 4,322,088 A | 3/1982 | Miyakoshi et al. |
| 4,360,214 A | 11/1982 | Isono |
| 4,408,674 A | 10/1983 | Boyesen |
| 4,410,196 A | 10/1983 | Ribi |
| 4,415,057 A | 11/1983 | Yamaguchi |
| 4,429,760 A | 2/1984 | Koizumi et al. |
| 4,433,747 A | 2/1984 | Offenstadt |
| 4,463,824 A | 8/1984 | Boyesen |
| 4,463,964 A | 8/1984 | Takayanagi et al. |
| 4,485,885 A | 12/1984 | Fukuchi |
| 4,500,302 A | 2/1985 | Crepin |
| 4,506,755 A | 3/1985 | Tsuchida et al. |
| 4,540,193 A | 9/1985 | Noda et al. |
| 4,544,044 A | 10/1985 | Boyesen |
| RE32,059 E | 12/1985 | Nagano |
| 4,558,761 A | 12/1985 | Boyesen |
| 4,561,519 A | 12/1985 | Omori |
| 4,574,909 A | 3/1986 | Ribi |
| 4,582,343 A | 4/1986 | Waugh |
| 4,586,913 A | 5/1986 | Nagano |
| 4,596,302 A | 6/1986 | Suzuki et al. |
| 4,619,633 A | 10/1986 | Nagano |
| 4,621,706 A | 11/1986 | Boyesen |
| 4,671,525 A | 6/1987 | Ribi |
| 4,673,053 A | 6/1987 | Tanaka et al. |
| 4,679,811 A | 7/1987 | Shuler |
| 4,702,338 A | 10/1987 | Trema |
| 4,735,277 A | 4/1988 | Prince |
| 4,744,434 A | 5/1988 | Miyakoshi et al. |
| 4,789,042 A | 12/1988 | Pitts |
| 4,789,174 A | 12/1988 | Lawwill |
| RE32,924 E | 5/1989 | Nagano |
| 4,830,391 A | 5/1989 | Silk |
| 4,878,884 A | 11/1989 | Romano |
| 4,951,791 A | 8/1990 | Belil Creixelli |
| 5,011,459 A | 4/1991 | Van De Vel |
| 5,121,937 A | 6/1992 | Lawwill |
| 5,205,572 A | 4/1993 | Buell et al. |
| 5,226,674 A | 7/1993 | Buell et al. |
| 5,244,224 A | 9/1993 | Busby |
| 5,259,637 A | 11/1993 | Busby |
| 5,282,517 A | 2/1994 | Prince |
| 5,295,702 A | 3/1994 | Buell |
| 5,299,820 A | 4/1994 | Lawwill |
| 5,306,036 A | 4/1994 | Busby |
| 5,332,246 A | 7/1994 | Buell |
| 5,335,929 A | 8/1994 | Takagaki et al. |
| 5,354,085 A | 10/1994 | Gaily |
| 5,356,165 A | 10/1994 | Kulhawik et al. |
| 5,360,078 A | 11/1994 | Rifenburg et al. |
| 5,370,411 A | 12/1994 | Takamiya et al. |
| 5,409,248 A | 4/1995 | Williams |
| 5,409,249 A | 4/1995 | Busby |
| 5,417,445 A | 5/1995 | Smart |
| 5,429,380 A | 7/1995 | Lawwill |
| 5,435,584 A | 7/1995 | Buell |
| 5,441,292 A | 8/1995 | Busby |
| 5,452,910 A | 9/1995 | Harris |
| 5,474,318 A | 12/1995 | Castellano |
| 5,498,013 A | 3/1996 | Hwang |
| 5,509,679 A | 4/1996 | Leitner |
| 5,553,881 A | 9/1996 | Klassen et al. |
| 5,570,896 A | 11/1996 | Collins |
| 5,597,366 A | 1/1997 | Ozaki |
| 5,607,367 A | 3/1997 | Patterson |
| 5,611,557 A | 3/1997 | Farris et al. |
| 5,628,524 A | 5/1997 | Klassen et al. |
| 5,658,001 A | 8/1997 | Blanchard |
| 5,678,837 A | 10/1997 | Leitner |
| 5,688,200 A | 11/1997 | White |
| 5,772,228 A | 6/1998 | Owyang |
| 5,791,674 A | 8/1998 | D'Aluisio et al. |
| 5,816,966 A | 10/1998 | Yang et al. |
| 5,826,899 A | 10/1998 | Klein et al. |
| 5,899,480 A | 5/1999 | Leitner |
| 5,957,473 A | 9/1999 | Lawwill |
| 6,012,999 A | 1/2000 | Patterson |
| 6,076,845 A | 6/2000 | Lawwill et al. |
| 6,086,080 A | 7/2000 | Scheffer |
| 6,102,421 A | 8/2000 | Lawwill et al. |
| 6,131,934 A | 10/2000 | Sinclair |
| 6,206,397 B1 | 3/2001 | Klassen et al. |
| 6,244,610 B1 | 6/2001 | Kramer-Massow |
| 6,439,593 B1 | 8/2002 | Tseng |
| 6,450,520 B1 | 9/2002 | Girard |
| 6,488,301 B2 | 12/2002 | Klassen et al. |
| 6,543,799 B2 | 4/2003 | Miyoshi |
| 6,629,903 B1 | 10/2003 | Kondo |
| 6,712,374 B2 | 3/2004 | Assier |
| 6,793,230 B1 | 9/2004 | Cheng |
| 6,843,494 B2 | 1/2005 | Lam |
| 6,845,998 B2 | 1/2005 | Probst |
| 6,871,867 B2 | 3/2005 | Parigian |
| 6,877,591 B1 | 4/2005 | Hso |
| 6,886,846 B2 | 5/2005 | Carroll |
| 6,902,504 B2 | 6/2005 | Fukuda |
| 6,926,298 B2 | 8/2005 | Ellsworth et al. |
| 6,955,373 B2 | 10/2005 | Chang |
| 6,969,081 B2 | 11/2005 | Whyte |
| 7,025,698 B2 | 4/2006 | Wickliffe |
| 7,048,292 B2 | 5/2006 | Weagle |
| 7,066,481 B1 | 6/2006 | Soucek |
| RE39,159 E | 7/2006 | Klassen et al. |
| 7,100,930 B2 | 9/2006 | Saiki |
| 7,104,908 B2 | 9/2006 | Nagano |
| 7,128,329 B2 | 10/2006 | Weagle |
| 7,131,511 B2 | 11/2006 | Arnold |
| 7,210,695 B2 | 5/2007 | Griffiths |
| 7,216,883 B2 | 5/2007 | Oconnor |
| 7,350,797 B2 | 4/2008 | Carroll |
| 7,377,535 B2 | 5/2008 | Chamberlain |
| 7,392,999 B2 | 7/2008 | Oconnor |
| 7,413,208 B2 | 8/2008 | Weng |
| 7,427,077 B2 | 9/2008 | Lesage et al. |
| 7,467,803 B2 | 12/2008 | Buckley |
| 7,494,146 B2 | 2/2009 | Tseng |
| 7,581,743 B2 | 9/2009 | Graney |
| 7,635,141 B2 | 12/2009 | Oconnor |
| 7,658,394 B1 | 2/2010 | Huang |

(56) References Cited

U.S. PATENT DOCUMENTS

| | | |
|---|---|---|
| 7,677,347 B2 | 3/2010 | Brawn |
| 7,703,785 B2 | 4/2010 | Colegrove et al. |
| 7,703,788 B2 | 4/2010 | Tanouye et al. |
| 7,712,757 B2 | 5/2010 | Berthold |
| 7,717,212 B2 | 5/2010 | Weagle |
| 7,722,072 B2 | 5/2010 | Hoogendoorn |
| 7,722,488 B2 | 5/2010 | Kunisawa et al. |
| 7,766,135 B2 | 8/2010 | Fox |
| 7,784,810 B2 | 8/2010 | Graney |
| 7,806,422 B2 | 10/2010 | I |
| 7,815,207 B2 | 10/2010 | Currie |
| 7,828,314 B2 | 11/2010 | Weagle |
| 7,837,213 B2 | 11/2010 | Colegrove et al. |
| 7,837,214 B2 | 11/2010 | Tribotte |
| 7,891,688 B2 | 2/2011 | Chamberlain |
| 7,909,347 B2 | 3/2011 | Earle |
| 7,914,407 B2 | 3/2011 | Fukushima et al. |
| 7,934,739 B2 | 5/2011 | Domahidy |
| 7,938,424 B2 | 5/2011 | Arraiz |
| 7,938,425 B2 | 5/2011 | Chamberlain |
| 7,954,837 B2 | 6/2011 | Talavasek |
| 7,963,541 B2 | 6/2011 | Chamberlain |
| 7,980,579 B2 | 7/2011 | Buckley |
| 8,002,301 B2 | 8/2011 | Weagle |
| 8,006,993 B1 | 8/2011 | Chamberlain |
| 8,007,383 B2 | 8/2011 | Watarai et al. |
| 8,012,052 B2 | 9/2011 | Shahana |
| 8,033,558 B2 | 10/2011 | Earle |
| 8,066,297 B2 | 11/2011 | Beale et al. |
| 8,075,009 B2 | 12/2011 | Cocalis et al. |
| 8,136,829 B1 | 3/2012 | Kang et al. |
| 8,152,191 B2 | 4/2012 | Huang et al. |
| 8,201,841 B2 | 6/2012 | Beale et al. |
| 8,272,657 B2 | 9/2012 | Graney et al. |
| 8,272,658 B2 | 9/2012 | Hoogendoorn |
| 8,286,982 B2 | 10/2012 | Plantet et al. |
| 8,303,443 B2 | 11/2012 | Wickliffe et al. |
| 8,348,295 B2 | 1/2013 | Beaulieu et al. |
| 8,376,382 B2 | 2/2013 | Twers |
| 8,382,136 B2 | 2/2013 | Beale et al. |
| 8,419,573 B2 | 4/2013 | Yamaguchi |
| 8,430,415 B2 | 4/2013 | Earle et al. |
| 8,434,776 B2 | 5/2013 | Wuthrich |
| 8,439,383 B2 | 5/2013 | Talavasek |
| 8,459,680 B2 | 6/2013 | Chamberlain |
| 8,585,070 B2 | 11/2013 | Beale |
| 8,590,914 B2 | 11/2013 | Domahidy |
| 8,622,411 B1 | 1/2014 | Chamberlain |
| 8,641,072 B2 | 2/2014 | Graney et al. |
| 8,646,797 B2 | 2/2014 | Buckley |
| 8,678,962 B2 | 3/2014 | Jordan |
| 8,696,008 B2 | 4/2014 | Hoogendoorn |
| 8,727,057 B2 | 5/2014 | Park et al. |
| 8,733,774 B2 | 5/2014 | Graney et al. |
| 8,770,360 B2 | 7/2014 | Fox |
| 8,833,785 B2 | 9/2014 | Wagner |
| 8,851,498 B2 | 10/2014 | Alsop |
| 8,882,127 B2 | 11/2014 | Colegrove et al. |
| 8,919,799 B2 | 12/2014 | Wimmer |
| 8,931,793 B2 | 1/2015 | Klieber |
| 8,932,162 B2 | 1/2015 | Emura et al. |
| 8,998,235 B2 | 4/2015 | Beale |
| 9,039,026 B2 | 5/2015 | Hudec |
| 9,056,644 B2 | 6/2015 | Hudak |
| 9,056,647 B2 | 6/2015 | Hu |
| 9,061,729 B2 | 6/2015 | Canfield et al. |
| 9,102,378 B2 | 8/2015 | Zawistowski |
| 9,102,379 B2 | 8/2015 | Capogna |
| 9,127,766 B2 | 9/2015 | Kuwayama et al. |
| 9,145,185 B1 | 9/2015 | Claro |
| 9,156,521 B2 | 10/2015 | Lumpkin |
| 9,216,791 B2 | 12/2015 | Hudec |
| 9,221,513 B2 | 12/2015 | Hoogendoorn |
| 9,242,693 B2 | 1/2016 | Voss |
| 9,302,732 B2 | 4/2016 | Beale |
| 9,327,792 B2 | 5/2016 | Johnson et al. |
| 9,334,011 B2 | 5/2016 | Chamberlain |
| 9,376,156 B2 | 6/2016 | Chamberlain |
| 9,376,162 B2 | 6/2016 | Colegrove et al. |
| 9,457,871 B2 | 10/2016 | Kuwayama et al. |
| 9,469,369 B2 | 10/2016 | Thoma |
| 9,505,462 B2 | 11/2016 | Pasqua et al. |
| 9,561,834 B2 | 2/2017 | Zawistowski |
| 9,598,131 B2 | 3/2017 | Zusy et al. |
| 9,637,199 B2 | 5/2017 | Pasqua et al. |
| 9,676,446 B2 | 6/2017 | Pasqua et al. |
| 9,758,217 B2 | 9/2017 | Bortoli et al. |
| 9,821,879 B2 | 11/2017 | Hoogendoorn et al. |
| 9,919,765 B2 | 3/2018 | Wickliffe et al. |
| 10,011,325 B2 | 7/2018 | Zawistowski |
| 2001/0024024 A1 | 9/2001 | Klassen et al. |
| 2003/0038450 A1 | 2/2003 | Lam |
| 2004/0046355 A1 | 3/2004 | Carroll |
| 2004/0061305 A1 | 4/2004 | Christini |
| 2004/0239071 A1 | 12/2004 | Chamberlain et al. |
| 2005/0057018 A1 | 3/2005 | Saiki |
| 2005/0067809 A2 | 3/2005 | Chamberlain |
| 2005/0067810 A1 | 3/2005 | Weagle |
| 2005/0184483 A1 | 8/2005 | Buckley |
| 2005/0253357 A1 | 11/2005 | Chang et al. |
| 2005/0285367 A1 | 12/2005 | Chang et al. |
| 2006/0061059 A1 | 3/2006 | Lesage et al. |
| 2006/0071442 A1 | 4/2006 | Hoogendoorn |
| 2006/0119070 A1 | 6/2006 | Weagle |
| 2006/0181053 A1 | 8/2006 | Huang et al. |
| 2006/0197306 A1 | 9/2006 | Oconnor |
| 2006/0225942 A1 | 10/2006 | Weagle |
| 2006/0231360 A1 | 10/2006 | Chen |
| 2007/0024022 A1 | 2/2007 | Weagle |
| 2007/0108725 A1 | 5/2007 | Graney |
| 2007/0194550 A1 | 8/2007 | Wadelton |
| 2007/0210555 A1 | 9/2007 | Oconnor |
| 2008/0054595 A1 | 3/2008 | Lu |
| 2008/0067772 A1 | 3/2008 | Weagle |
| 2008/0217882 A1 | 9/2008 | Beaulieu et al. |
| 2008/0238030 A1 | 10/2008 | Tseng |
| 2008/0238031 A1 | 10/2008 | Tseng |
| 2008/0252040 A1 | 10/2008 | Colegrove et al. |
| 2008/0258427 A1 | 10/2008 | Buckley |
| 2008/0303242 A1 | 12/2008 | Oconnor |
| 2009/0001685 A1 | 1/2009 | Talavasek et al. |
| 2009/0026728 A1 | 1/2009 | Domahidy |
| 2009/0072512 A1 | 3/2009 | Earle |
| 2009/0250897 A1 | 10/2009 | Tanouye et al. |
| 2009/0278331 A1 | 11/2009 | Graney |
| 2009/0283986 A1 | 11/2009 | Falke |
| 2010/0059965 A1 | 3/2010 | Earle |
| 2010/0102531 A1 | 4/2010 | Graney et al. |
| 2010/0109282 A1 | 5/2010 | Weagle |
| 2010/0127473 A1 | 5/2010 | Cocalis et al. |
| 2010/0156066 A1 | 6/2010 | Oconnor |
| 2010/0244402 A1 | 9/2010 | Hoogendoorn |
| 2010/0327553 A1 | 12/2010 | Talavasek |
| 2010/0327554 A1 | 12/2010 | Talavasek |
| 2010/0327556 A1 | 12/2010 | Chamberlain |
| 2011/0025015 A1 | 2/2011 | Colegrove et al. |
| 2011/0175310 A1 | 7/2011 | Lewis |
| 2011/0187078 A1 | 8/2011 | Higgon |
| 2011/0233892 A1 | 9/2011 | Domahidy |
| 2011/0233893 A1 | 9/2011 | Buckley |
| 2011/0275256 A1 | 11/2011 | Gibbs et al. |
| 2011/0285106 A1 | 11/2011 | Talavasek |
| 2012/0126506 A1 | 5/2012 | Zawistowski |
| 2012/0223504 A1 | 9/2012 | Antonot |
| 2012/0228850 A1 | 9/2012 | Tseng |
| 2012/0280470 A1 | 11/2012 | Colegrove et al. |
| 2012/0299268 A1 | 11/2012 | Chamberlain et al. |
| 2013/0001918 A1 | 1/2013 | Graney et al. |
| 2013/0001919 A1 | 1/2013 | Graney et al. |
| 2013/0093160 A1 | 4/2013 | Alsop |
| 2013/0096781 A1 | 4/2013 | Reichenbach et al. |
| 2013/0214503 A1 | 8/2013 | Chiuppani |
| 2013/0249181 A1 | 9/2013 | Becker et al. |
| 2013/0249188 A1 | 9/2013 | Beale |

(56) References Cited

U.S. PATENT DOCUMENTS

| | | |
|---|---|---|
| 2013/0285346 A1 | 10/2013 | Wimmer |
| 2014/0001729 A1 | 1/2014 | Hudec |
| 2014/0015220 A1 | 1/2014 | Talavasek |
| 2014/0060950 A1 | 3/2014 | Beutner |
| 2014/0109728 A1 | 4/2014 | Mcrorie, III |
| 2014/0217697 A1 | 8/2014 | Buckley |
| 2014/0318306 A1 | 10/2014 | Tetsuka |
| 2015/0001829 A1 | 1/2015 | Berthold |
| 2015/0054250 A1 | 2/2015 | Hu |
| 2015/0115569 A1 | 4/2015 | Matheson et al. |
| 2015/0175238 A1 | 6/2015 | Lumpkin |
| 2015/0183487 A1 | 7/2015 | Tsai |
| 2015/0191213 A1 | 7/2015 | Beale |
| 2015/0251724 A1 | 9/2015 | Hudec |
| 2015/0360743 A1 | 12/2015 | Oconnor |
| 2016/0083042 A1 | 3/2016 | Voss |
| 2016/0272273 A1 | 9/2016 | Colegrove et al. |
| 2016/0280317 A1 | 9/2016 | Hoogendoorn |
| 2016/0311493 A1 | 10/2016 | Scheffer |
| 2018/0229798 A1 | 8/2018 | Hoogendoorn et al. |
| 2018/0265165 A1 | 9/2018 | Zawistowski |
| 2018/0297661 A1 | 10/2018 | Beale |

FOREIGN PATENT DOCUMENTS

| | | |
|---|---|---|
| DE | 692011 C | 6/1940 |
| DE | 9405076 U1 | 5/1994 |
| DE | 9416803 U1 | 12/1994 |
| DE | 4435482 A1 | 4/1996 |
| EP | 0422324 A1 | 4/1991 |
| EP | 0723907 B1 | 7/1998 |
| EP | 0941917 A2 | 9/1999 |
| EP | 941917 A2 | 9/1999 |
| EP | 1060979 A2 | 12/2000 |
| EP | 2540609 A1 | 1/2013 |
| FR | 541520 A | 7/1922 |
| FR | 933079 A | 4/1948 |
| FR | 2774966 A1 | 8/1999 |
| GB | 17336 | 10/1913 |
| JP | H0725378 A | 1/1995 |
| WO | 9422710 A1 | 10/1994 |
| WO | 9803390 A1 | 1/1998 |
| WO | 9818671 A1 | 5/1998 |
| WO | 9856645 A1 | 12/1998 |
| WO | 9965760 A1 | 12/1999 |
| WO | 9944880 A9 | 1/2000 |
| WO | 03010042 A1 | 2/2003 |
| WO | 03018392 A1 | 3/2003 |
| WO | 03021129 A1 | 3/2003 |
| WO | 2004045940 A2 | 6/2004 |
| WO | 2005030564 A2 | 4/2005 |
| WO | 2005030565 A1 | 4/2005 |
| WO | 2005090149 A1 | 9/2005 |
| WO | 2006005687 A1 | 1/2006 |
| WO | 2006032052 A2 | 3/2006 |
| WO | 2006061052 A1 | 6/2006 |
| WO | 2008025950 A1 | 3/2008 |
| WO | 2008130336 A1 | 10/2008 |
| WO | 2009121936 A1 | 10/2009 |
| WO | 2010033174 A1 | 3/2010 |
| WO | 2010103057 A1 | 9/2010 |
| WO | 2010121267 A1 | 10/2010 |
| WO | 2012024697 A1 | 2/2012 |
| WO | 2012027900 A1 | 3/2012 |
| WO | 2012063098 A1 | 5/2012 |
| WO | 2012122634 A1 | 9/2012 |
| WO | 2013028138 A2 | 2/2013 |
| WO | 2013078436 A1 | 5/2013 |
| WO | 2013119616 A1 | 8/2013 |
| WO | 2013142855 A2 | 9/2013 |
| WO | 2013192622 A1 | 12/2013 |
| WO | 2014009019 A1 | 1/2014 |
| WO | 2014029759 A1 | 2/2014 |
| WO | 2014202890 A1 | 12/2014 |
| WO | 2015196242 A1 | 12/2015 |
| WO | 2016036237 A1 | 3/2016 |
| WO | 2016097433 A1 | 6/2016 |
| WO | 2016134471 A1 | 9/2016 |

OTHER PUBLICATIONS

Chen, "Design of Structural Mechanisms", A dissertation submitted for the degree of Doctor of Philosophy in the Department of Engineering Science at the University of Oxford, St Hugh's College, 2003, 160 Pages.

EP, "European Extended Search Report", Application No. 12851566.5, dated May 28, 2015, 7 pages.

EP, "Extended European Search Report", Application No. 11818903.4, dated Sep. 15, 2015, 8 pages.

EP, "Supplementary Search Report", Application No. 05798319.9, dated Dec. 11, 2009, 1 page.

Li, "Movable Spatial 6R Linkages", XP055249075, Retrieved from the Internet on Oct. 13, 2016: URL:http://people.ricam.oeaw.ac.at/z.li/pu blications/talks/6.pdf, Oct. 2, 2013, 48 Pages.

PCT, "International Search Report and Written Opinion", Application No. PCT/US2011/048696, dated Dec. 14, 2011, 10 pages.

PCT, "International Search Report and Written Opinion", Application No. PCT/US2015/065090, dated Feb. 12, 2016, 11 pages.

PCT, "International Search Report and Written Opinion", Application No. PCT/US2012/066427, dated Jan. 18, 2013, 12 pages.

PCT, "International Search Report and Written Opinion", Application No. PCT/US2018/041054, dated Sep. 28, 2018, 12 pages.

PCT, "International Search Report and Written Opinion", Application No. PCT/US2018/023124, dated Aug. 2, 2018, 14 pages.

PCT, "International Search Report and Written Opinion", Application No. PCT/US2005/33410, dated Nov. 29, 2006, 5 pages.

Sarrut, "Note Sur La Transformation Des Mouvements Rectilignes Alternatifs", Academie des Sciences, 36, 1036-1038, 1853, 5 Pages.

Zawistowski, "Quantifying Wheel Path", Think Turquoise, http://www.yeticycles.com/blog/?p=237 [Retrieved from the Internet on Jul. 27, 2011], Jul. 18, 2010, 4 Pages.

DIRECTION OF EXTENSION OF RAIL

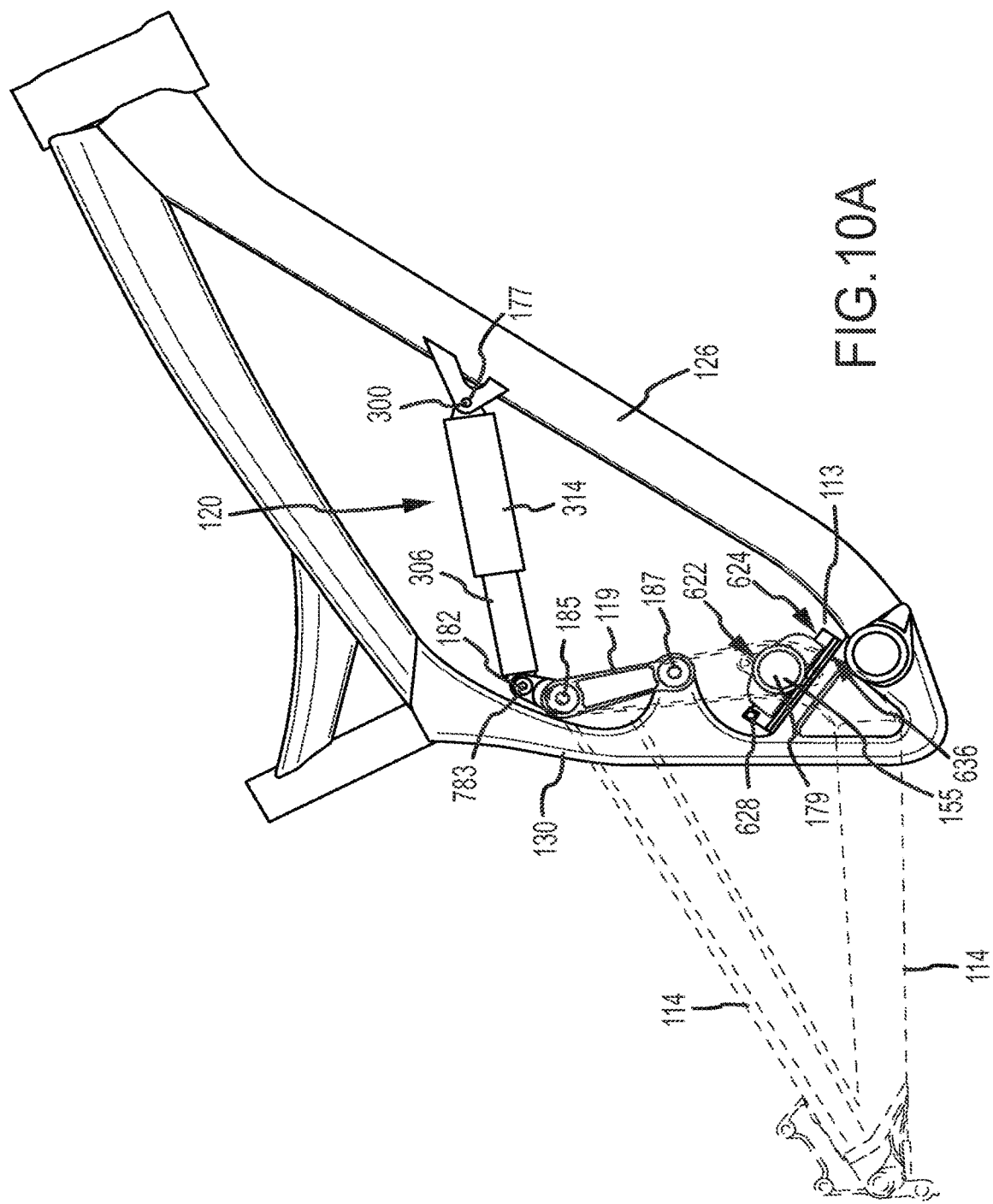

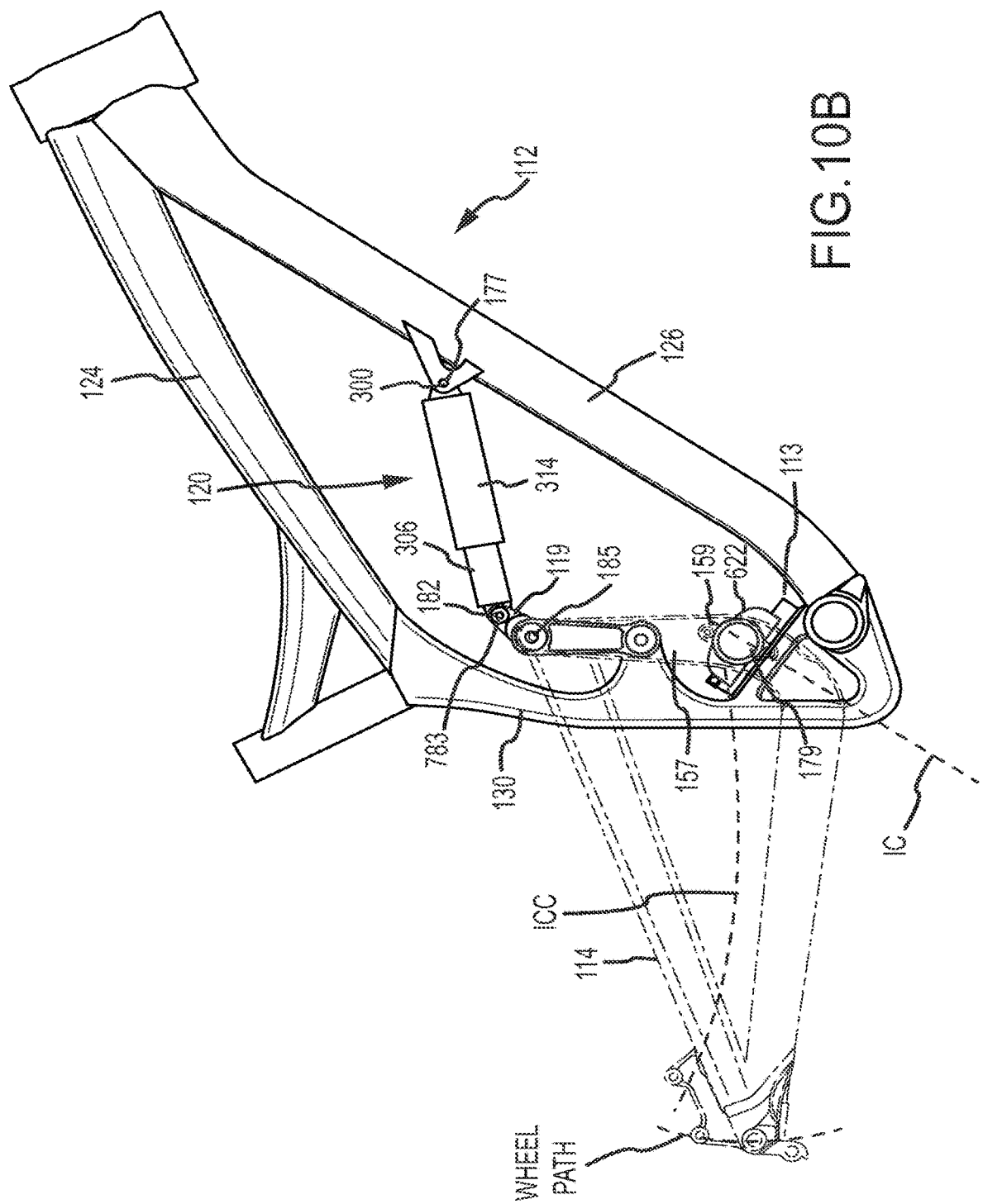

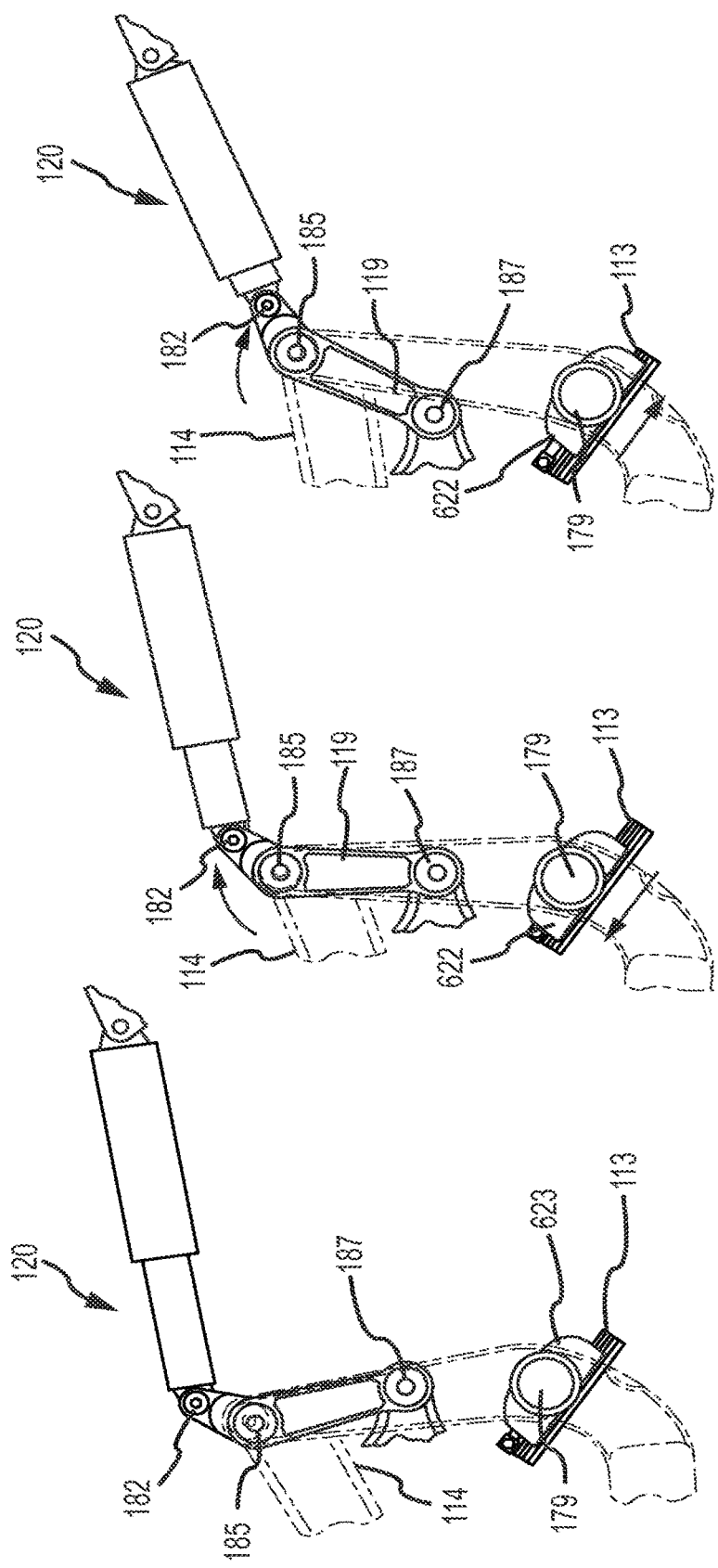

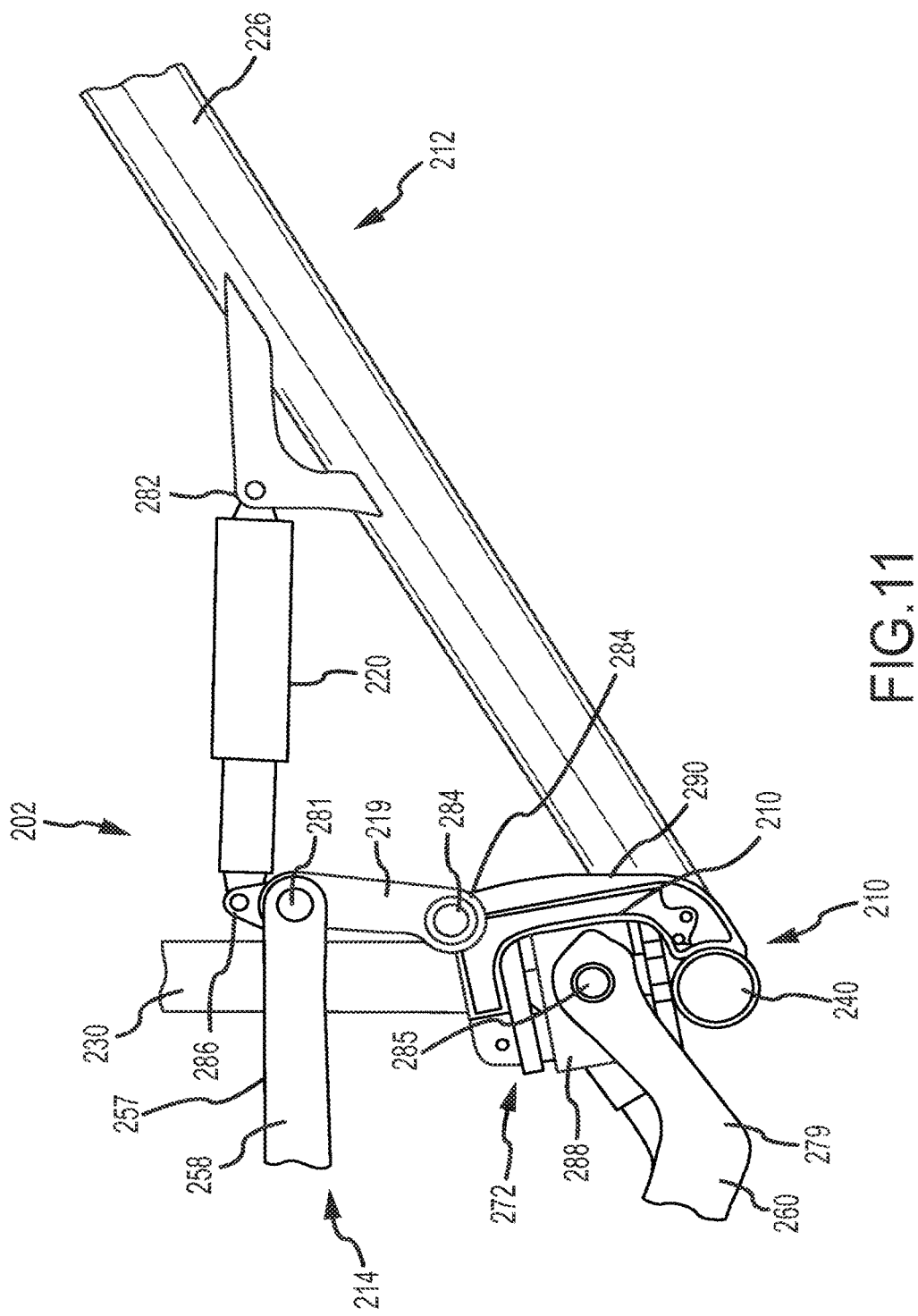

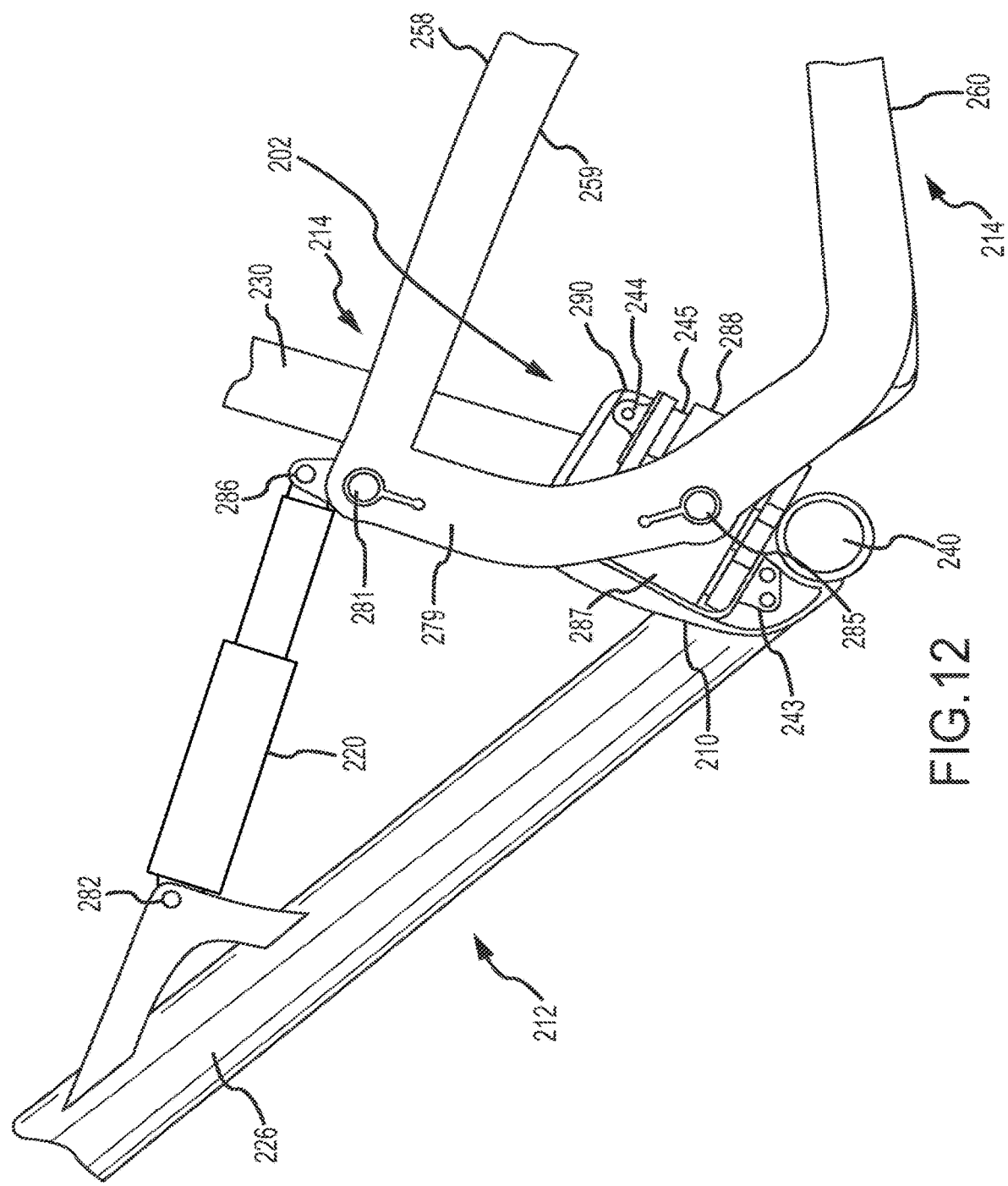

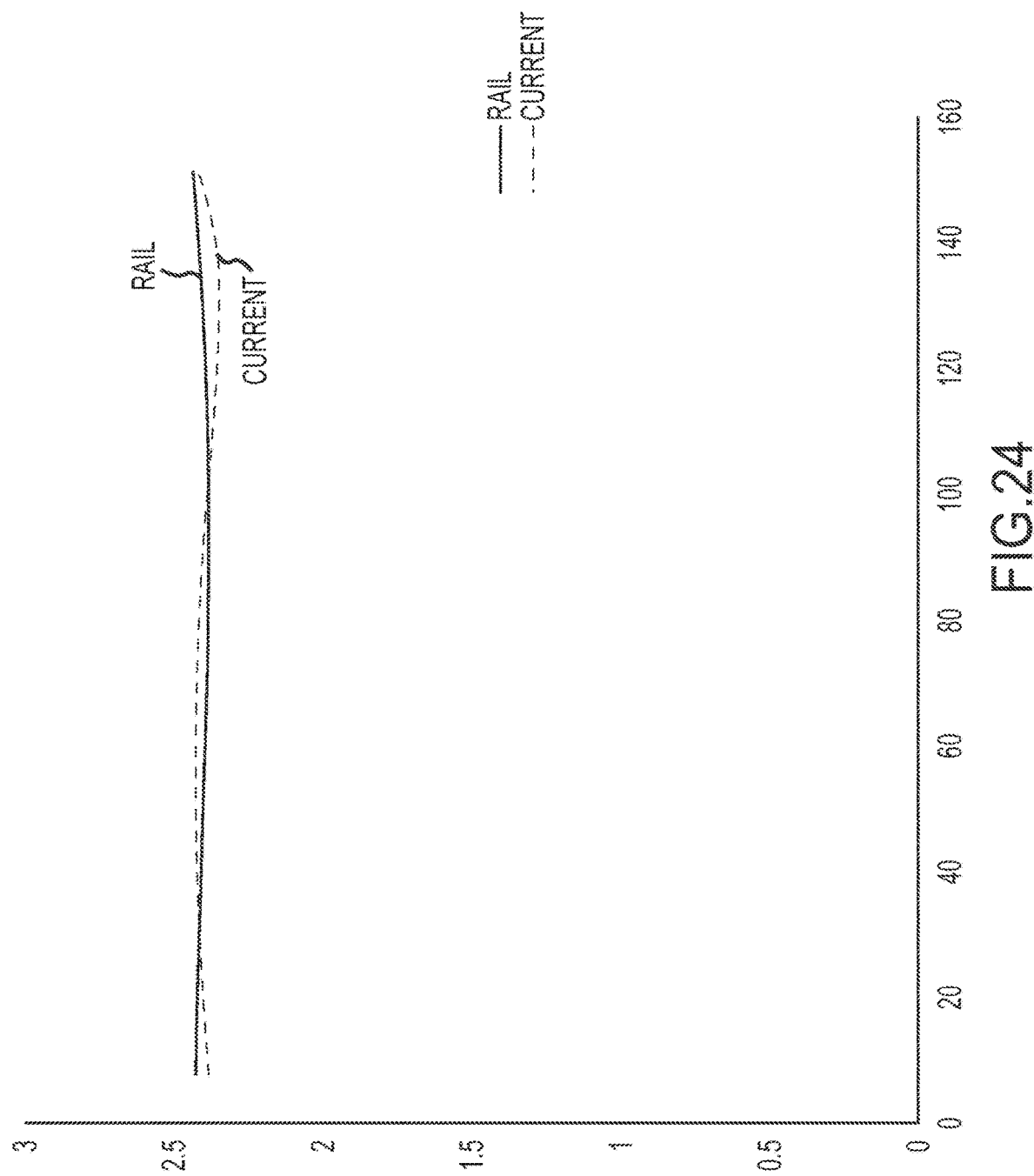

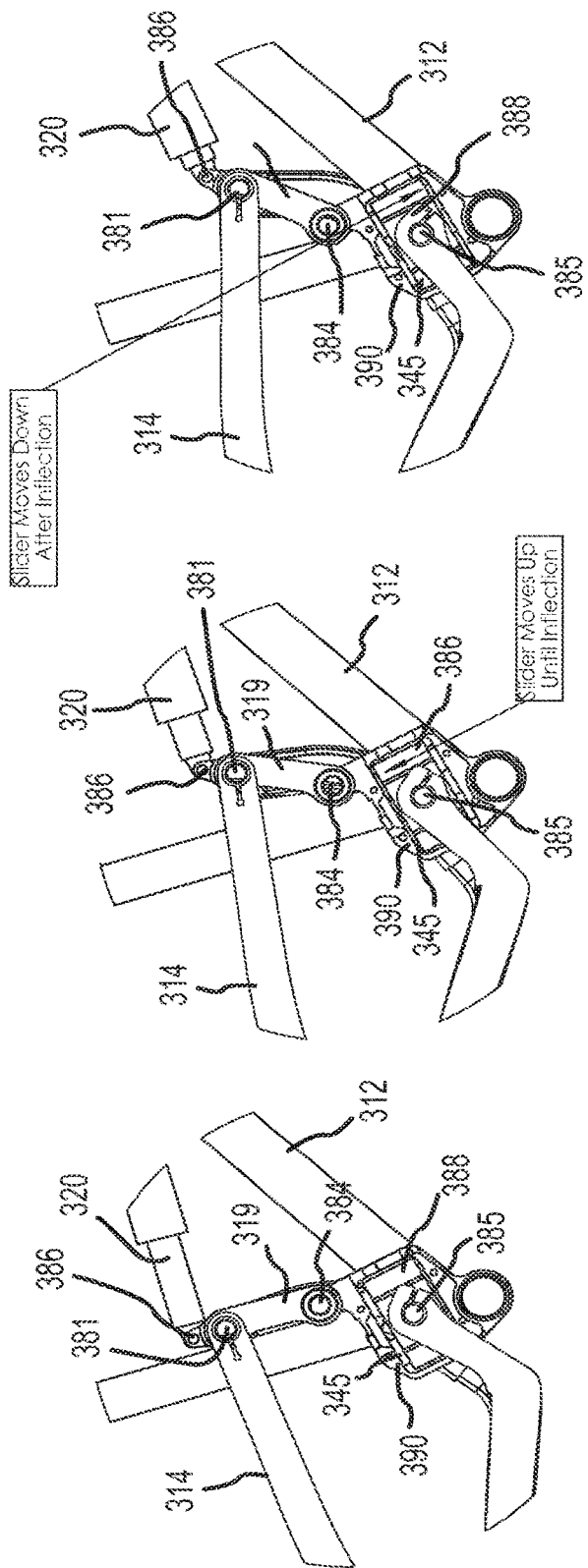

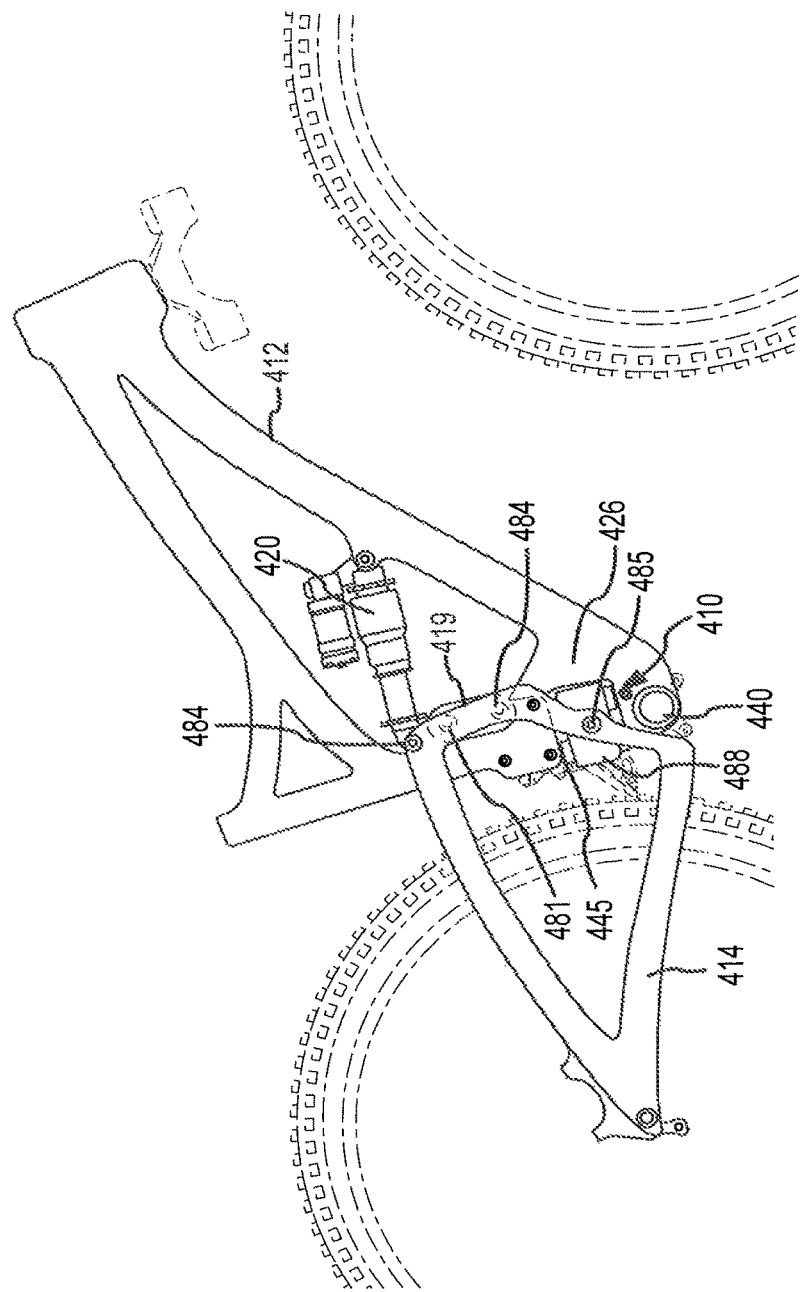

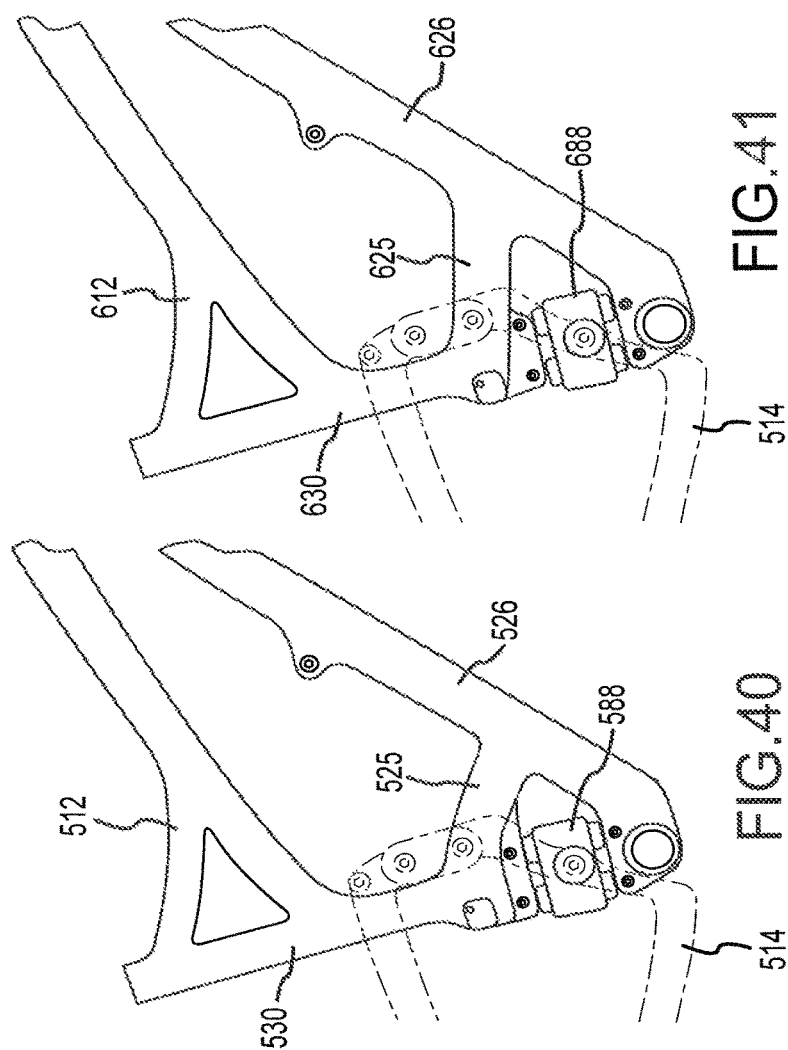

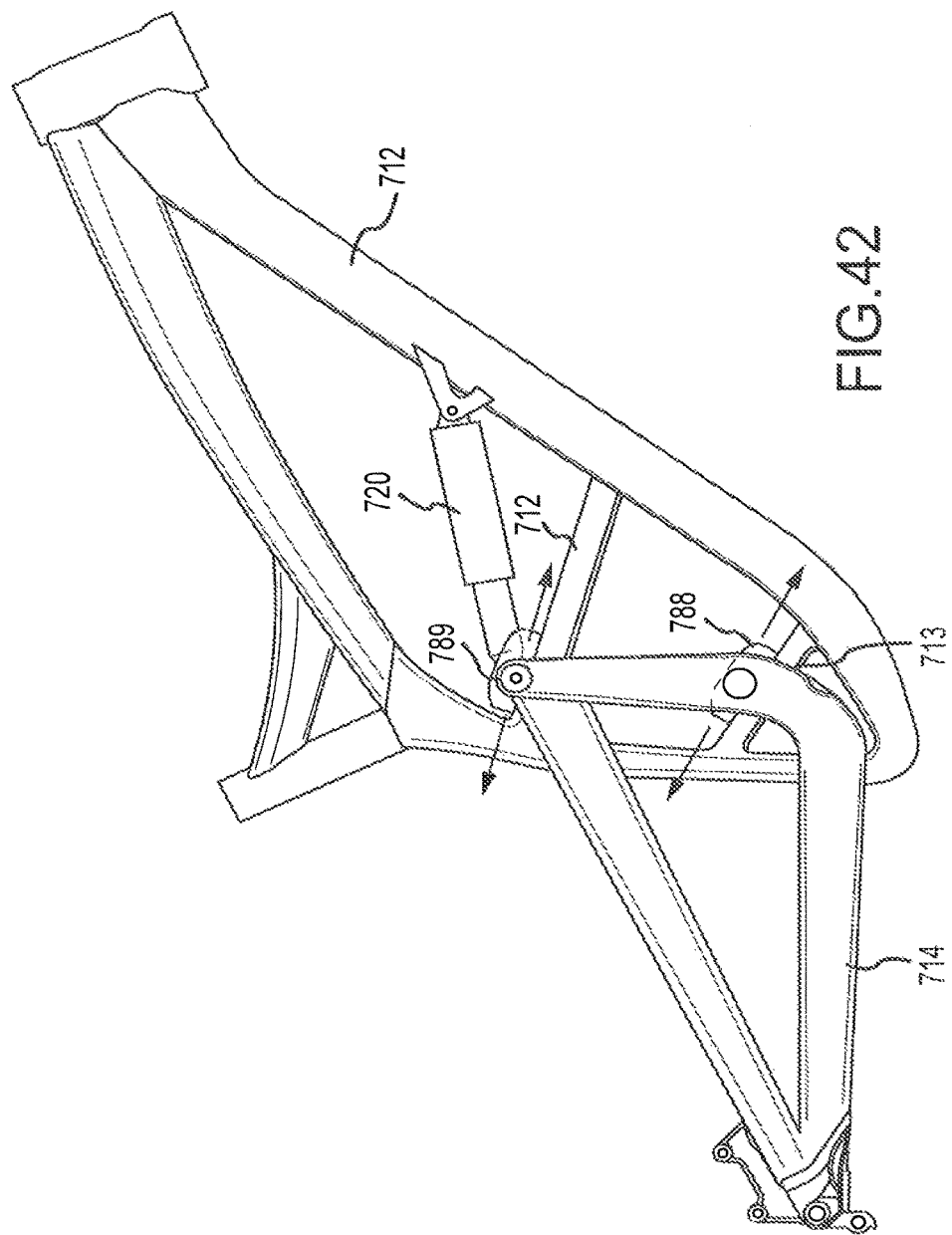

RECIPROCATING RAIL MOVEMENT SUSPENSION SYSTEM

CROSS-REFERENCE TO RELATED APPLICATIONS

This application is a continuation of U.S. patent application Ser. No. 15/818,455 filed Nov. 20, 2017 entitled "RECIPROCATING RAIL MOVEMENT SUSPENSION SYSTEM" which is a continuation of U.S. patent application Ser. No. 14/385,480 filed Sep. 15, 2014, now U.S. Pat. No. 9,821,879 which is a national stage application of PCT/US2012/066427 filed on Nov. 21, 2012, and entitled "RECIPROCATING RAIL MOVEMENT SUSPENSION SYSTEM," which claims priority under 35 U.S.C. § 119(e) to U.S. Provisional Patent Application Nos. 61/635,800 filed Apr. 19, 2012, 61/609,927 filed Mar. 12, 2012 and 61/563,292 filed Nov. 23, 2011; the entireties of which are hereby incorporated by reference in their entirety for all purposes.

This application is a continuation-in-part of U.S. patent application Ser. No. 13/215,170 filed Aug. 22, 2011, and entitled "Link Suspension System," which claims priority under 35 U.S.C. § 119(e) to U.S. Provisional Application No. 61/375,278 filed Aug. 20, 2010; the entireties of which are hereby incorporated by reference for all purposes.

This application further incorporates by reference U.S. patent application Ser. No. 11/229,270 entitled "Rear Suspension System," now issued as U.S. Pat. No. 7,722,072 in its entirety.

TECHNICAL FIELD

Examples disclosed herein relate generally to bicycles, and more particularly, to suspension systems for rear wheels of bicycles.

BACKGROUND

Many bicycles, particularly mountain bicycles, include rear suspension systems. The rear suspension system allows the rear wheel to be displaced relative to the bicycle frame when impact forces are imparted on the rear wheel and, in turn, acts to absorb the impact forces. As such, suspension systems may improve rider comfort, as well as protect the rider and all or part of the bicycle from the roughness of the terrain when traveling or jumping the bicycle by keeping one or both wheels in contact with the ground and allowing the rider's mass to move over the ground in a flatter trajectory.

Many rear suspension systems available on the market allow the rear wheel of the bicycle to travel in a particular path that is dictated by the physical construction of the suspension system. Generally, the rear wheel path is fixed by the rear suspension design, with different rear wheel paths causing different reactions in the way that the bicycle handles forces impacting on the rear wheel. The rear suspension systems of different bicycles may have different shock-absorbing properties, so as to provide the dampening effect that is best suited to the terrain most often traversed by the bicycle. A mountain bicycle intended for traversing steep downhill grades may benefit from a shock assembly that causes the rear wheel to travel in a substantially vertical direction, while a trail bicycle intended for traversing small bumps and gradual downhill grades may benefit from a shock that travels in a curved travel path.

SUMMARY

One aspect of the present disclosure relates to a rear suspension system for a bicycle. The rear suspension system acts to absorb forces impacting on the bicycle by allowing a rear wheel of the bicycle to be displaced relative to the rest of the bicycle. The disclosed rear suspension system utilizes a sliding body that is pivotally coupled to the rear frame and engages a linear rail. The rear frame is further pivotally coupled to a rocker link, which causes at least a portion of the rear frame to travel along an arcuate path. The overall structural configuration of the rear suspension system results in a wheel travel path that is curved.

Generally, examples described herein may take the form of a bicycle including a front frame, a rear frame operably associated with the front frame and configured for coupling to a rear wheel, and a suspension system operably associated with the front frame and the rear frame. The suspension system includes a first connection structure operably coupling the front frame to the rear frame and a first sliding body pivotally coupled to the rear frame and configured to travel in a first direction along a substantially linear travel path and in a second direction opposite the first direction along the substantially linear travel path as the suspension system is compressed.

In another example, the first sliding body may be configured to engage a first rail. In a further example, the first connection structure comprises a second sliding body configured to engage a second rail. In another example, the first connection structure includes a link. In some examples, the link may be a rocker link configured to rotate around a fixed pivot axis. Additionally, link may be configured to rotate in a clockwise direction. In other examples, the link may be configured to rotate in a counter-clockwise direction.

In other examples, the bicycle may further include a shock assembly pivotally coupled to the front frame at a first end. In some examples, the shock assembly may be pivotally coupled to the rear frame at a second end. In further examples, the shock assembly may be pivotally coupled to the first connection structure at a second end. In another aspect, the second end of the shock assembly may be configured to travel along an arcuate path. In another example, the first rail may be coupled to the front frame. In a further example, the first sliding body may be configured to travel in the second direction along the substantially linear travel path and in the first direction opposite the second direction along the substantially linear travel path as the suspension system is extended.

In other examples, the rear frame may include a forward member having a top end and a bottom end, a chain stay that extends rearwardly from the bottom end of the forward member to a rear portion, and a seat stay that extends rearwardly from the top end of the forward member to the rear portion. A top end of the forward member may be pivotally coupled to the first connection structure. In another example, a bottom end of the forward member may be pivotally coupled to the first sliding body. In further examples, the first connection structure may be a link and the top end of the forward member may be configured to travel along an arcuate path defined by the link. In a further example, the bicycle may further include a shock assembly defining a first end pivotally coupled to the front frame and a second end operably associated with the rear frame, and the second end of the shock assembly may be configured to travel along an arcuate path that is substantially parallel to the arcuate path traveled by the top end of the forward member. In another example, the first sliding body may be configured to switch directions at an inflection point of a path traveled by the rear wheel.

In another example, the first sliding body may be further configured to engage a second rail that is substantially parallel to the first rail. Additionally, in some examples, the first and second rails together may define a plane that is substantially parallel to a plane defined by the front frame. In a further example, the first and second rails may be joined to a mount that is joined to the front frame. In another example, the mount may have a truncated C shape. In further examples, the mount may have a rectangular shape. In some examples, a vertical component of the substantially linear travel path of the first sliding body is larger than a horizontal component of the substantially linear travel path of the first sliding body. Alternatively, in other examples, a horizontal component of the substantially linear travel path of the first sliding body is larger than a vertical component of the substantially linear travel path of the first sliding body.

Other examples may take the form of a bicycle including a front frame, a rear frame operably associated with the front frame and configured for coupling to a rear wheel, and a suspension system operably associated with the front frame and the rear frame. The suspension system may include a first connection structure operably coupling the front frame to the rear frame and a first sliding body pivotally coupled to the rear frame and configured to engage a first rail. The first sliding body may be configured to travel in a first direction along the first rail and in a second direction opposite the first direction along the first rail as the suspension system is compressed.

In other examples, the first connection structure may include a second sliding body configured to engage a second rail. In further examples, the first connection structure may include a link. In some examples, the link may be a rocker link configured to rotate around a fixed pivot axis. In some examples, the link may be configured to rotate in a clockwise direction. In other examples, the link may be configured to rotate in a counter-clockwise direction. In another example, the bicycle may further include a shock assembly pivotally coupled to the front frame at a first end. In some examples, the shock assembly may be pivotally coupled to the rear frame at a second end. In additional examples, the shock assembly may be pivotally coupled to the first connection structure at a second end.

In another example, the second end of the shock assembly may be configured to travel along an arcuate path. In some examples, the first rail may be coupled to the front frame. In further examples, the first rail may be substantially linear. In another example, the first sliding body may be configured to travel in the second direction along the first rail and in the first direction opposite the second direction along the first rail as the suspension system is extended. In another example, the rear frame may include a forward member having a top end and a bottom end, a chain stay that extends rearwardly from the bottom end of the forward member to a rear portion, and a seat stay that extends rearwardly from the top end of the forward member to the rear portion. A top end of the forward member may be pivotally coupled to the first connection structure. In some examples, a bottom end of the forward member may be pivotally coupled to the first sliding body.

In some examples, the first connection structure may include a link and the top end of the forward member may be configured to travel along an arcuate path defined by the link. In still other examples, the bicycle may include a shock assembly defining a first end pivotally coupled to the front frame and a second end operably associated with the rear frame, and the second end of the shock assembly may be configured to travel along an arcuate path that is substantially parallel to the arcuate path traveled by the top end of the forward member. In additional examples, the first sliding body may be configured to switch directions at an inflection point of a path traveled by the rear wheel.

Additionally, the first sliding body may further be configured to engage a second rail that is substantially parallel to the first rail. In some examples, the first and second rails together may define a plane that is substantially parallel to a plane defined by the front frame. Further, the first and second rails may be joined to a mount that is joined to the front frame. In some examples, the mount has a truncated C shape. In other examples, the mount has a rectangular shape. In one example, the vertical component of a travel path of the first sliding body is larger than a horizontal component of the travel path of the first sliding body. In other examples, a horizontal component of a travel path of the first sliding body is larger than a vertical component of the travel path of the first sliding body. In another example, the first rail may be non-linear.

Other examples may take the form of a bicycle including a front frame, a rear frame operably associated with the front frame and configured for coupling to a rear wheel, and a rear suspension system operably associated with the front and rear frames. The front frame may be coupled to the rear wheel frame by a first connection structure and a second connection structure positioned below the first connection structure. The second connection structure includes a first sliding body configured to travel back and forth along a substantially linear path as the rear suspension system is compressed.

In some examples, first sliding body may be configured to engage a first rail and the substantially linear path is defined by the first rail. In other examples, the first connection structure may include a link. In another example, the first connection structure may include a second sliding body configured to engage a second rail.

The features, utilities, and advantages of the various disclosed examples will be apparent from the following more particular description of the examples as illustrated in the accompanying drawings and defined in the appended claims.

This summary of the disclosure is given to aid understanding, and one of skill in the art will understand that each of the various aspects and features of the disclosure may advantageously be used separately in some instances, or in combination with other aspects and features of the disclosure in other instances.

BRIEF DESCRIPTION OF THE FIGURES

FIG. 10A is a right side view of the front frame and rear suspension system of the bicycle depicted in FIG. 1, with the rear frame shown in dashed lines.

FIG. 10B is a right side view of the front frame and rear suspension system depicted in FIG. 1 in a partially compressed stage, with the rear frame shown in dashed lines.

FIG. 10F is a right side view of the front frame depicted in FIG. 1 in an uncompressed stage.

FIG. 10G is a right side view of the front frame depicted in FIG. 1 in an partially compressed stage.

FIG. 10H is a right side view of the front frame depicted in FIG. 1 in a fully compressed stage.

FIG. 11 illustrates a right side view of another example of a front frame and rear suspension system of a bicycle.

FIG. 12 illustrates a left side view of the front frame and rear suspension system shown in FIG. 11.

FIG. 24 illustrates a shock rate curve that is achieved in connection with the embodiment of the rear suspension system shown in FIGS. 11-21.

FIG. 38A is a right side view of the front frame depicted in FIG. 26 in an uncompressed stage.

FIG. 38B is a right side view of the front frame depicted in FIG. 26 in an partially compressed stage.

FIG. 38C is a right side view of the front frame depicted in FIG. 26 in a fully compressed stage.

FIG. 39A illustrates a right side view of another example of a front frame and rear suspension system, when fully extended.

FIG. 40 illustrates a right side view of another example of a front frame and rear suspension system.

FIG. 41 illustrates a right side view of another example of a front frame and rear suspension system.

FIG. 42 illustrates a right side view of another example of a front frame and rear suspension system.

DETAILED DESCRIPTION

Figure 1:
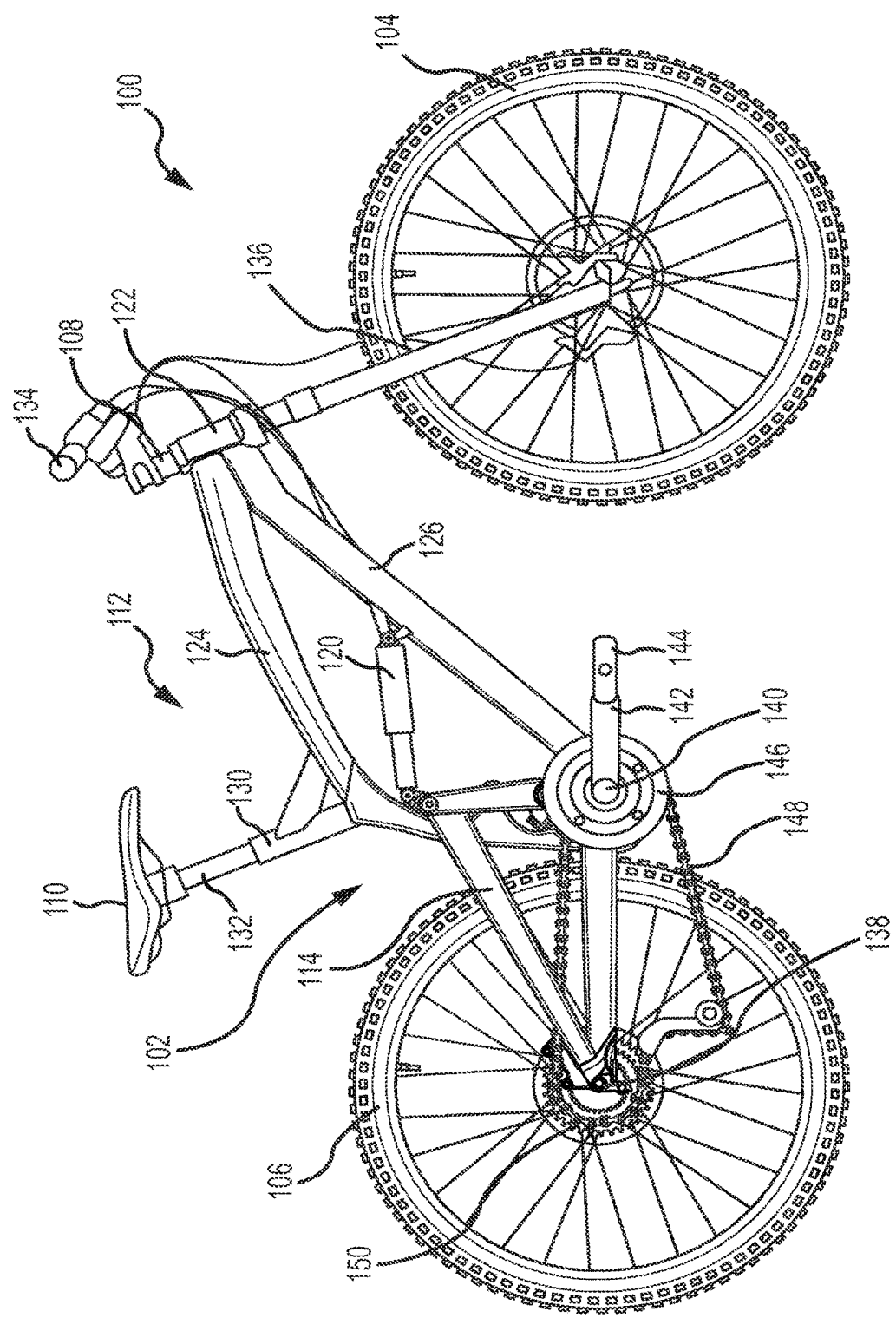
FIG. 1 is a right side view of a bicycle incorporating a rear suspension system according to one example.

Generally, examples described herein take the form of a rear suspension system for a bicycle. The rear suspension system acts to absorb forces impacting on the bicycle by allowing a rear wheel of the bicycle to be displaced relative to the rest of the bicycle. Such forces may be caused from riding over rough terrain (such as rocks, holes in the ground, and the like). Upon displacement of the rear wheel, the rear suspension system can allow the rear wheel to move from a general first position to a second position. The rear suspension system may then act to return the rear wheel to the general first position. The structural and geometrical configurations of the rear suspension system provide a travel path in which the rear wheel moves when acted upon by various forces.

As is known in the art, the leverage ratio of a rear suspension system also can also affect the "feel" of the rear suspension system as sensed by the rider when the rear wheel is displaced. The leverage ratio can be defined as the total rear wheel travel divided by the total shock stroke length, and changes instantaneously throughout the travel path of the rear wheel. The instantaneous leverage ratios at different points along the travel path can be plotted to derive a leverage ratio curve. Generally, a suspension system having higher instantaneous leverage ratios results in an increased mechanical advantage at the rear wheel, allowing for a "softer" suspension, while a system having lower instantaneous leverage ratios results in a decreased mechanical advantage at the rear wheel, allowing for a "firmer" suspension. Different types of leverage ratio curves may be better suited for use with different types of shock assemblies (e.g., an air or liquid shock vs. a spring shock), and with different types of bicycles (e.g., dirt bikes, mountain bikes, road bikes, downhill hikes, cross-country bikes, and so on), to provide a more comfortable riding experience.

As discussed below, one example of a rear suspension system can include a rocker link that is pivotally coupled to the rear frame of a bicycle, the seat tube of the front frame of the bicycle, and the shock assembly. The rear suspension system may further include a sliding body that is pivotally coupled to the rear frame and configured to slidingly engage a linear (or nonlinear) guide rail, such that the sliding body may move back and forth along the rail during a single compression of the shock assembly. Such a rear suspension system design may result in curved or other particular wheel path, or a "softer" suspension, which can be desirable for traversing some types of terrain.

In another embodiment, the sliding body may be configured to slide along a pair of parallel rails. In a further embodiment, the sliding body may be configured to switch directions during a single compression of the shock assembly. Additionally, the sliding body may be configured to travel in an upwards direction and in a downwards direction during a single compression of the shock assembly. In some embodiments, the sliding body may be configured to switch directions at an inflection point of a path traveled by the rear wheel.

Although the rear suspension system is described below with reference to a typical bicycle depicted in the figures, it should be understood the rear suspension system may be used with bicycles having different frame styles than that which is depicted and described herein. Further, although the systems and methods are described below mainly with reference to bicycles, the present invention can be applied to other 2 and 4-wheel human or motor powered vehicles, such as cars, trucks, scooters, and motorcycles.

FIG. 1 shows a bicycle 100 including a rear suspension system 102 according to a first example. The bicycle 100 is rollingly supported by a front wheel 104 and a rear wheel 106. A rider can steer the bicycle 100 by turning the front wheel 104 toward a desired direction of travel with a steering system 108. The bicycle 100 also includes a seat 110 connected with a front frame 112 which can be used to support the rider. As discussed in more detail below, the rear suspension system includes a rear frame 114 coupled with the front frame 112 through a suspension system 115 including a rail 113, a sliding body 622, and a shock assembly 120 (or some other assembly or mechanism which allows for compression of the rear suspension system 115), which may be operably connected between the front frame 112 and the rear frame 114. The rear frame 114 may be fabricated from various members connected together, or as a single piece or member.

As shown in FIGS. 1-5, the front frame 112 can include a head tube 122, a top tube 124, a down tube 126, a bottom bracket 128, and a seat tube 130. The top tube 124 extends rearwardly from the head tube 122 to connect with an upper portion of the seat tube 130, and the down tube 126 extends rearwardly and downwardly from the head tube 122 to connect with the bottom bracket 128. The front frame 112 described herein utilizes a continuous seat tube design where the seat tube 130 extends from the top tube 124 all the way to the down tube 126. It is to be appreciated that in other frame configurations, the seat tube 130 may include an interrupted design in which the seat tube does not fully extend from the top tube 124 to connect with the down tube 126. Referring to FIG. 1, the seat or saddle 110, which is used to support the rider, is connected with a seat post 132 that may be inserted into the seat tube 130. In some configurations, the seat post 132 can be adjustably or releasably received within the seat tube 130, for example, so the height of the seat relative to the front frame 112 can be adjusted.

As illustrated in FIG. 1, the steering system 108 includes a handle bar 134 connected with an upper portion of a front fork member 136. Both the handle bar 134 and the front fork member 136 are rotatably connected with the head tube 122. The front wheel 104 is rotatably connected with a lower portion of the front fork member 136, as is known in the art. Turning the handle bar 134 in a particular direction causes the front wheel 104 to turn in the same direction. As such, a user can steer the bicycle 100 by turning the handle bar 134 in a desired direction of travel.

As described in more detail below, the rear wheel 106 may be rotatably connected with the rear frame 114 through a rear axle 138. It is to be appreciated that the rear axle 138 may be connected to the rear frame 114 in many ways, such as by use of drop-out structures or the like, as are known.

Figure 2:
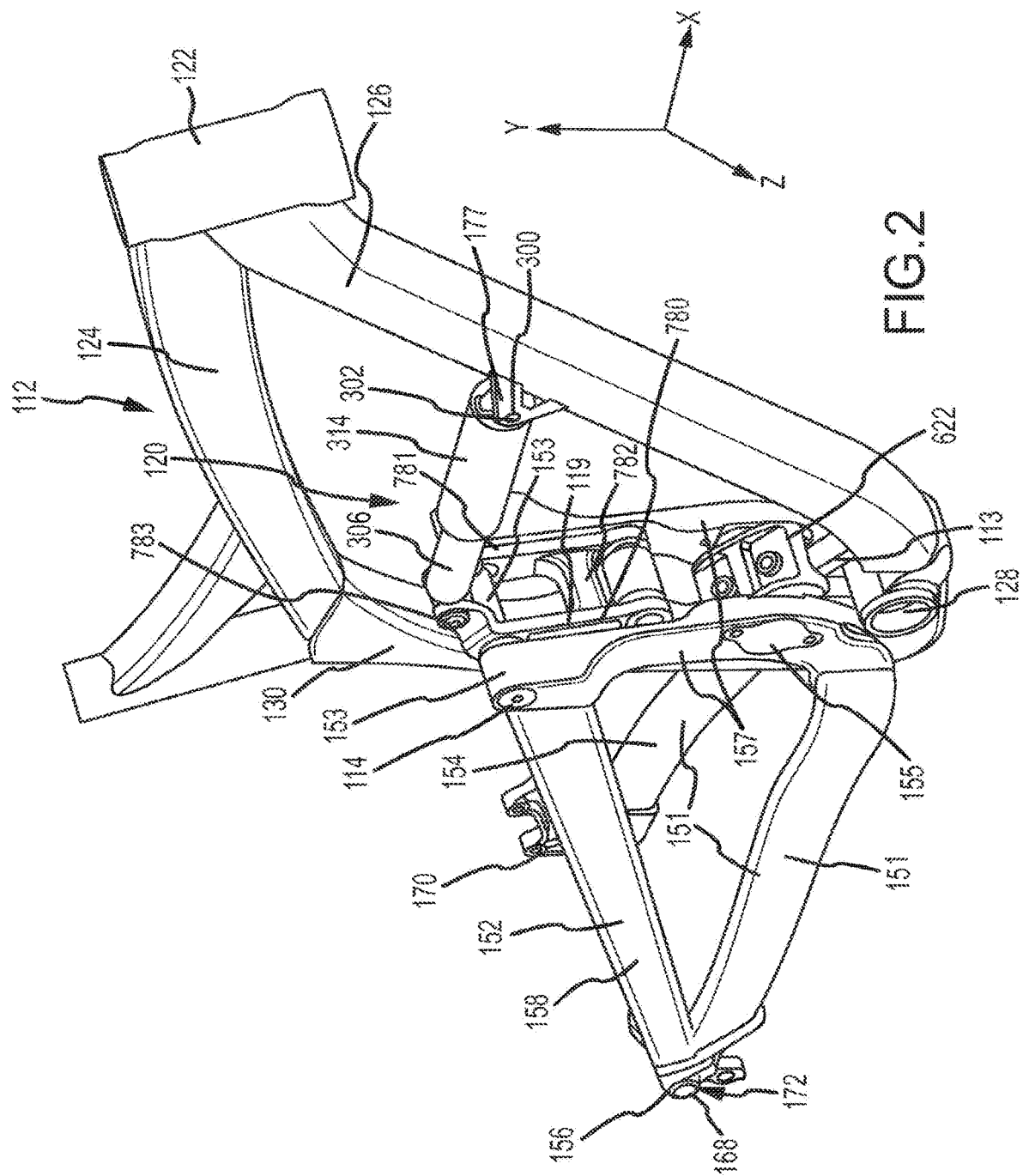
FIG. 2 is a right-front isometric view of the front frame and rear suspension system of the bicycle depicted in FIG. 1.
Figure 3:
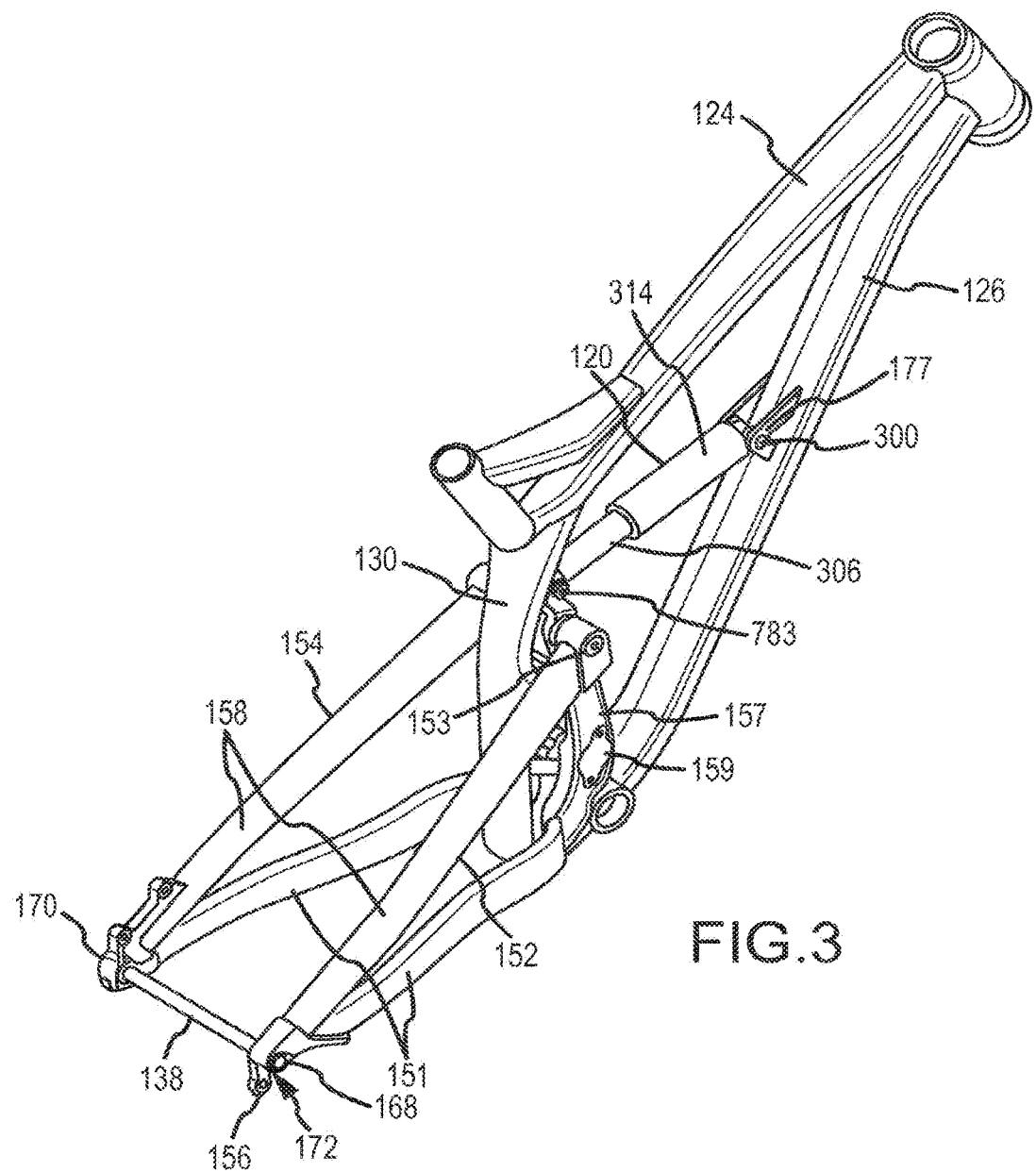
FIG. 3 is a right-rear isometric view of the front frame and rear suspension system of the bicycle depicted in FIG. 1.
Figure 4:
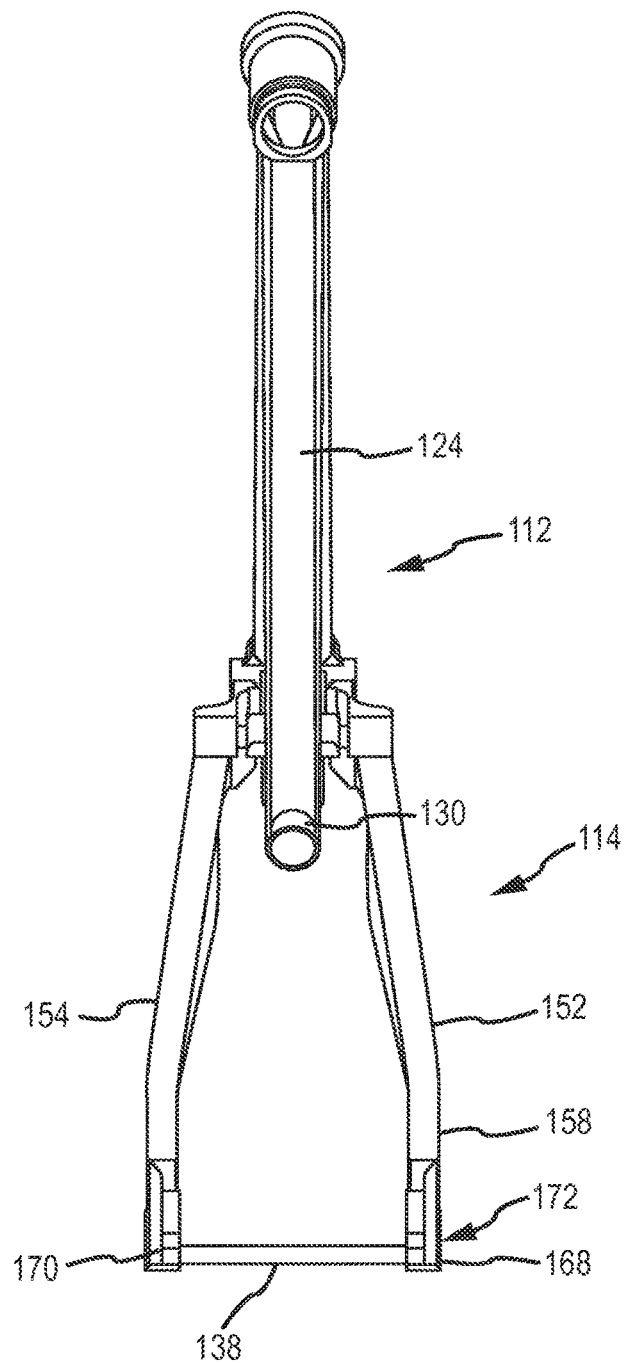
FIG. 4 is a top view of the front frame and rear suspension system of the bicycle depicted in FIG. 1.
Figure 5:
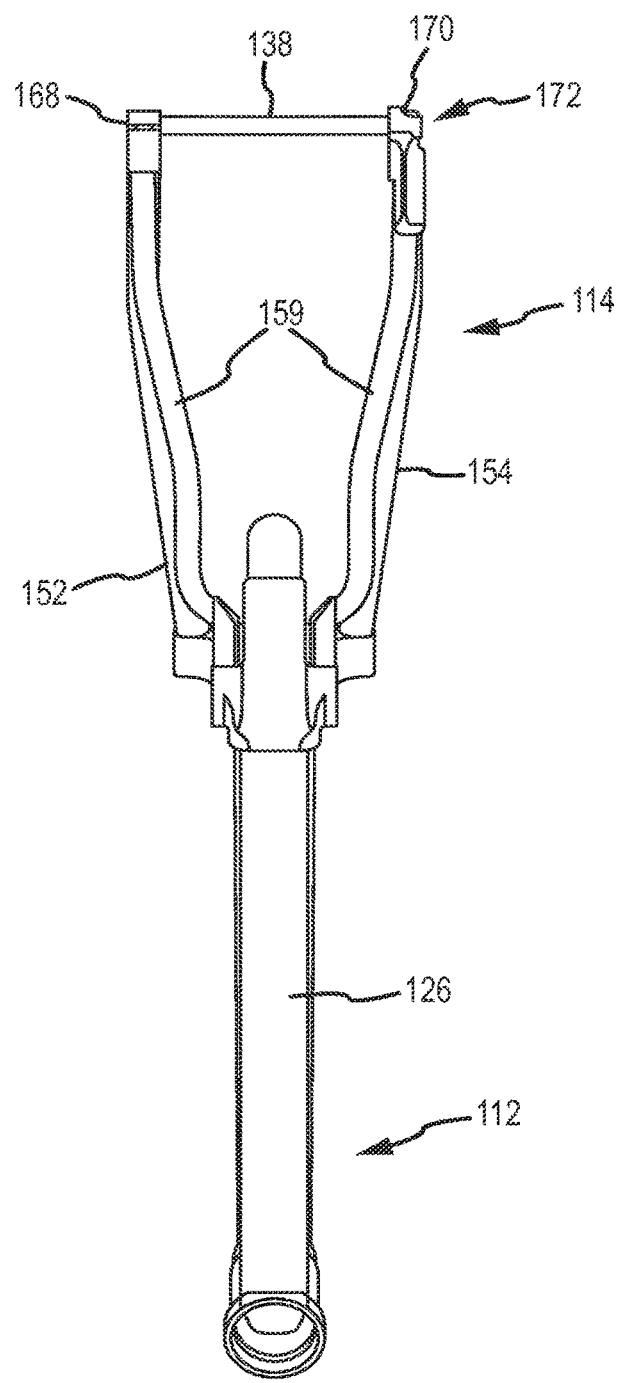
FIG. 5 is a bottom view of the front frame and rear suspension system of the bicycle depicted in FIG. 1.
Figure 6:
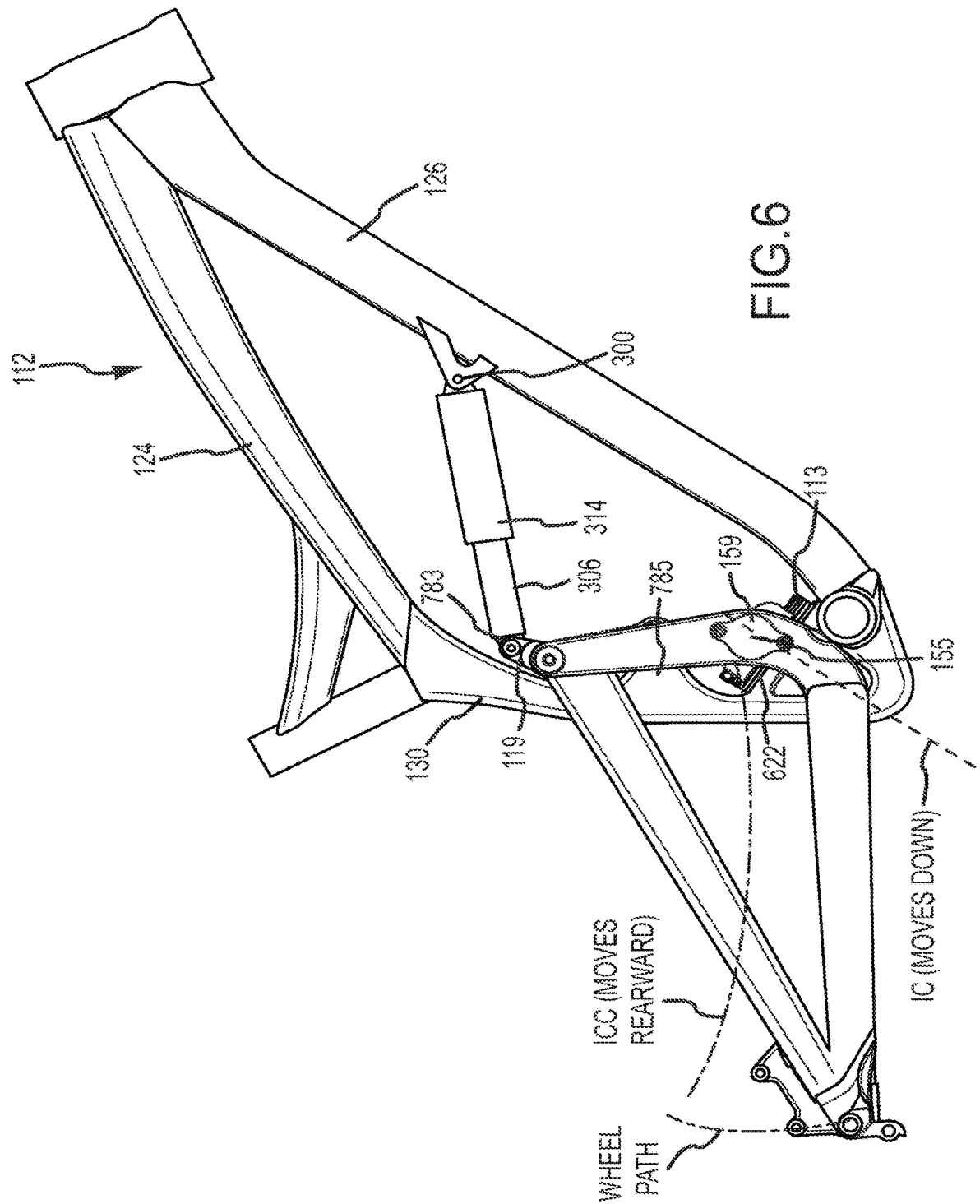
FIG. 6 is a right side view of the front frame and rear suspension system of the bicycle depicted in FIG. 1.

As shown in FIGS. 1-3, the bottom bracket 128 is connected with a lower end portion of the down tube 126. The bottom bracket 128 rotatably supports a crank shaft 140 having crank arms 142 extending radially therefrom in opposite directions. Foot pedals 144 are rotatably connected with the crank arms. A drive sprocket 146, which is connected with the crank shaft 140, is typically connected through a chain 148 with a rear sprocket assembly 150 coupled with the rear wheel 106. When the rider applies forces to the pedals 144, the forces may be translated through the drive sprocket 146 and chain 148 to the rear sprocket assembly 150, causing the rear wheel 106 to rotate. Rotation of the rear wheel 106 may translate into forward motion of the bicycle 100.

As shown in FIGS. 2-5 and 8, the rear frame 114 includes right and left triangles 152, 154. Generally, each of the right and left triangles 152, 154 includes a forward member 157 connected to a chain stay 151 that extends from the bottom end of the forward member 157 to a rear end portion 156, and to a seat stay 158 that extends diagonally from the rear end portion 156 of the chain stay 151 to the top end of the forward member 157. The rear end portions 156 of the right and left rear triangles 152, 154 may be connected, or, in other examples, the rear end portions 156 of the right and left rear triangles 152, 154 may be unconnected. In the illustrated embodiment, the rear end portions 156 of the right and left triangles 152, 154 are each connected to a respective rear joint member 168, 170. Right and left rear joint members 168, 170 include rear axle apertures 172 adapted to receive and rotatably support the rear axle 138 of the rear wheel 106. As is known, some examples may further include dropouts to allow for detaching the axle 138 of the wheel 106 from the rear frame 114. It is to be appreciated that the rear frame 114 can be constructed from various types of material, such as aluminum, carbon, titanium, and so on. The members used to construct the rear frame may also define a hollow tubular structure, or may have a solid construction. The rear frame 114 may be constructed to facilitate the use of disc brakes, and/or a derailleur structure.

Figure 7:
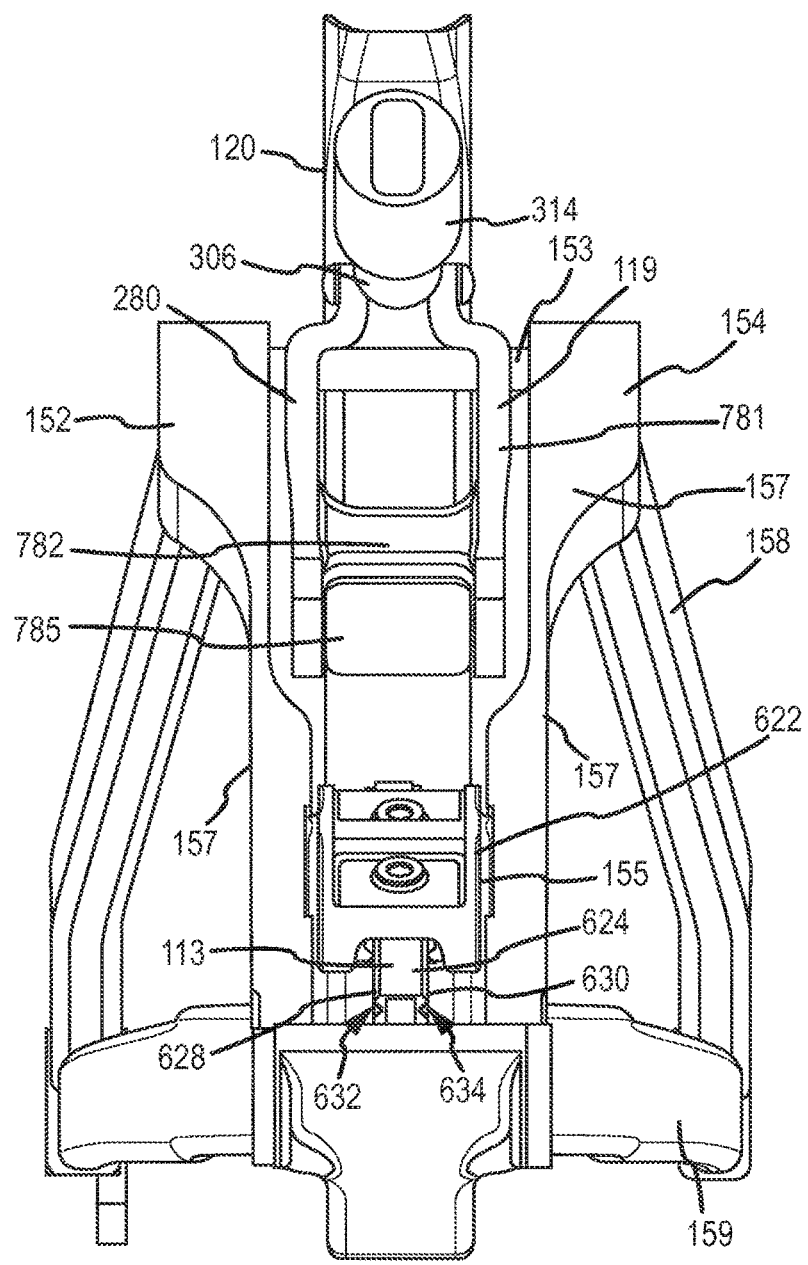
FIG. 7 is a front view of the front frame and rear suspension system of the bicycle depicted in FIG. 1 with the down tube removed.

As best shown in FIGS. 2 and 7, the forward members 157 of the right and left triangles 152, 154 are connected by two axles 153, 155 that extend between the two triangles 152, 154. As will be further discussed below, the first axle 153 is located at the top end of the forward members 157, and extends between the two triangles 152, 154 and through, near, or adjacent to an upper end portion of a rocker link 119 that is positioned between the forward members 157 of the triangles 152, 154, i.e., such that the rocker link 119 is sandwiched between the two triangles 152, 154. The second axle 155 is located at, near, or adjacent to the bottom end of the forward members 157, and extends through a sliding body 622 that is positioned between the forward members 157, i.e., such that the sliding body 622 is sandwiched between the two triangles 152, 154. As is shown, each axle 153, 155 may extend between the triangles 152, 154 a direction that is substantially perpendicular to the right and left triangles 152, 154. The axles 153, 155 may be integrally formed with the triangles 152, 154 or may be separate components attachable to the triangles. It is contemplated that the left and right triangles of the rear suspension may not have a triangular form, but instead may have more or fewer than three sides. Additionally, the intersections of the sides or lengths of the triangles may not form defined apexes, but instead may define rounded, curved, or other-shaped intersections. The attachment of a portion of this rear frame structures or rear triangles to the front triangle in the manners (including obvious and equivalent variations thereof) described herein is contemplated.

Figure 8:
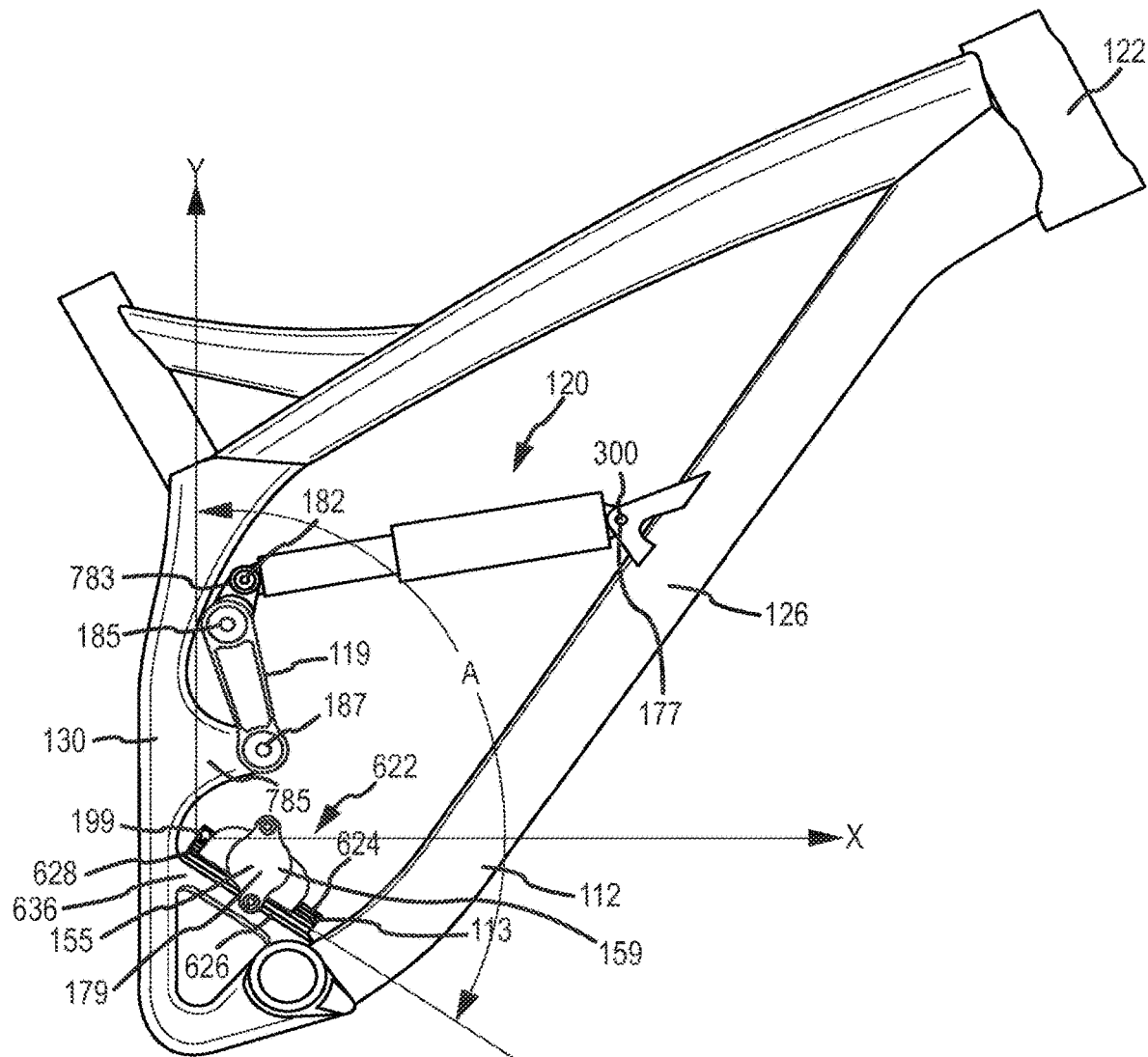
FIG. 8 is a right side view of the front frame and rear suspension system of the bicycle depicted in FIG. 1 with the rear frame removed.

As discussed above, the upper end portion of the rocker link 119 may be pivotally connected to the rear frame 114 via an axle 153 that extends between the triangles 152, 154. As shown in FIG. 8, which illustrates the front frame 112 with the rear frame 114 removed, the rocker link 119 may be bent such that it defines a boomerang-like shape, with a longer bottom section and a shorter top section. In other examples, the rocker link 119 may have other configurations. For example, the rocker link 119 may be completely straight or linear, circular, triangular, polygonal, and so on and so forth. In one example, the rocker link 119 may have a dog bone-type structure, in which two parallel linkages 780, 781, are connected by one or more horizontal components 782 that extend between the linkages 780, 781.

As best shown in FIG. 8, the top end of the rocker link 119 may be pivotally connected to a rear end of the shock assembly 120 and the bottom end of the rocker link 119 may be pivotally connected to a protruded portion 785 that protrudes forwardly from the seat tube 130 towards the front end of the bicycle, i.e., towards the head tube 122. As previously discussed, the middle portion of the rocker link 119 may be pivotally coupled to the top ends of the forward members 157 of the right and left triangles 152, 154 via an axle 153 that extends through each of the rocker link 119 and the forward members 157. Accordingly, the rocker link 119 may define three pivot axes 182, 185, and 187, with the first pivot axis 182 (located at the top of the rocker link 119) being the axis around which the shock 120 rotates around the rocker link 119, the second pivot axis (located in the middle of the rocker link 119) being the axis around which the right and left triangles 152, 154 rotate around the rocker link 119, and the third pivot axis 187 (located at the bottom of the rocker link 119) being the fixed pivot axis around which the rocker link 119 rotates relative to the seat tube 130.

As best shown in FIGS. 2, 3, 6, and 8, the forward end of the shock 120 may be pivotally connected to the down tube 126 via an axle 300 mounted on the forward end of the shock 120 and corresponding receiving apertures defined by the down tube 126. The shock 120 may thus rotate relative to the front frame 112 around a fixed pivot axis 177. As discussed, the bottom end of the shock 120 may be connected to the top end of the rocker link 119 via an axle 783 that extends through the linkages 780, 781 and through an aperture defined at the rear end of the shock 120. In one example, the shock 120 may be positioned in a substantially horizontal orientation. In other words, the shock 120 may be substantially parallel to the x-axis, or may define an angle that is between 0 and 45 degrees with respect to the x-axis. In other examples, the shock 120 may be oriented substantially vertically, i.e., such that it is substantially parallel to the y-axis when mounted to the down tube 126 and to the rocker link 119, or defines an angle that is between 45 and 90 degrees with respect to the y-axis.

In one example, the shock assembly 120 may include a piston shaft 306 and a cylinder body 315. Generally, compression of the shock assembly 120 causes the piston shaft 306 to be pushed in a forward direction into the cylinder body 315, for example, as the rear wheel 106 is displaced relative to the front frame 112. Fluid contained within the cylinder body 315 acts to dampen the movement of the piston shaft 306 within the cylinder body 315. As such, the shock 120 dampens the tensile and/or compressive forces exerted on the piston shaft 306. The shock assembly 120 may be placed in various stages of compression relative to the amount of forward force applied to an end of the shock assembly 120. For example, a larger forward force applied to the end of the shock assembly 120 may cause a longer length of the piston shaft 306 to be inserted into the cylinder body 315 than a smaller upward force. It is to be appreciated that shock assemblies are known in the art and that various types of shock assemblies and orientation can be utilized with the present disclosure. Some examples of shock assemblies include oil shocks, air shocks, spring return shocks, gas charged shocks, and so on.

In the suspension system shown in FIGS. 1-10I, the shock 120 is compressed through the rotation of the rocker link 119, which pushes the piston shaft 306 into the cylinder body 315 as it is rotated in a clockwise direction, i.e., towards the forward end of the bicycle, as oriented in the accompanying drawings. Notably, the structural configurations of the rear suspension system can be changed such that the link is rotated in a counter-clockwise direction (i.e., towards the rear end of the bicycle), rather than a clockwise direction. As one non-limiting example, the link may be attached to the top tube of the bicycle such that it extends downwardly, rather than upwardly. As the shock is returned to its uncompressed state, the piston shaft 306 is pushed rearwardly out of the cylinder body 315, which, in turn, causes rotation of the connected rocker link 119 in a counter-clockwise direction, i.e., towards the rear end of the bicycle.

As will further be discussed below, the rear end of the shock 120 travels along an arcuate travel path that is defined by the length of the rocker link 119, which rotates around a fixed pivot axis 187.

As best shown in FIGS. 2, 4 and 6-9, the suspension system further includes a guide rail 113 mounted on the front frame, and in this example extends between the down tube 126 and the seat tube 130 of the front frame. The guide rail 113 may be substantially linear, as is shown, or nonlinear, as may be the case in other examples. For example, the guide rail 113 may be bent along its length or may be curved. Other configurations of guide rails 113 are also possible. The guide rail 113 includes substantially flat top and bottom sides 624, 626 which are connected with and separated by right and left sides 628, 630. The right side 628 of the guide rail 113 includes a right groove 632, and the left side 630 of the guide rail 113 includes a left groove 634. As further discussed below, the grooves 632, 634 are adapted to receive one or more bearings (not shown) of a sliding body 622, which are configured to roll along the grooves 632, 634 on the sides of the guide rail 113, thereby allowing the sliding body 622 to slide back and forth along the guide rail 113. The guide rail 113 is joined to a guide rail support member 636 (shown in FIG. 8), which in this example is integrally formed with the front frame 112. In one example, the bottom surface of the rail 113 may be joined to the guide rail support member 636, such that the guide rail 113 does not move relative to the front frame 112 when joined to the guide rail support member 636. While the illustrated example includes a guide rail support member 636 that is integral to the frame 112, other examples may utilize a guide rail support member that is a separate part that is attachable to the front frame 112, e.g., to the down and seat tubes 126, 130.

Figure 9:
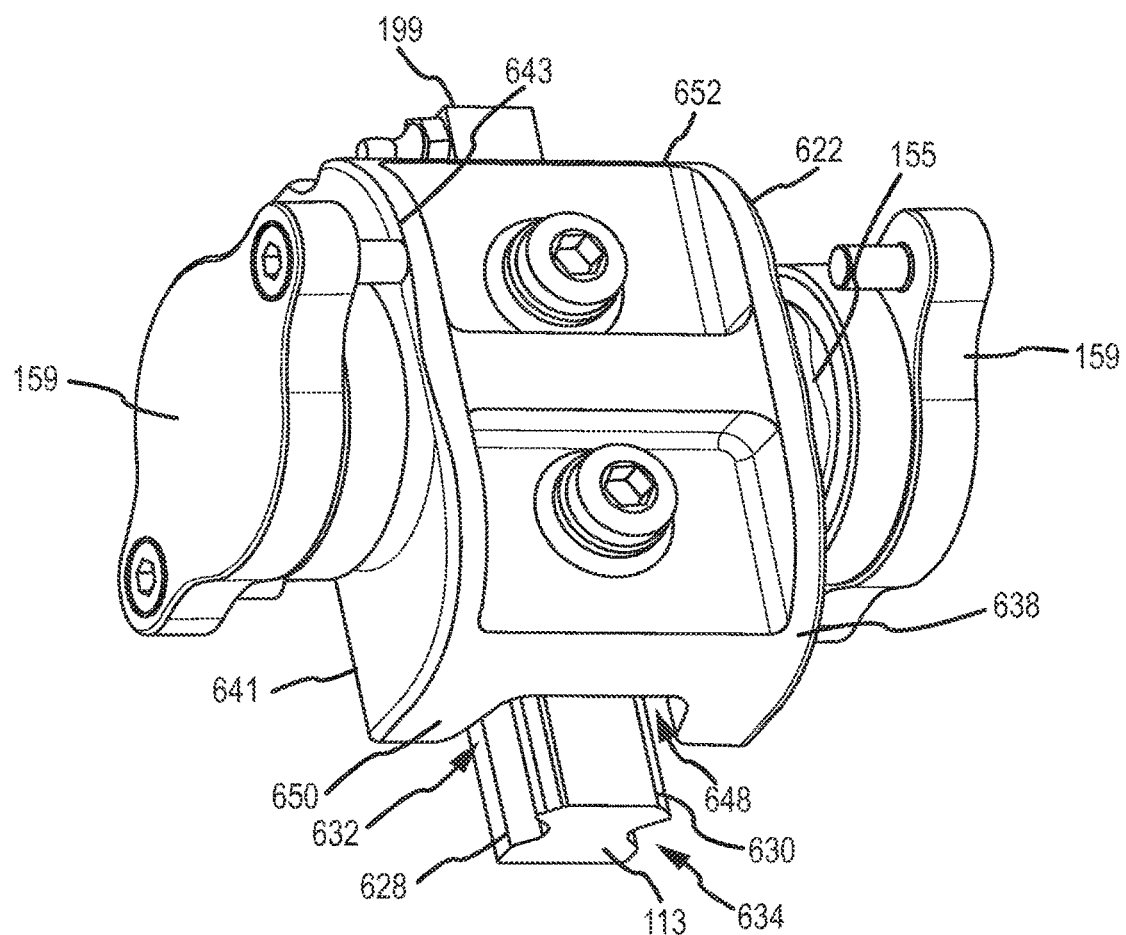
FIG. 9 is an isometric view of the sliding body and rail of the rear suspension system of the bicycle depicted in FIG. 1.

As best shown in FIG. 9, one example of the sliding body 622 includes a main body 638 having, in this example, an elongated block shape with a generally flat bottom side 641 and a curved top side 643. As discussed above, a slot 648 in the bottom side 641 of the slider main body 638 extends from a front side 650 to a rear side 652, and is adapted to receive a portion of the guide rail 113. The guide rail 113 may also include one or more brackets 199 mounted at the front and rear ends of the rail 113 that prevent the sliding body 622 from moving past the ends of the guide rail 113 and separating from the guide rail 113. For example, the brackets 199 may be configured such they that do not fit within the slot 648 defined in the sliding body 622, and instead make contact with the rear 652 and/or front 650 faces of the sliding body 622 as it approaches the ends of the rail 113.

As shown in FIG. 8, the guide rail 113 (and the guide rail support member 636) may extend at an angle A relative to the y-axis of FIG. 8. The angle may be, for example, an acute angle or an obtuse angle. Alternatively, the guide rail 113 may be oriented such that it is substantially parallel to the x-axis. In other examples, the guide rail 113 may be oriented substantially vertically, i.e., such that it is substantially parallel to the y-axis. As discussed above, the orientation of the guide rail 113 serves to define the travel path of the sliding body 622, which moves along the rail 113, as the shock 120 is compressed. The rail 113 may be straight, as shown, or may be curved in one or more directions.

As shown, the rail 113 and guide rail support member 636 may extend diagonally between the down and seat tubes 126, 130, such that the rear end of the rail 113 (the end closest to the seat tube 130) is positioned such that it is higher than the forward end of the rail 113 (the end closest to the down tube 126). Accordingly, the rail 113 may be oriented such that it is slanted or sloped downwardly towards the front end of the bicycle. When the rail is positioned such that it slopes down, the sliding body 622 may naturally gravitate towards the forward or front end of the bicycle due to gravitational forces. In other examples, the rail 113 may be otherwise positioned. For example, the rear end of the rail 113 (the end closest to the seat tube 130) may be positioned such that it is lower than the front end of the rail 113 (the end closest to the down tube 126), such that the rail 113 is slanted or sloped upwardly towards the front end of the bicycle. When the rail 113 is positioned such that it slopes up, the sliding body 622 may naturally gravitate towards the rear or back end of the bicycle due to gravitational forces. In further examples, the rail 113 may be relatively level, such that it is not slanted or sloped relative to the x- or y-axes. In such examples, the sliding body would not be inclined to move towards either the front or rear end of the bicycle without the assistance of additional forces imparted by the rear frame 114.

As previously discussed, the sliding body 622 may be coupled with the rail 113 through bearings supported in the groove 648 of the main body 638. In such embodiments, the sliding body 622 can include seals and/or wipers to help prevent dust and dirt from reaching the bearings inside the main body 638. It is to be appreciated that various types of seal assemblies can be used with the sliding body 622 to provide various degrees of protection to the bearings. For example, in one embodiment, the seal assemblies include a metal scraper for removing large particles from the guide rail and a laminated contact scraper for removing fine dust and fluids. Other embodiments include lubricators to lubricate the bearings and guide rail. It is also to be appreciated that the guide rail and sliding body can be made from various types of materials. For example, in one embodiment, the guide rail is made from carbon steel. In another embodiment, the sliding body is made from carbon steel and includes a black chrome coating. As such, various combinations of sliding bodies and rails can be used with the rear suspension system and is not limited that which is depicted and described herein. For example, the sliding body may be a slider link, as shown, or may be some other type of sliding body.

As previously discussed, the sliding body 622 may be pivotally connected to the bottom end portions of the forward members 157 of the right and left triangles 152, 154 via an axle 155 that runs between the forward members 157. In some examples, the ends of the axle 155 may be capped by two end caps 159, which are joined to each of the forward members 157 and allow for rotation of the caps 159 around the axle 155. The end caps 159 may be joined to the forward members 157 such that they do not move relative to the forward members 157 as the right and left triangles 152, 154 are deflected via forces impacting on the rear wheel 106, and instead rotate with the forward members 157. The end caps 159, along with the forward members 157, may be configured to rotate around a common pivot axis 179.

Figure 10C:
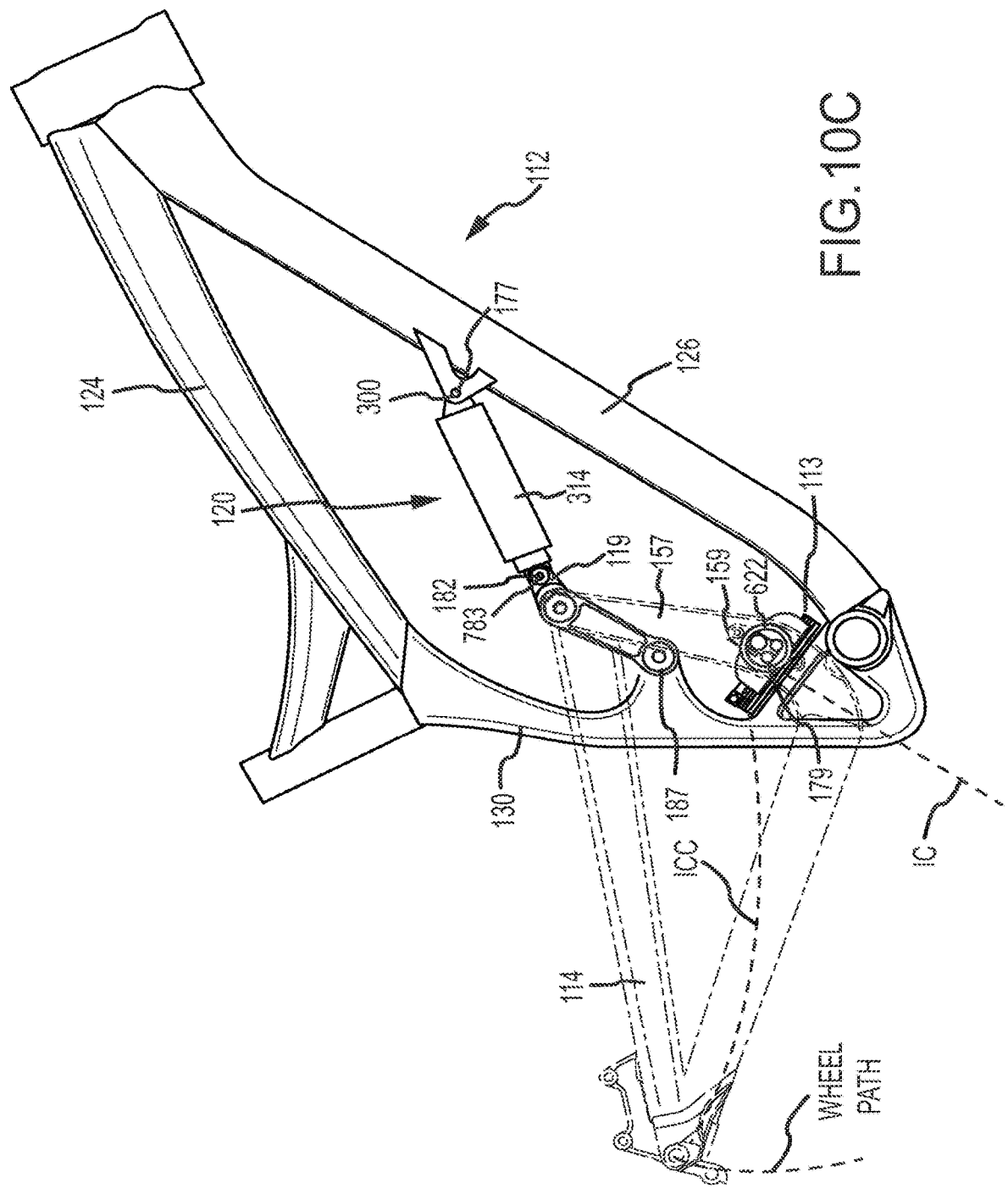
FIG. 10C is a right side view of the front frame and rear suspension system depicted in FIG. 1 in a fully compressed stage, with the rear frame shown in dashed lines.
Figure 10D:
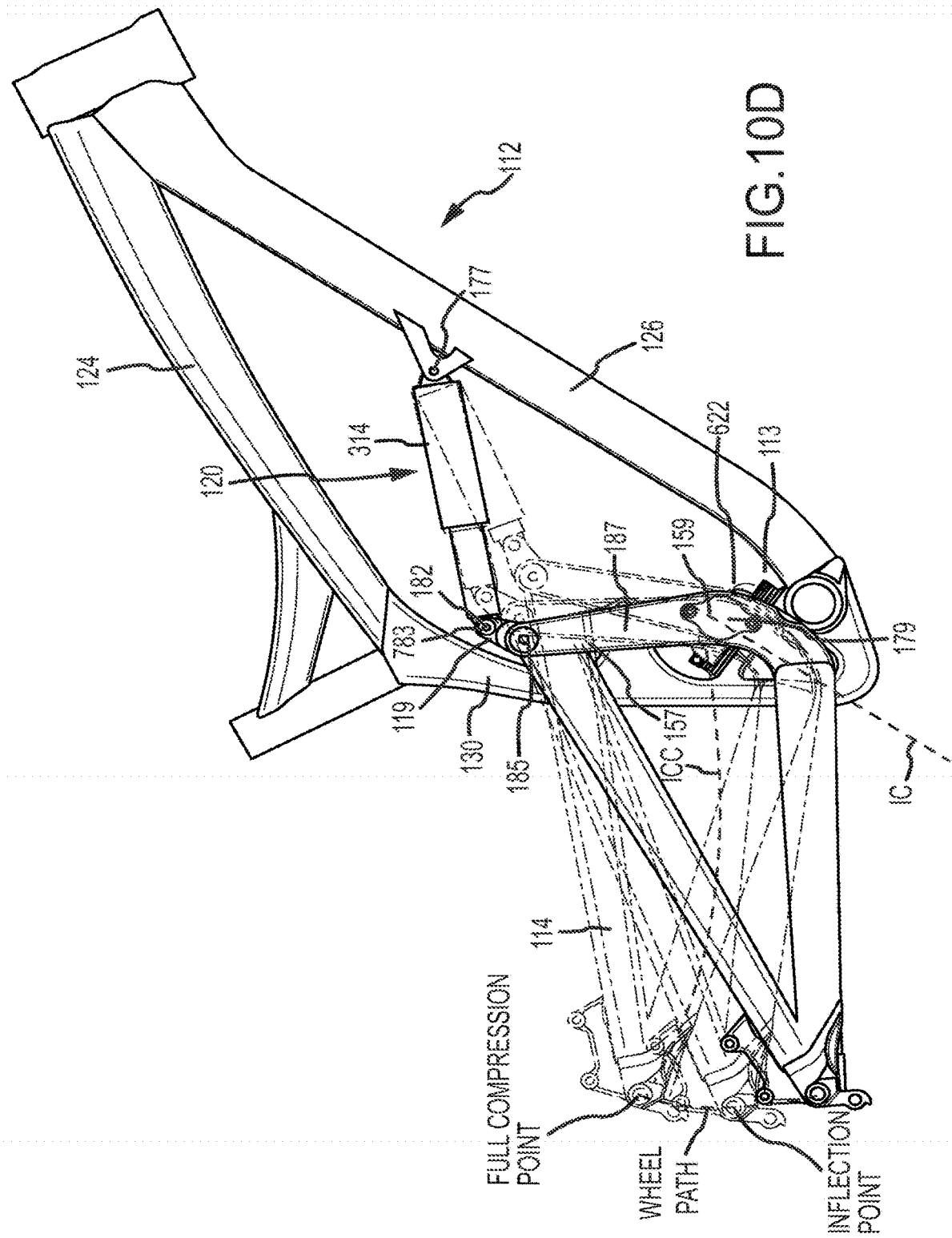
FIG. 10D is a right side view of the front frame and rear suspension system depicted in FIG. 1 in an uncompressed stage shown in solid lines, in a partially compressed stage shown in dashed lines, and in a fully compressed stage shown in dashed lines.

As the rear suspension system is displaced along with the rear wheel 106, the sliding body 622 may move back and forth along a portion of the length of the guide rail 113. FIG. 10D, which illustrates a comparison of FIGS. 10A-10C, shows how the sliding body 622 can move along the length of the guide rail 113. More particularly, FIG. 10A shows the rear suspension system in an uncompressed stage, FIG. 10B shows the rear suspension system in a partially compressed stage, and FIG. 10C shows the rear suspension system in a fully compressed stage. As will be further discussed below, partial compression of the shock 120 first causes the sliding body 622 to move rearwardly along the rail. As such, the sliding body 622 is shown in FIG. 10B as positioned closer to the rear end portion of the guide rail 113 than in FIG. 10A. Further compression of the shock (i.e., from partial to full compression), causes the sliding body 622 to switch directions along the rail, such that it begins to move forwardly, rather than rearwardly. As such, FIG. 10C shows the sliding body 622 positioned closer to a front end portion of the guide rail 113 than in FIG. 10B. Through this compression of the suspension between relatively uncompressed to compressed positions, the rocker link rotates in one direction (clockwise, relative to FIG. 10A et seq.). As the sliding body 622 moves back and forth along the guide rail 113, the ball bearings in the slider main body 638 roll back and forth along the grooves 632, 634 in the sides 628, 630 of the guide rail 113. It is to be appreciated that various types of bearings (including friction slider bearings, or none at all) may be used to movably couple the sliding body 622 with the guide rail 113.

Although the bearings in the sliding body 622 are free to roll back-and-forth along the right and left sides 628, 630 of the guide rail, forces acting on the rear suspension system 540 can result in forces that act on the sliding body 622 in upward, downward, and lateral directions. Should the sliding body 622 be subjected to forces in a lateral direction, either right or left with respect to the guide rail 113, the bearings and the inner surfaces along the slot 648 of the main body 638 will engage respective right and left sides 628, 630 of the guide rail 113, which will act to prohibit the sliding body from disengaging the guide rail. Further, in response to upward and downward forces exerted on the sliding body 622, the bearings and the inner surfaces along the slot 648 of the main body 638 will engage the upper and lower edges of the grooves 632, 634 on the sides 628, 630 of the guide rail 113. In this manner, the sliding body 622 is prevented from disengaging the guide rail.

As shown in FIGS. 10A-10D, the rocker link 119 may be pivotally coupled to each of the rear end of the shock assembly 120, forward members 157 of the rear frame 114, and the protruded portion 785 of the seat tube 130. As the shock 120 is compressed, the rocker link 119 pivots relative to the seat tube 130 around fixed pivot axis 187, such that the top ends of the forward members 157 of the rear frame 114 travel forwardly along an arcuate path defined by the upper end portion of the link 119. Similarly, the bottom end of the shock assembly 120 travels forwardly along a second arcuate path that may be parallel to the arcuate path traveled by the top ends of the forward members 157.

FIGS. 10A-10C and 10E-10H illustrate the relative motion of the shock 120, link 119, sliding body 622, and rear frame 114 relative to the front frame 212 as the shock 120 is compressed. Specifically, FIGS. 10A and 10F illustrate the rear suspension system 102 when the shock 120 in an uncompressed state, FIGS. 10B and 10G illustrate the rear suspension system 102 when the shock 120 is in a partially compressed state, and FIGS. 10C and 10H illustrate the rear suspension system 102 when the shock 120 is in a fully compressed state. FIG. 10D illustrates a comparison of the three states shown in FIGS. 10A-10C, with the shock 120 shown in the uncompressed state in solid lines, as well as in the partially and fully compressed states in dashed lines. A comparison of FIGS. 10A and 10F with FIGS. 10B and 10G illustrates that partial compression of the shock 120 causes the rocker link 119 to pivot in a clockwise direction around fixed pivot axis 187. The pivot axis 182 located at the top end of the link 119, and the pivot axis 185 located along the length of the link 119 are configured to move along arcuate paths defined by the rotation of the link 119 around the fixed pivot axis 187. The rear end of the shock 120 and the top end of the rear triangle 114, which are coupled to the rocker link 119 at the pivot axes 182, 185, are also configured to move along the arcuate paths defined by the pivot axes 182, 185. At the same time, the sliding body 622 is configured to travel in a rearward direction, such that the pivot axis 179 defined between the sliding body 622 and the rear frame 114 travels backwardly along the linear path defined by the rail 113.

A comparison of FIGS. 10B and 10G with FIGS. 10C and 10H illustrates that further compression of the shock 120 due to impaction forces on the bicycle causes the rocker link 119 to rotate further in a clockwise direction around the fixed pivot axis 187, such that the shock 120 is also rotated in a counterclockwise direction around fixed pivot axis 177. Additionally, the sliding body 622 is configured to switch directions, such that the pivot axis 179 defined between the sliding body 622 and the rear frame 114 travels forwardly along the linear path defined by the rail 113.

Extension of the shock assembly 120 would result in the reverse motion of the components of the system 102. Decompression or extension of the shock assembly 120 from a fully compressed to a partially compressed state causes the rocker link 119 to rotate in a counter-clockwise direction around the fixed pivot axis 187. Additionally, the sliding body 622 would travel rearwardly along the linear path defined by the rail 133. Further decompression or extension further causes the rocker link 119 to rotate further in a counter-clockwise direction around the fixed pivot axis 187. Additionally, the sliding body 622 is configured to switch directions, such that it travels forwardly along the linear path defined by the rail 133.

Figure 10E:
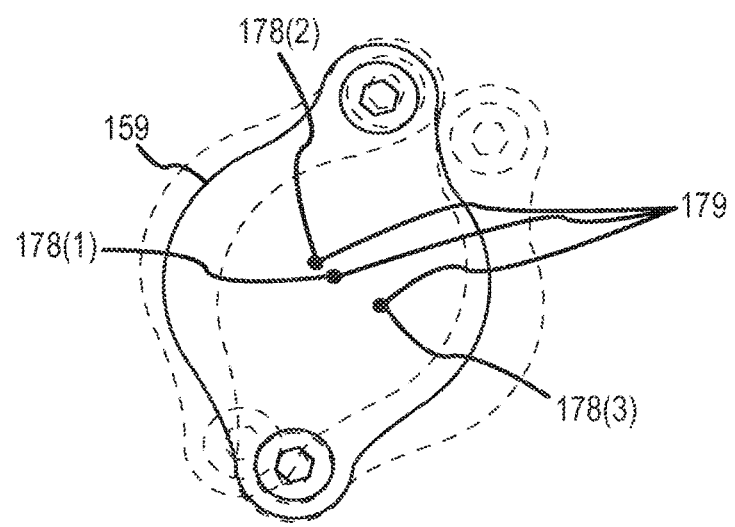
FIG. 10E illustrates a right side view of a portion of an end cap of the sliding body in an uncompressed stage shown in solid lines, in a partially compressed stage shown in dashed lines, and in a fully compressed stage shown in dashed lines.
Figure 10I:
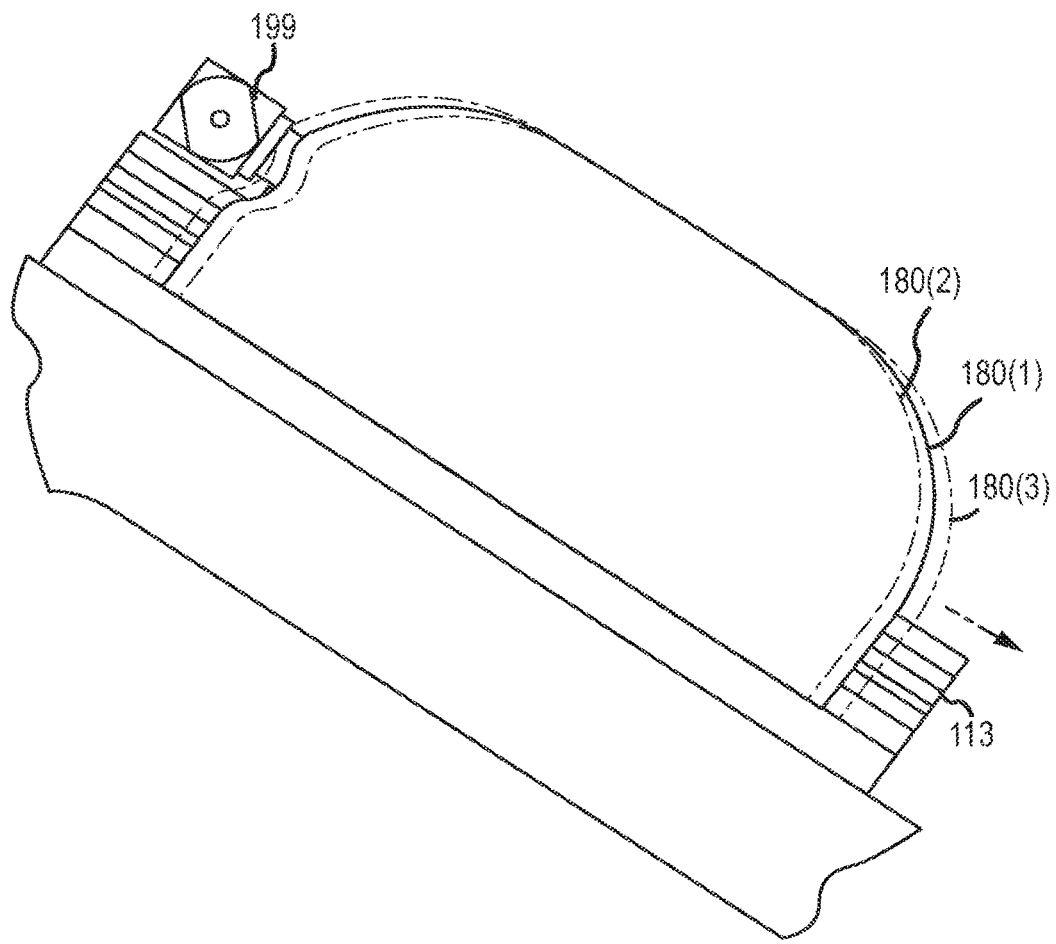
FIG. 10I is a right side view of the sliding body and rail in various stages of compression.

FIG. 10E illustrates a magnified view of the end cap 159, as well as pivot axis 179 of the cap 159 around the sliding body 622. As discussed above, the sliding body 622 may be configured to travel in both backwards and forwards directions along the substantially linear path (in this example) defined by the rail 113 as the shock 120 transforms between the uncompressed and fully compressed states. In other words, the sliding body 622 and the attached portion of the rear frame 114 are configured to move both backwards and forwards along the linear path as the rear wheel travels along the full wheel path during one of compression or extension of the shock 120. The back and forth motion of the sliding body 622 and rear frame 114 are best shown in FIGS. 10E and 10I. In FIG. 10E, the position of the pivot axis 179 of the cap 159 around the sliding body 622 as the shock is being compressed is represented by numerals 178(1), 178(2), 178(3). Prior to compression of the shock, the pivot axis 179 of the cap 159 is located at a first position 178(1) along the guide rail 113. As the rear wheel moves upwardly along the wheel path, which is illustrated in FIG. 10D, the sliding body 622 initially moves rearwardly and upwardly along the linear path defined by the rail 113. At the same time, the top end of the rear frame 114 travels forwardly along the arcuate path defined by the link 119. The radius of curvature of the wheel path continually decreases as the rear wheel travels upwardly, resulting in a wheel path that is increasingly curved or concave. Once the sliding body 622 reaches a transition position 178(2), the link 622 switches directions along the rail 113 such that it begins to travel in the opposite direction (in this case, downwardly and forwardly) along the linear path defined by the rail 113.

It should be noted that the transition position 178(2), or the point at which the sliding body 622 switches directions and re-traces its path on the rail 113 in the opposite direction, is created by the structural and dimensional configuration of the components of the rear suspension system, and may be designed to occur at a desired or select position along the reciprocating motion of the sliding body along the rail to obtain the resulting suspension performance. In other words, the sliding body 622, which initially moves in a rearward and upward direction, and continues to be subjected to forces in the rearward direction, but is pulled forwardly and downwardly by the compression of the shock to a third position 178(3), which is the position 178(3) of the pivot axis 179 of the end cap 159 when the shock is fully compressed. Accordingly, the sliding body 622 and the attached portion of the rear frame 114 are configured to initially move (1) rearwardly and upwardly, and then switch directions such that they move (2) forwardly and downwardly along the linear path defined by the rail 113 during a single compression or extension of the shock 120. While the inflection point or transition is not directly felt by a rider on the bicycle, the rear suspension system allows for better or defined or desired absorption of forces impacting on the rear wheel, and allows for a more comfortable riding experience.

In the illustrated example, the sliding body 622 may first move rearwardly and upwardly along the rail 113 for approximately 2.77 mm as the shock 120 moves from a fully extended to a partially compressed state, and then may switch directions and travel forwardly and downwardly along the rail 113 for 5.72 mm as the shock 120 moves from a partially compressed state to a fully compressed state. In other words, the sliding body 622 may travel for a total of 8.49 mm along the rail 113 in the illustrated example, with the sliding body 622 traveling almost twice as far when shock 120 moves from the partially compressed to fully compressed states. In other examples, the structural connections of the rear suspension system may be adjusted, such that the sliding body 622 travels further when the shock is initially compressed, or substantially equal distances when the shock is initially compressed as when the shock moves from the partially to fully compressed states.

In other embodiments, the mounting points and configurations of the link 119, shock, 120, and rail 113 may be adjusted so that the sliding body 622 moves forwardly and downwardly first, and then rearwardly and upwardly along the linear path. Alternatively, in further embodiments, the mounting points and configurations of the link 119, shock, 120, and rail 113 may be adjusted such that the rail 113 may be upwardly sloped such that its rear end is positioned lower than its front end. In such embodiments, that the sliding body 622 may move forwardly and upwardly first, and then rearwardly and downwardly along the rail 113, or vice versa. Many permutations of the orientation of the rail are contemplated, with the forward-rearward movement of the sliding body along the rail during the compression stroke of the rear suspension being evident in at least one aspect of the present disclosure.

While the curvature or concavity of the wheel path does not change sign in the above-described example, the structural and/or dimensional configuration of the components of the rear suspension system can be adjusted in other examples, such that the curvature or concavity of the wheel path changes sign as the wheel travels along the wheel path. In such examples, the rear wheel may hit an inflection point (or particular location) along the wheel path as the curvature or concavity of the wheel path changes sign, and the sliding body may simultaneously reach the transition position, such that the link switches directions along the rail. Other factors than the wheel path curvature changing sign may define a transition position of the sliding body also.

FIG. 10I illustrates the position of the sliding body 623 along the rail 113 as the shock 120 is being compressed. As is shown, the sliding body 623 may be in a first position 180(1) along the rail prior to compression of the shock. As the shock 120 is compressed, the rail 113 may be pulled rearwardly and upwardly along the rail 113 until the link 623 reaches a second transition position 180(2), which is the point at which the sliding body 623 begins to switch directions along the rail 113. As the shock 120 is further compressed, the sliding body 623 may be pulled downwardly and forwardly until the shock is fully compressed 120, at which point the sliding body 623 is positioned at a third position 180(3) along the rail 113. It should be noted that the illustrated positions 180(1)-180(3) are only one example of a travel path of the sliding body 623, and that other embodiments may result in other travel paths. For example, in other embodiments, the sliding body 623 may first be pulled downwardly and forwardly, rather than rearwardly and upwardly. In further embodiments, the rail 113 may be otherwise oriented relative to the front frame such that the sliding body 623 may be pulled in different directions.

As shown in FIGS. 10E and 10I, the travel path of the end cap pivot axis 179 may have a larger horizontal component than a vertical component. In other words, the distance traveled in the rearward or forward directions may be greater than the distance traveled in the upward or downward directions. In other embodiments, the mounting points and configurations of the link 119, shock, 120, and rail 113 may be adjusted such that the travel path of the sliding body 622 has a larger vertical component than a horizontal component. In such embodiments, the distance traveled in the upward or downward directions may be greater than the distance traveled in the rearward or forward directions.

The ICC and the IC for this example may vary and migrate throughout the path traveled by the wheel. The IC is the point for the rear frame 114 as it is undergoing planar movement, i.e., during wheel travel, which has zero velocity at a particular instant of time. At this instant the velocity vectors of the trajectories of other points in the rear frame generate a circular field around the IC, which is identical to what is generated by a pure rotation. The ICC, as used herein, refers to the ICC with respect to the center point of the rear wheel axle. The ICC can be derived from the radius of curvature at given point along wheel path, or the radius of a circle that mathematically best fits the curve of the wheel path at that point. The center point of this circle is the ICC. As shown in FIG. 10D, the ICC and the IC move in different directions, with the IC defining a substantially straight line that extends downwardly and rearwardly from the sliding body 622 and the ICC defining a curve that extends rearwardly from the sliding body 622. Referring to FIG. 10D, the curve defined by the ICC becomes increasingly concave as the rear wheel travels upwardly, resulting in the aforementioned wheel path in which the curvature of the path changes as the wheel approaches the highest point in its path. Notably, the distance traveled by the wheel in the y-direction is very large as compared to the distance traveled by the sliding body 622 along the x-axis.

FIGS. 11-21 illustrate another embodiment of a rear suspension system 202 according to a second example. More particularly, FIG. 11 is a right side view showing a front frame 212, rear suspension system 202, and rear frame 214 of a bicycle. Although not depicted in FIG. 11, it is to be appreciated that the bicycle shown in FIG. 11 can include other component parts as described above with reference to FIG. 1, such as the front wheel, steering system, seat, pedals, and so on.

As is shown, the rear suspension system 202 includes a front frame 212 coupled with a rear frame 214 through a rear suspension system 202 including a rocker link 219, as well as sliding body assembly 210 that includes a mount 290 supporting a sliding body 288. Like the rear suspension system 102 shown and described in FIGS. 1-10I, the rear suspension system 202 also includes a shock assembly 220 operably connected between the front frame 212 and the rear frame 214. The shock assembly 220 may be similar to the shock assemblies described above.

Figure 13:
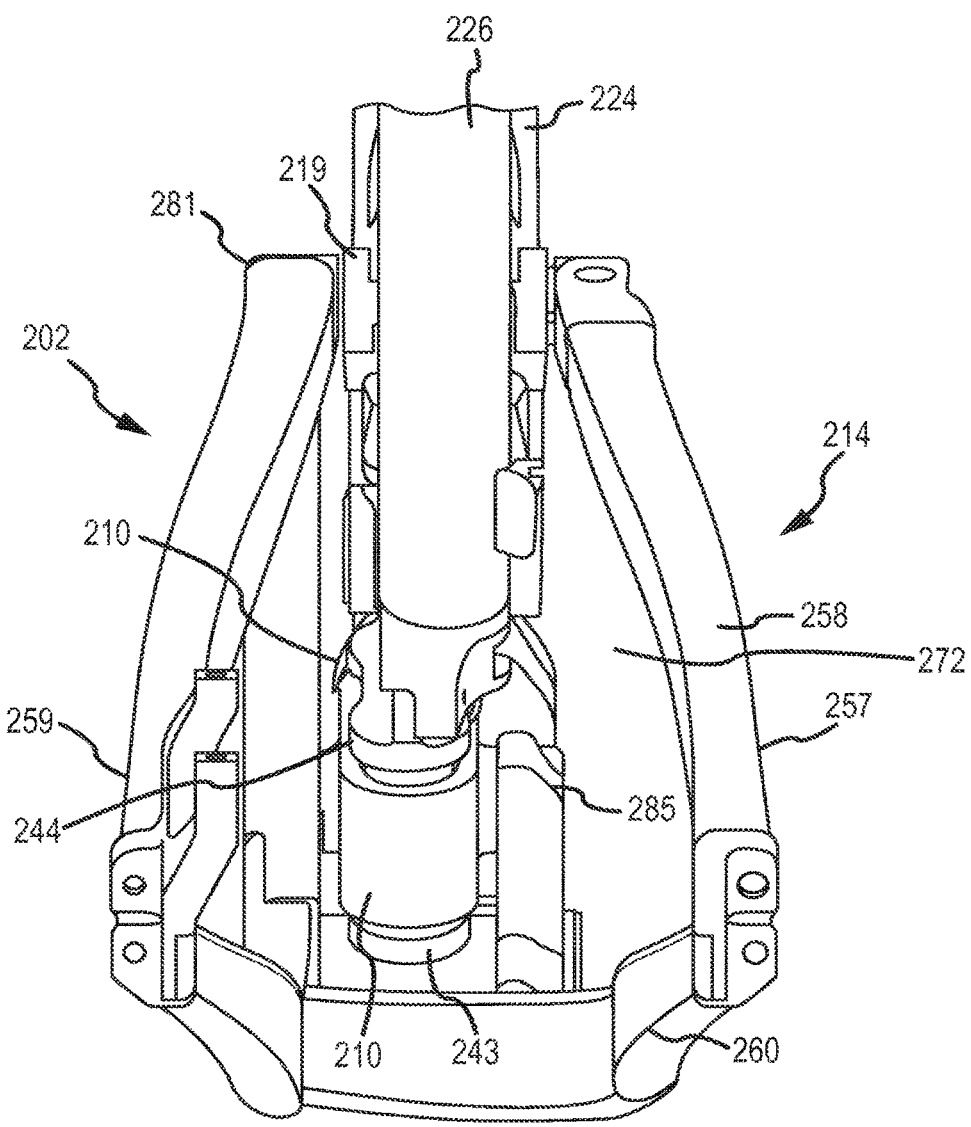
FIG. 13 illustrates a rear view of the front frame and rear suspension system shown in FIG. 11.
Figure 14:
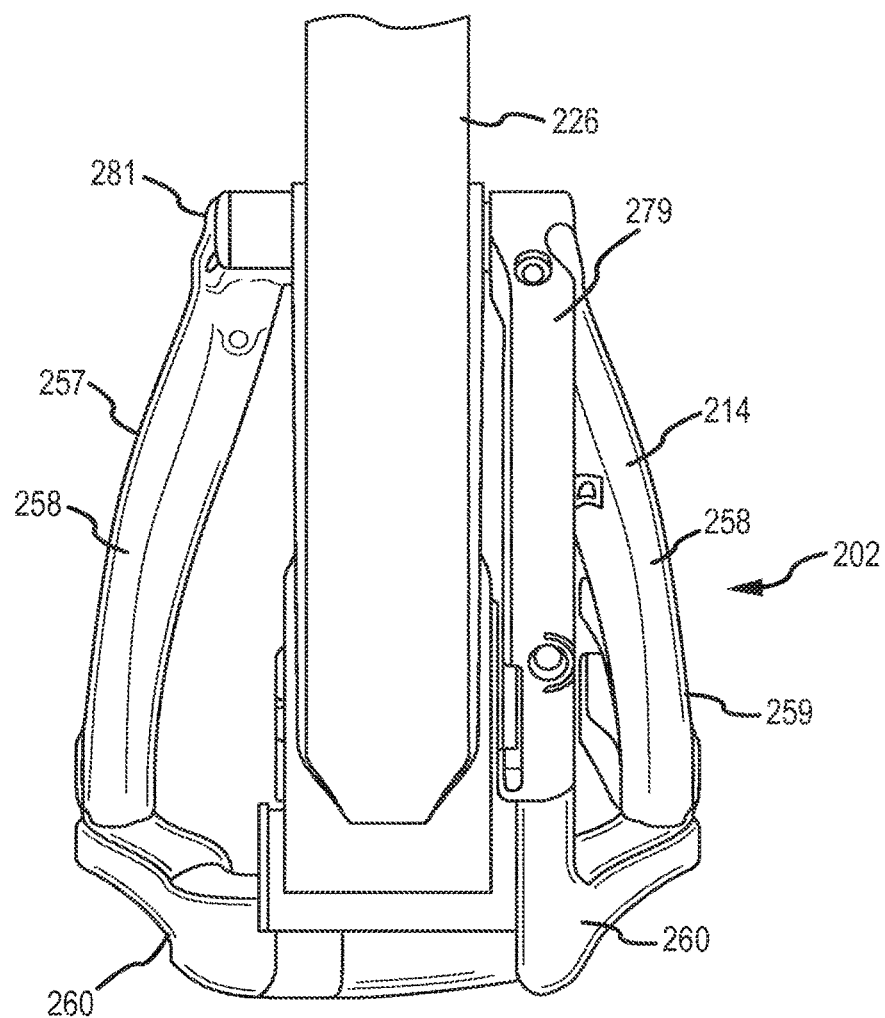
FIG. 14 illustrates a front view of the front frame and rear suspension system shown in FIG. 11, with the seat tube removed.

Similar to the rear suspension system 102 shown and described in FIGS. 1-10I, the front frame 212 may include a top tube 224, seat tube 230, and a down tube 226 defining a bottom bracket 240. As shown in FIGS. 11-13, the right side of the rear frame 214 may define a partial right rear triangle 257 including a chain stay 260, a seat stay 258, and a broken forward member 279 that extends upwardly from the front end of the chain stay 260 towards the front end of the seat stay 258. As is shown, the forward member 279 of the partial right triangle 257 may terminate at an area between the front ends of the chain stay 260 and the seat stay 258, rather than connecting the chain stay 260 and the seat stay 258. The left side of the rear frame 214 may define a left rear triangle 259 including a chain stay 260, a seat stay 258, and a forward member 279 extending between the chain stay 260 and the seat stay 258. In some examples, the rear suspension system 202 may also include a derailleur structure (not shown), which may be coupled to the front and rear frames 212, 214, as well as to a chain (not shown) and multiple sprockets (not shown) of different sizes to move the chain from one sprocket to another for maintaining proper tension in the chain while allowing for variations in chain stay length at the same time. As noted above, the rear frame portion of this and any previous and later described examples may not have triangular shapes despite being referred to as triangular herein, unless otherwise provided.

The right and left rear triangles 257, 259 may be coupled to each other via two axles 281 and 285, which extend across the rear frame 214 to connect the triangles 257, 259. As best shown in FIGS. 15-21, the top ends of the right and left rear triangles 257, 259 may be connected by the first axle 281, which may be located at the top end of the forward member 279 of the left rear triangle 259 and the forward end of the seat stay 258 of the partial right rear triangle 257. The first axle 281 may extend between the two triangles 257, 259 and through and adjacent, near or at an upper end portion of a rocker link 219, that is sandwiched between the triangles. In some examples, the first axle 281 may extend in a direction that is orthogonal to the direction of extension of the right and left rear triangles 257, 259. The second axle 285 may be located at, near, or adjacent to, the bottom end of the forward member 279 of the left rear triangle 259 and at, near or adjacent to, the top end of the broken forward member 279 of the right rear triangle 257, and may extend through a sliding body 288 that is positioned between the forward members 279. Like the first axle 281, the second axle 285 may extend in a direction that is orthogonal to the right and left rear triangles 257, 259. Each axle 281, 285 may be integrally formed with the triangles 257, 259 or may be formed as separate parts attachable to the triangles 257, 259.

The bottom end of the rocker link 219 that is positioned between the triangles 257, 259 may be pivotally connected to the sliding body mount 290 via a third axle 284, which is not directly connected to the rear frame 214. Similar to the first example, the rocker link 219 may have a dog bone-type structure, in which two parallel linkages are connected by one or more horizontal components that extend between the linkages. In some examples, the sliding body mount 290 to which the rocker link 219 is connected may be fixedly joined to the seat and down tubes 230, 226 of the front frame 212, such that it does not move relative to the front frame 212 as the rear wheel is deflected. As such, the third axle 284 may be fixed in position as the suspension system is compressed. As previously mentioned, the mount 290 may further be configured to support a sliding body 288 that is configured to move relative to the mount 290 and the front frame 212 in response to deflection of the rear wheel. The mount 290 and the front frame 212 may be separate components that are joined together, as shown, or, may be integrally formed.

Figure 15:
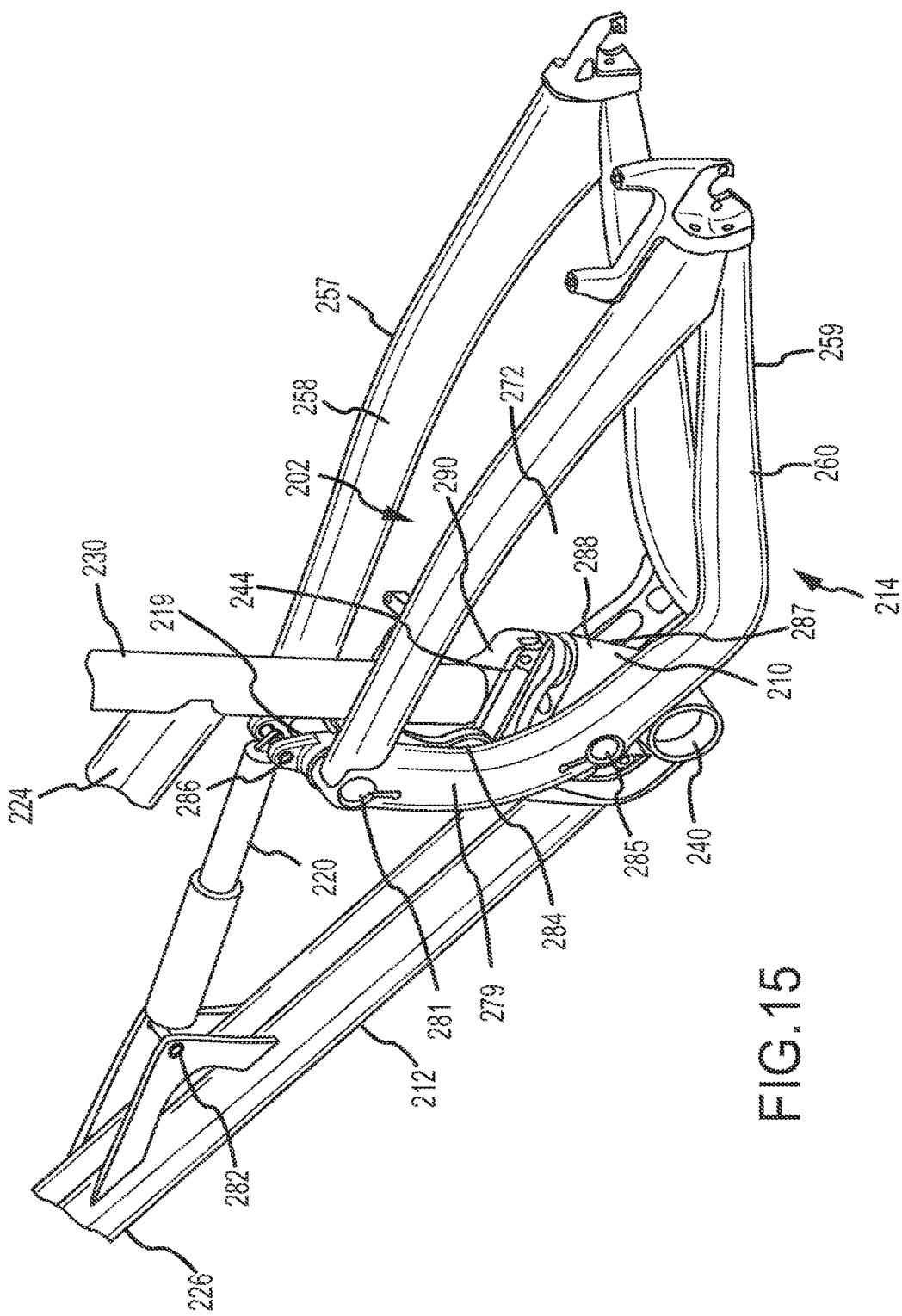
FIG. 15 illustrates a rear left perspective view of the front frame and rear suspension system shown in FIG. 11.

As best shown in FIG. 15, the top end of the rocker link 219 may further be pivotally connected to one end of the shock assembly 220 via a fourth axle 286. As previously discussed, the upper end portion of the rocker link 219 may be pivotally coupled to the right and left rear triangles 257, 259 via the first axle 281, and the bottom end of the rocker link 219 may be pivotally coupled to the sliding body mount 290, which is fixedly joined to the front frame 212, via the third axle 284, which extends through each of the rocker link 219 and the sliding body mount 290. Accordingly, the rocker link 219 may define three pivot axes 281, 286, 284, with the first pivot axis 286 (located at the top of the rocker link 219) being the axis around which the shock assembly 220 rotates relative to the rocker link 219, the second pivot axis 281 (located below the first pivot axis 286) being the axis around which the right and left rear triangles 257, 259 rotate relative to the rocker link 219, and the third pivot axis 284 (located at the bottom of the rocker link 219) being the fixed pivot axis around which the rocker link 219 rotates relative to the mount 290 and the front frame 212. While shown as three separate pivot axes in this and previous examples, it is contemplated that the pivot points 281 and 286 may be common, or may be reversed (e.g. with pivot point 281 being above pivot point 286 or further from pivot point 284) in order to obtain a desired suspension performance.

As best shown in FIGS. 11-19, the forward end of the shock assembly 220 may be pivotally connected to the down tube 226 of the front frame 212 via a fifth axle 282 mounted on a shock attachment portion. The shock assembly 220 may thus rotate relative to the front frame 212 around a fixed pivot axis defined by the fifth axle 282. As discussed above, the rear end of the shock assembly 220 may be connected to the top end of the rocker link 219 via the fourth axle 286 that extends through the rocker link 219 and the rear end of the shock assembly 220. In one example, the shock assembly 220 may be positioned in a substantially horizontal orientation. In other words, the shock assembly 220 may be substantially parallel to the x-axis, or may define an angle that is between 0 and 45 degrees with respect to the x-axis. In other examples, the shock assembly 220 may be oriented substantially vertically, i.e., such that it is substantially parallel to the y-axis or defines an angle that is between 0 and 45 degrees with respect to the y-axis when mounted to the down tube 226 and to the rocker link 219.

Figure 16:
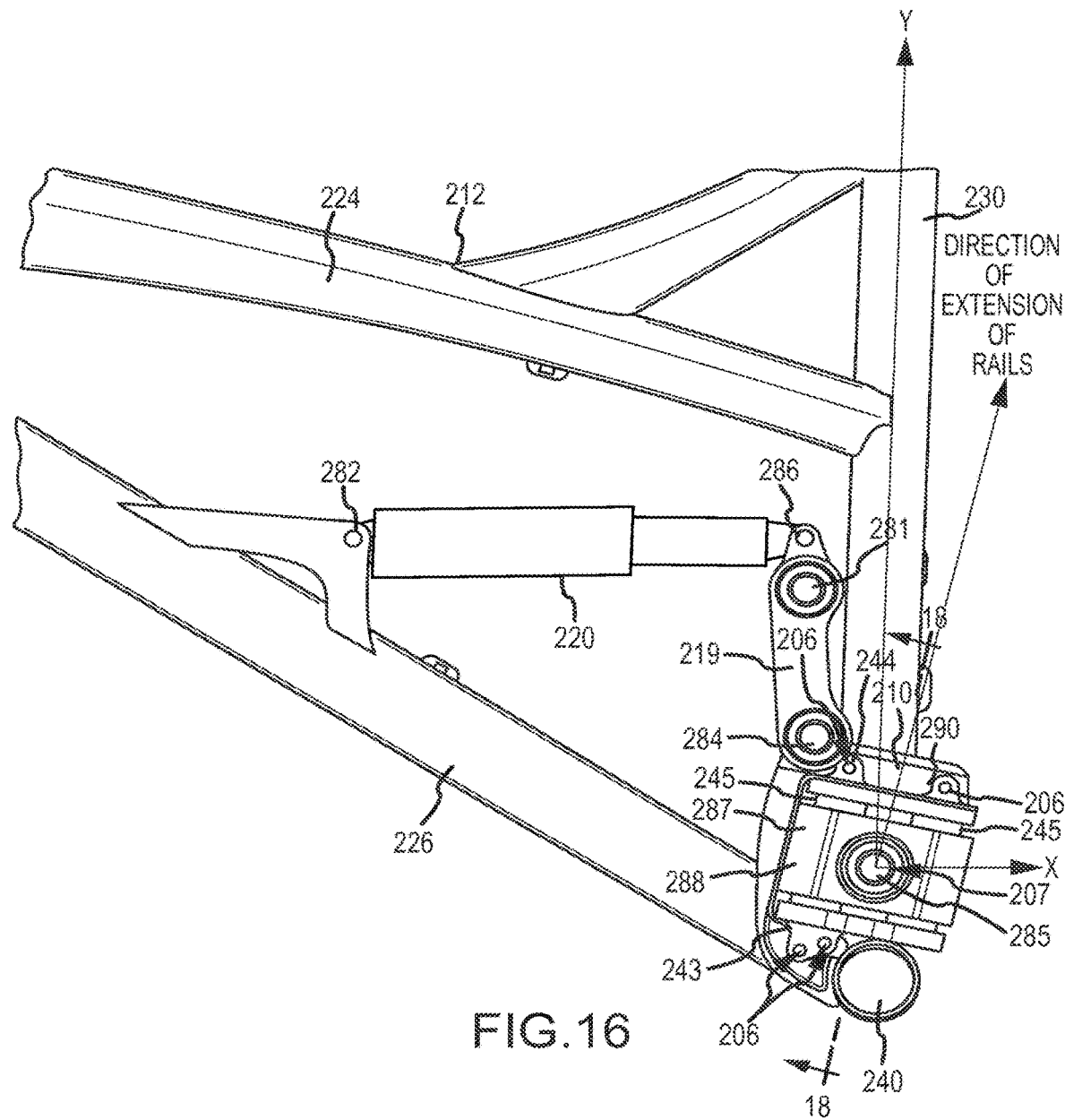
FIG. 16 illustrates a left side view of the front frame and rear suspension system shown in FIG. 11, with the rear frame removed.
Figure 17:
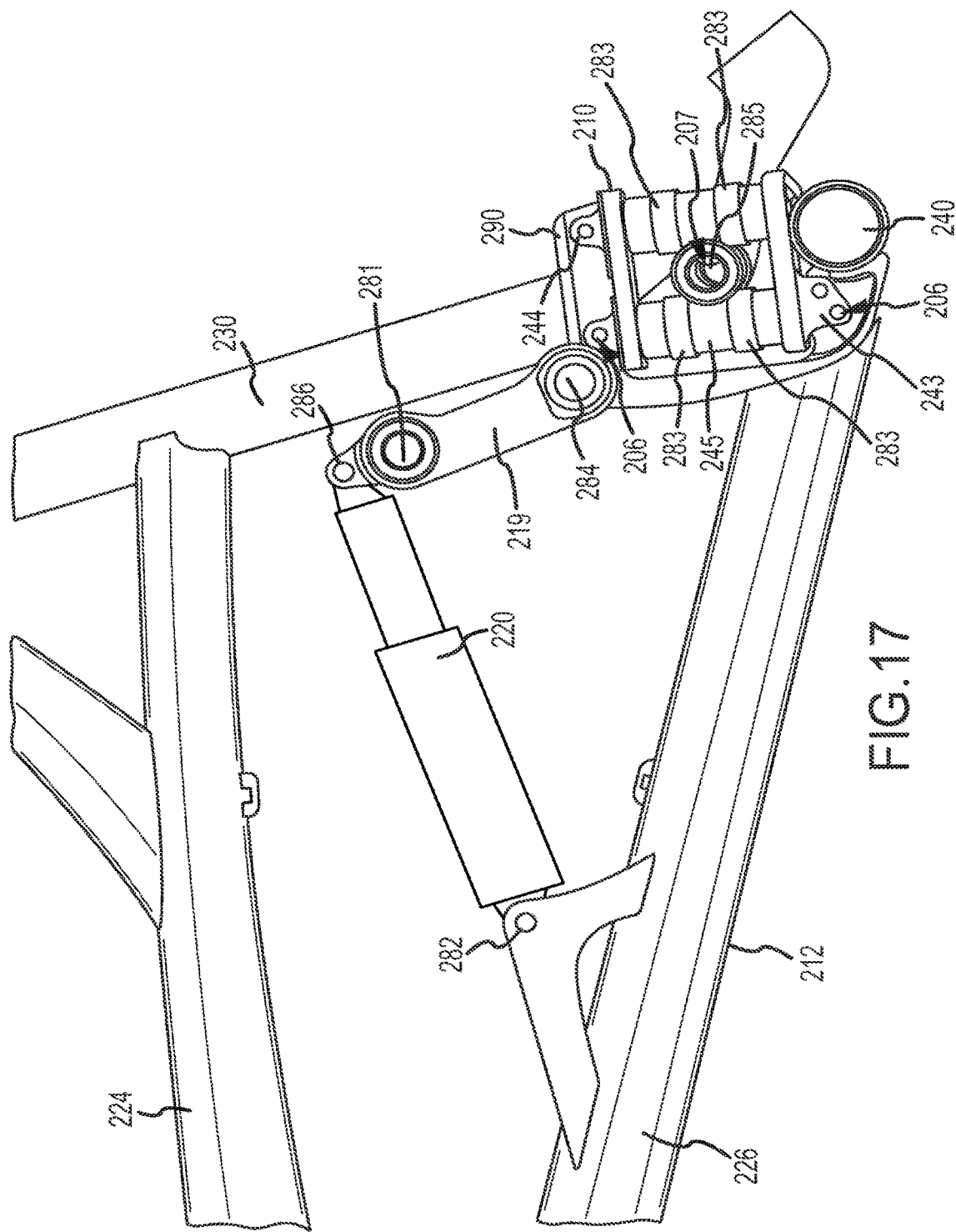
FIG. 17 illustrates a left side view of the front frame and rear suspension system shown in FIG. 11, with the rear frame and sliding body housing removed.
Figure 18:
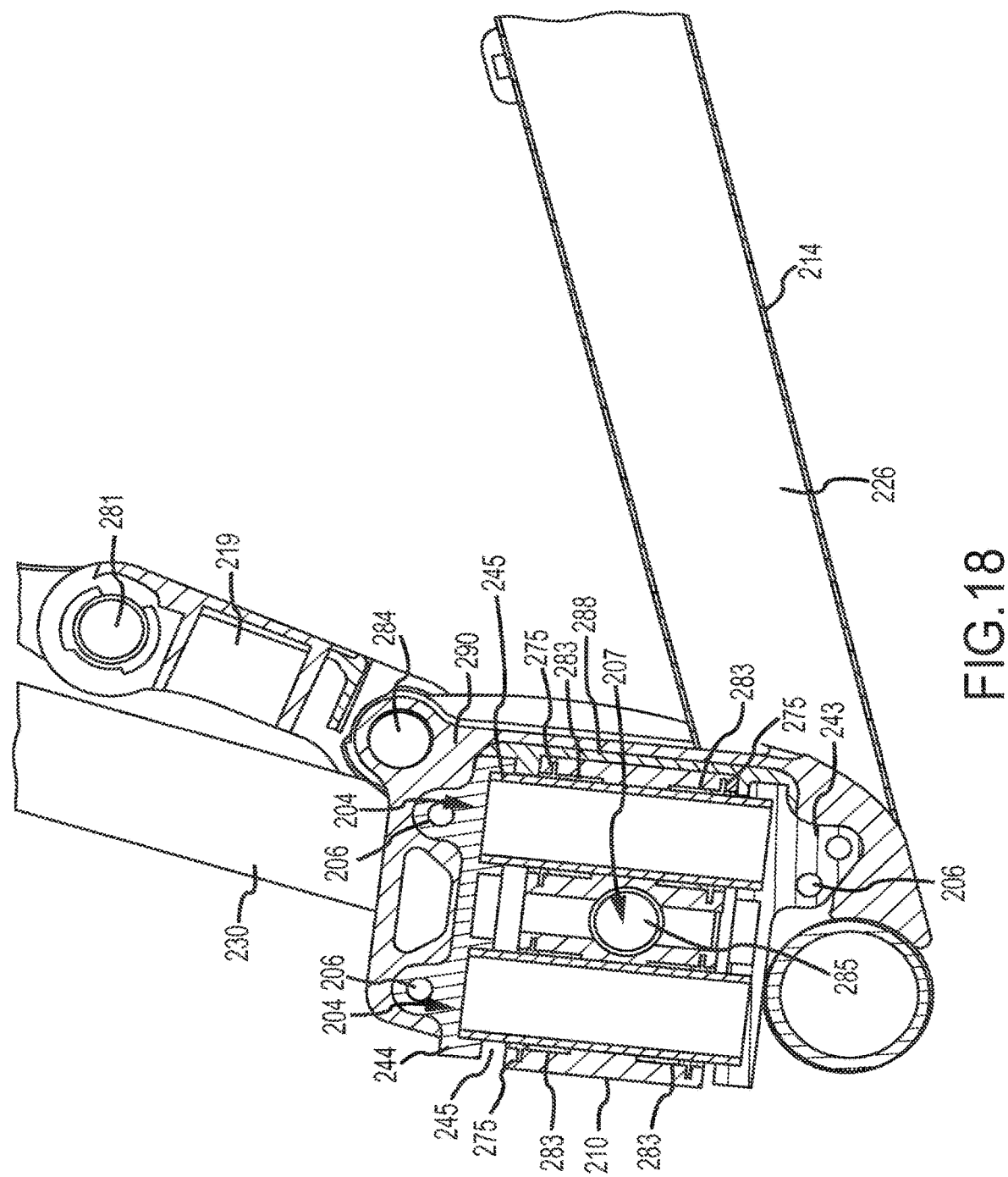
FIG. 18 illustrates a cross-sectional view of the front frame and rear suspension system shown in FIG. 11, with the rear frame removed, as taken along line 18-18 of FIG. 16.
Figure 20:
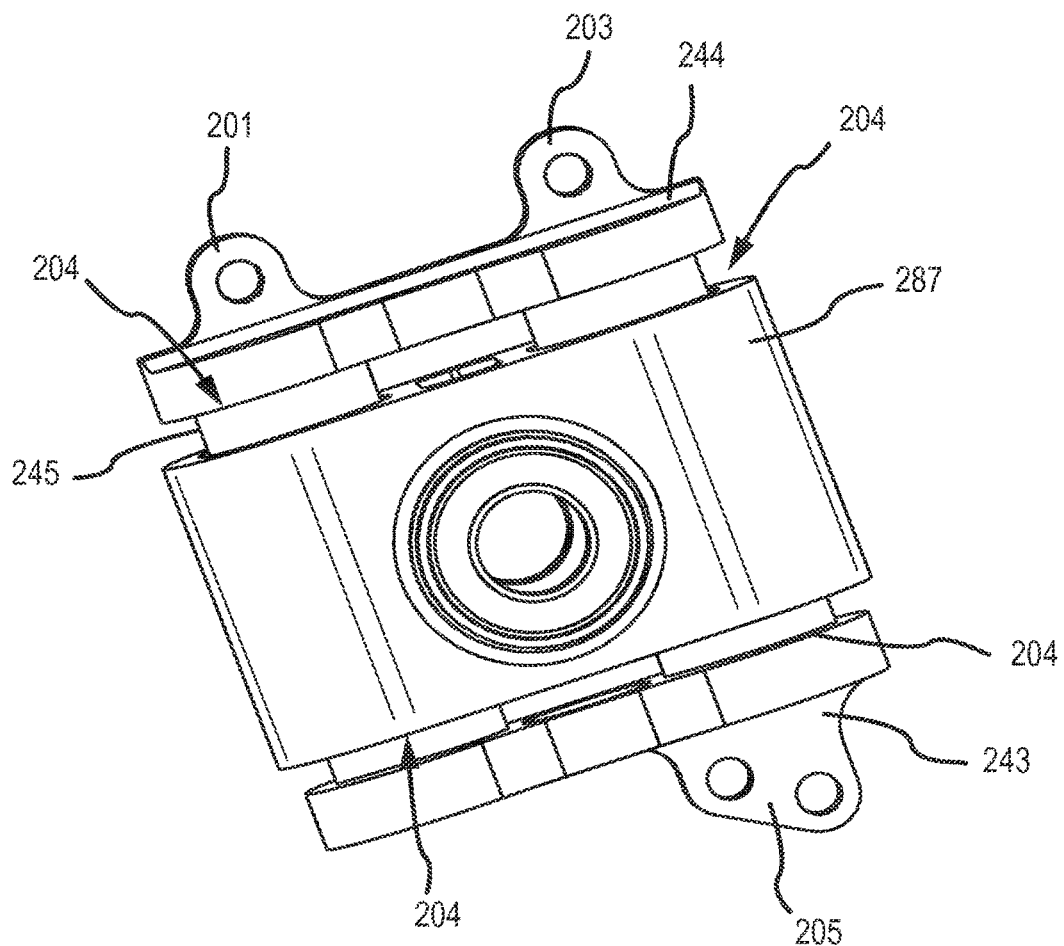
FIG. 20 illustrates a right perspective view of the sliding body assembly shown in FIG. 11.

As best shown in FIGS. 16-18, a sliding body assembly 210, also referred to as a rail assembly, may be positioned between the right and left rear triangles 257, 259 of the rear frame 214. As previously discussed, the sliding body assembly 210 may include a sliding body 288 that is supported by the sliding body mount 290 that is joined to the down and seat tubes 226, 230 of the front frame 212. The sliding body assembly 210 may further include a top crown 244 that is joined to a top mounting portion 227 of the mount 290 and a bottom crown 243 that is joined to a bottom mounting portion 229 of the mount 290. The top and bottom crowns 244, 243 are configured to receive the top and bottom ends of a pair of spaced-apart rails 245 which extend between the top and bottom crowns 244, 243. In some examples, the rails 245 may have a hollow tubular configuration, and may be oriented such that they are substantially parallel to one another when attached to the crowns 244, 243. In other embodiments, the rails 245 may have a solid configuration, and may have acceptable cross sections allowing reciprocating movement along their length as defined below. In still other embodiments, the rails may extend at different angles relative to one another. The rails 245 may together define a plane that is substantially parallel to the planes defined by the front and rear frames 212, 214 when the bicycle is fully assembled. As is best shown in FIG. 20, the top and bottom crowns 244, 243 may each define one or more attachment portions 201, 203, 205 that protrude from the top and bottom faces of the top and bottom crowns 244, 243 and allow for attaching the top and bottom crowns 244, 243 to the mount 290. In one example, the top crown 244 may include a first attachment portion 201 that is positioned on the forward end of the top crown 244 and a second attachment portion 203 that is positioned on the rear end of the top crown 244. In contrast, the bottom crown 243 may only include a single attachment portion 205 that is positioned on the rear end of the bottom crown 243. As is shown, the first and second attachment portions 201, 203 of the top crown 244 and the attachment portion 205 of the bottom crown 243 may each include one or more apertures configured to receive a fastener, such as a bolt, for joining the top and bottom crowns 244, 243 to the mount 290. Other embodiments may include other attachment points for joining the top and bottom crowns 244, 243 of the sliding body 288 to the slider link mount 290. Further, in some embodiments, the top and bottom crowns 244, 243 of the assembly may be integrally formed with the sliding body mount 290, or may be joined to or integrally formed with the front frame 212 of the bicycle.

Figure 21:
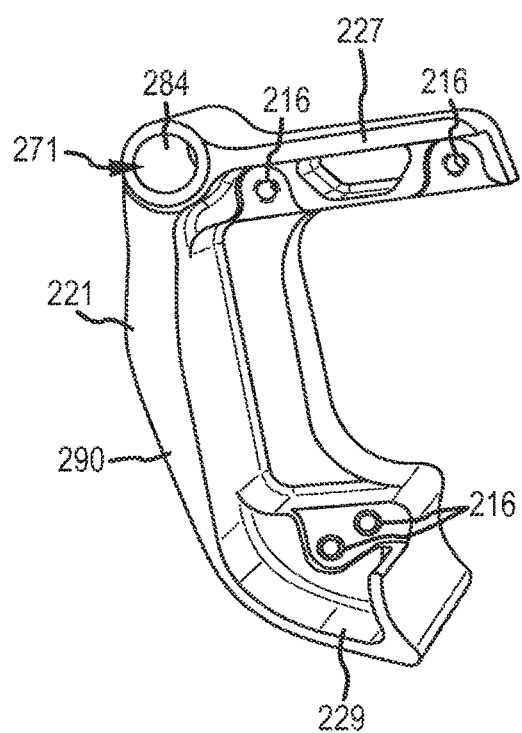
FIG. 21 illustrates a left perspective view of the sliding body assembly shown in FIG. 11.

One example of a sliding body mount 290 is shown in FIG. 21. The sliding body mount 290 may have a top mounting portion 227, a bottom mounting portion 229, and a connecting portion 221 that extends between the top and bottom arms 227, 229. In one example, the sliding body mount 290 may have a truncated C-shape, in which the top mounting portion 227 of the sliding body mount 290 is longer than the bottom mounting portion 229 of the sliding body mount 290, which may be contoured to receive the bottom bracket 240. The top mounting portion 227 of the sliding body mount 290 may define two apertures 216 that correspond to the apertures 206 defined by the top crown 244 of the sliding body assembly 210, and the bottom mounting portion 229 of the sliding body mount 290 may define two apertures 216 that correspond to the apertures 206 defined by the bottom crowns 244, 243 of the sliding body assembly 210. The C-shaped body mount may have its open side facing rearwardly, generally toward the rear tire, as shown at least in FIG. 11.

As previously discussed, fasteners may be inserted through the apertures 206, 216 defined by the top and bottom crowns 244, 243 and by the sliding body mount 290 to join the top and bottom crowns 244, 243 of the assembly to the mount 290. The sliding body mount 290 may further be keyed or contoured to receive the top and bottom crowns 244, 243 of sliding body assembly 210, which may serve to further prevent the top and bottom crowns 244, 243 from moving relative to the sliding body mount 290, 210 as forces are applied to the rear suspension system. Additionally, the top mounting portion 227 of the sliding body mount 290 may define an axle-receiving aperture 271 that is configured to receive the third axle 284, which extends through the sliding body 288 and the bottom end of the rocker link 219. As discussed above, the sliding body mount 290 may be fixedly joined to the seat tube 230 of the front frame 212. In some embodiments, the sliding body mount 290 may be joined to the seat tube 230 using fasteners, welding, adhesive, or some other joining means. In other embodiments, the sliding body mount 290 may be integrally formed with the seat tube 230. In further embodiments, the sliding body mount 290 may be fixedly joined to the down tube 226 of the front frame 212, or to the both the seat and down tubes 230, 226 of the front frame 212.

Figure 19:
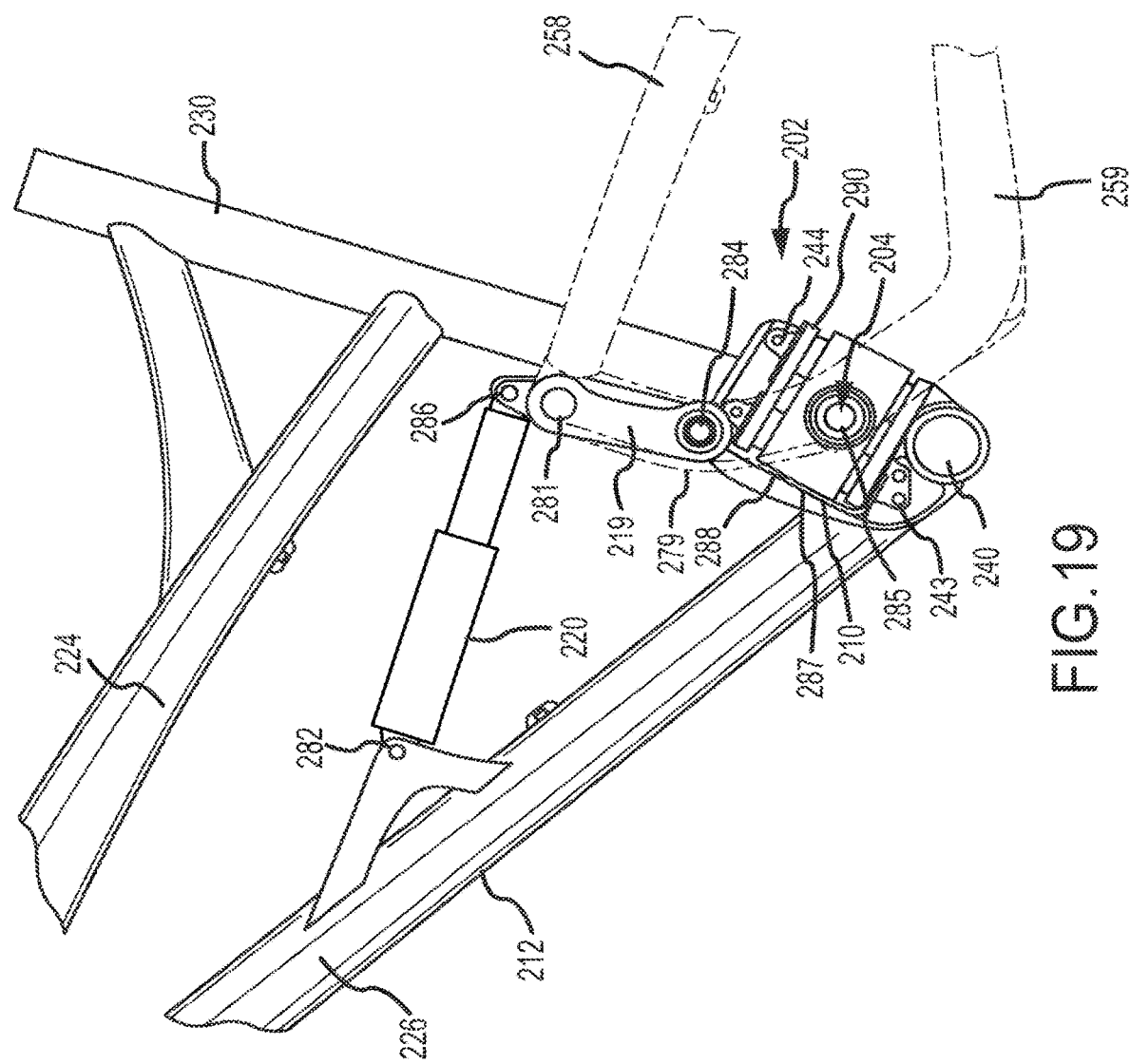
FIG. 19 illustrates a left side view of the front frame and rear suspension system shown in FIG. 11, with the rear frame shown in dashed lines.

The sliding body 288 (which may also be referred to as a slider link as noted with respect to the first example) of the sliding body assembly 210 may include an outer housing 287 that is configured to engage the guide rails 245 extending between the top and bottom crowns 244, 243. The outer housing 287 is best shown in FIGS. 18-20. In one example, the outer housing 287 may have an elongated block shape with two opposing curved side walls, although in other embodiments, the outer housing 287 may define other shapes. The top and bottom surfaces of the housing 287 may together define two pairs of vertically-aligned apertures 204, with each pair of vertically-aligned apertures 204 being configured to receive one of the pair of rails 245 that extends between the crowns 243, 244. As will be further discussed below, the sliding body 288 may further include one or more bearings that are adapted to slidingly engage the outer surfaces of the guide rails 245, so as to allow the sliding body 288 to move along the guide rails 245. Additionally, the front and back surfaces of the housing 287 may define a pair of horizontally-aligned apertures 207 that are positioned between the rails 245. The horizontally-aligned apertures 207 may be configured to receive the second axle, which extends through the right and left rear triangles 257, 259 and the sliding body housing 287. In some examples, the horizontally-aligned apertures 207 (and second axle 285) may be located close to or at the center of the sliding body housing 287, such that they are positioned between the guide rails 245 and midway between the top and bottom of the guide rails. As such, the second axle 285 may be positioned between and securely engaged by the rails 245 to move therealong.

It is contemplated that apertures 207 may be positioned between the guide rails and near or at their top ends, or near or at their bottom ends also. The aperture(s) 207 may also be positioned at other locations on the sliding body housing 287, such as in a non-central area at the top or bottom of the sliding body housing 287, and offset forwardly or rearwardly toward the front or rear margins of the sliding body housing 287.

When joined to the sliding body mount 290, the spaced-apart guide rails 245 may extend at an angle relative to the x-axis (i.e., the horizontal axis). The angle may be, for example, an acute angle or an obtuse angle. As one non-limiting example, the spaced-apart guide rails 245 may extend at a 60 degree angle relative to the x-axis. In other embodiments, the guide rails 245 may be oriented such that they are substantially parallel to the x-axis. In further examples, the guide rails 245 may be oriented substantially vertically, i.e., such that the rails 245 are substantially parallel to the y-axis. As will be further discussed, the orientation of the guide rails 245 may determine the travel path of the sliding body 288 as the shock 220 is compressed.

Figure 22:
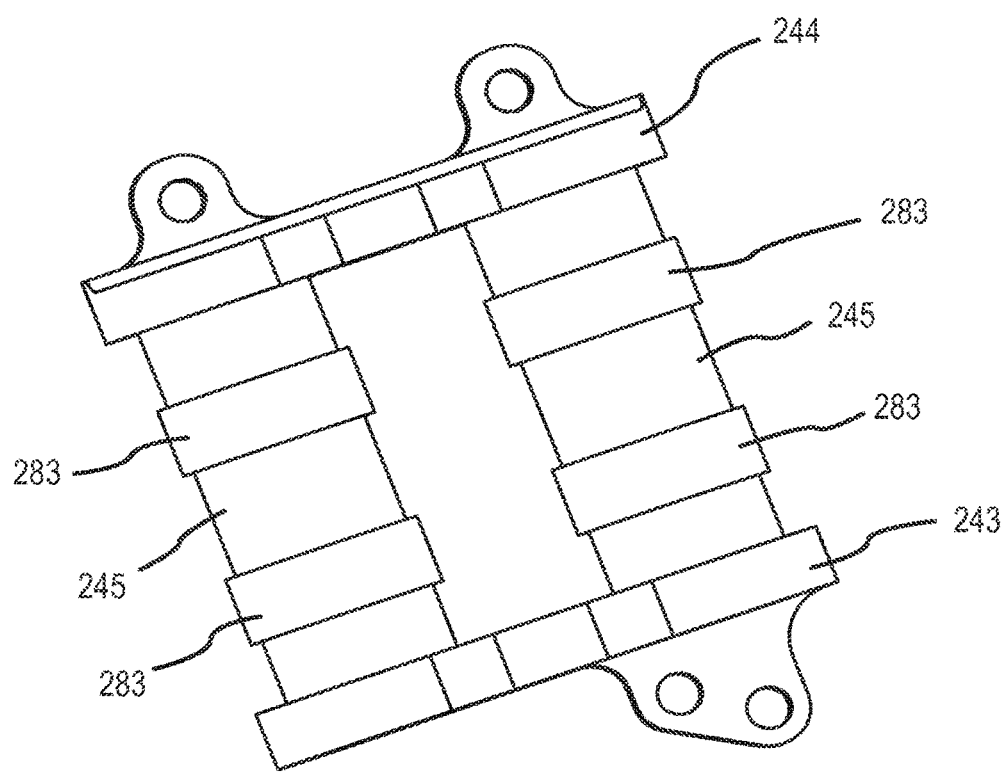
FIG. 22 illustrates a right perspective view of the rails and crowns of the sliding body assembly shown in FIG. 11.

The internal structure of the sliding body assembly 210 is best shown in FIGS. 17, 18, and 22. As is shown, the sliding body 288 may include one or more internal bearings 283, which may take the form of bushings 283 that are joined to the outer surfaces of the rails 245. For example, the bushings 283 may be sleeves which are inserted over the rails 245 to provide a smooth bearing surface for allowing the sliding body 288 to slide along the rails 245. In one embodiment, the sliding body 288 includes a pair of upper bushings 283 and a pair of lower bushings 283 that are spaced apart from and positioned below the upper bushings 283 along the lengths of the rails 245. The sliding body 288 may further include one or more wipers 275 that are also positioned around the rails 245. In some embodiments, a pair of lower wipers 275 may be positioned directly below the lower bushings 283, and a pair of upper wipers 275 may be positioned directly above the upper bushings. The wipers 275 may have larger outer diameters than the bushings 283 and the vertically-aligned apertures 204 configured to receive the rails 245 to prevent dirt or dust entering the housing 287 through the apertures 204 from contaminating the bushing surfaces. The wipers 275 may be similar to any of the wipers described above with respect to the first embodiment shown in FIGS. 1-10I. In some embodiments, the wipers 275 may be defined by the outer sliding body housing 287, although in other embodiments, they may be otherwise attached to the housing 287.

Figure 23C:
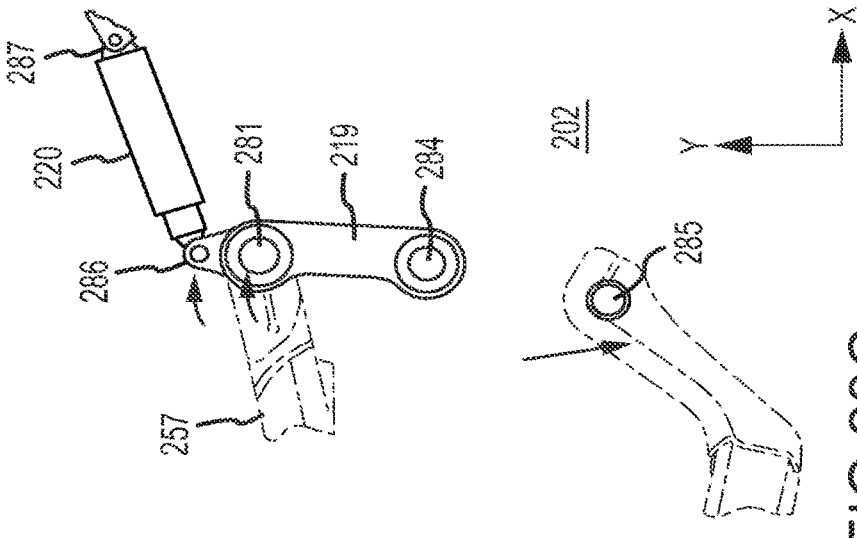
FIG. 23C is a right side view of the front frame and rear suspension system depicted in FIG. 11 in a fully compressed stage, with the rear frame shown in dashed lines.
Figure 23B:
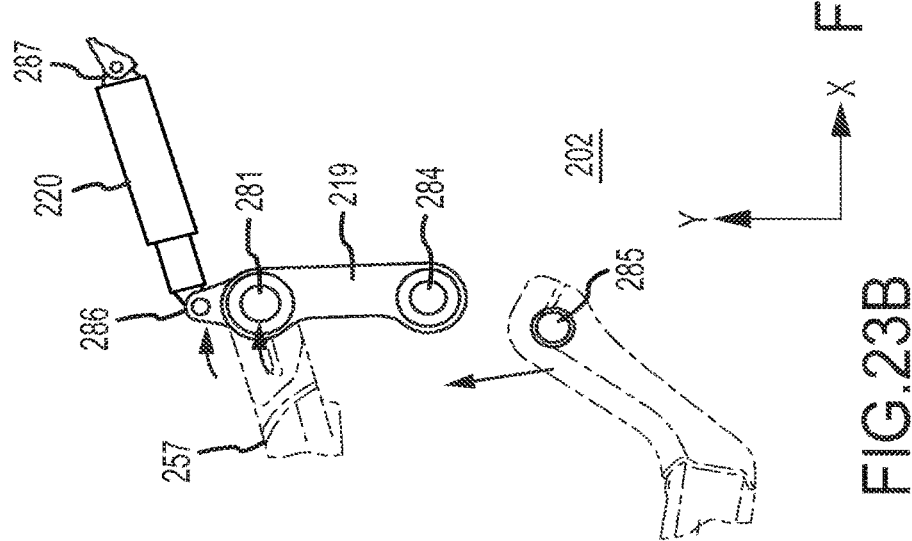
FIG. 23B is a right side view of the front frame and rear suspension system depicted in FIG. 11 in a partially compressed stage, with the rear frame shown in dashed lines.
Figure 23A:
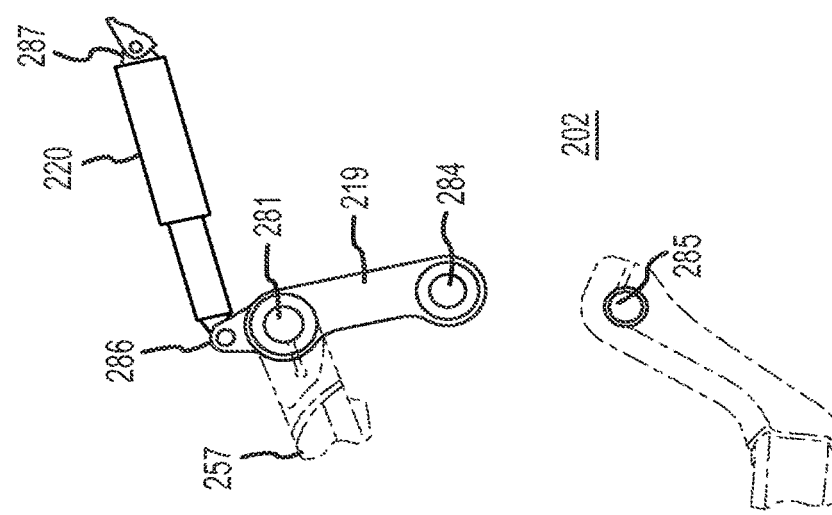
FIG. 23A is a right side view of the front frame and rear suspension system of the bicycle depicted in FIG. 11, with the rear frame shown in dashed lines.

FIGS. 23A-23C illustrate the rear suspension system 202 in various stages of compression. Specifically, FIG. 23A illustrates the rear suspension system 202 when the shock assembly 220 is in an uncompressed state, FIG. 23B illustrates the rear suspension system 202 when the shock assembly 220 is in a partially compressed state, and FIG. 23C illustrates the rear suspension system 202 when the shock assembly 220 is in a fully compressed state. As discussed above, the rocker link 219 may be pivotally coupled to each of the shock assembly 220, rear frame 214, and the seat tube 230. As the rocker link 219 pivots relative to the seat tube 230 around the fixed second pivot axis, it causes rotation of the top ends of the forward members 279 of the right and left rear triangles 257, 259 along an arcuate path defined by the rocker link 219 around the fixed pivot axis 284. In addition, the rotation of the rocker link 219 relative to the seat tube 230 further causes rotation of the bottom end of the shock assembly 220 along a second arcuate path that is parallel to that traveled by the top ends of the forward members 279.

The forward members 279 of the right and left triangles 257, 259 may be pivotally coupled to the sliding body 288, which is configured to slide along the rails 245. As discussed above, the forward members 279 of the right and left rear triangles 257, 259 may be configured to rotate relative to the sliding body 288 about the second pivot axle 285 as the sliding body 288 travels along a substantially linear path defined by the rails 245.

A comparison of FIGS. 23A and 23B illustrates that partial compression of the shock assembly 220 causes the rocker link 219 to pivot in a clockwise direction around the fixed third pivot axle 284. The pivot axis 286 located at the top end of the link, and the pivot axis 281 located along the length of the link are configured to move along the arcuate paths defined by the rotation of the link around the fixed pivot axis 284. The rear end of the shock assembly 220 and the top ends of the rear triangles 257, 259, which are coupled to the rocker link 219 at the third and first pivot axles 281, 286, are also configured to move along the arcuate paths defined by the pivot axles 281, 286. At the same time, the sliding body 288 is configured to travel in an upward and rearward direction, as defined by the guide rails 245, such that the pivot axis 285 defined between the sliding body 288 and the rear frame 214 travels upwardly and rearwardly along the linear path defined by the rails 245. The rear frame 214 further pivots relative to the sliding body 288 as the rocker link 219 rotates around the fixed third pivot axle 285.

In contrast to the embodiment shown in FIGS. 1-10I, the travel path of the sliding body 288 may have a larger vertical component than a horizontal component. This is due, at least in part, to the orientation of the rails 245 of the sliding body assembly 210. In other embodiments, the mounting points and configurations of the link 219, shock, 220, and rails 245 may be adjusted such that the travel path of the sliding body 288 has a larger horizontal component than a vertical component. In such embodiments, the distance traveled in the rearward or forward directions may be greater than the distance traveled in the upward or downward directions. However, in concert with FIGS. 1-10I of the first example, the motion and direction of the sliding body, and the point along its path at which it switches direction, is controlled by the dimensions of the rear suspension structure.

A comparison of FIGS. 23B and 23C illustrates that further compression of the shock assembly 220 due to impaction forces on the bicycle causes the rocker link 219 to rotate further in a clockwise direction around the fixed third pivot axle 284, such that the shock assembly 220 is rotated in a counterclockwise direction around the fixed fifth pivot axle 282. Additionally, the sliding body 288 is configured to switch directions, such that the pivot axis 285 defined between the sliding body 288 and the rear frame 214 travels downwardly and forwardly along the linear path defined by the rails 245. The rear frame 214 further pivots relative to the sliding body 288 as the rocker link 219 rotates around the fixed third pivot axle 285. In some embodiments, the linkages described above may be otherwise configured such that the sliding body 288 travels downwardly and forwardly first, and then upwardly and rearwardly, upon compression of the shock assembly 220.

Extension of the shock assembly 220 would result in the reverse motion of the components of the system 202. Decompression or extension of the shock assembly 220 from a fully compressed to a partially compressed state causes the rocker link 219 to rotate in a counter-clockwise direction around the fixed pivot axis 284. Additionally, the sliding body 622 would travel upwardly and rearwardly along the linear path defined by the rails 245. Further decompression or extension further causes the rocker link 219 to rotate further in a counter-clockwise direction around the fixed pivot axis 284. Additionally, the sliding body 622 is configured to switch directions, such that it travels downwardly and forwardly along the linear path defined by the rails 245.

As discussed above, the sliding body 288 may be configured to switch directions as the shock assembly 220 transforms between the uncompressed state to the fully compressed state. In other words, the sliding body 288 may travel in a first direction along the rails 245 as the shock 220 transitions from an uncompressed to a partially compressed state, and then travel in a second direction opposite the first direction along the rails 245 as the shock 220 transitions from a partially compressed to a fully compressed state. As the sliding body 288 moves in the second direction, it re-travels at least a portion of the path that it traveled during the initial compression of the shock (i.e., from the uncompressed to the partially compressed positions). In one example, the sliding body 288 and the attached portion of the rear frame 214 are configured to move both (1) upwardly and rearwardly and (2) downwardly and forwardly along the linear path defined by the rails 245 as the rear wheel travels along the full wheel path during one of compression or extension of the shock assembly 220. This motion of the sliding body 288 and rear frame 214 is best shown in FIGS. 23A-23C. As the rear wheel moves upwardly along the wheel path, the sliding body 288 initially moves upwardly and rearwardly along the linear path defined by the rails 245. At the same time, the top end of the rear frame 214 travels forwardly along the arcuate path defined by the rocker link 219, resulting in a wheel path that is increasingly curved or concave (i.e., the radius of curvature of the wheel path decreases as the rear wheel travels upwardly). Once the sliding body 288 reaches a transition point or position, it switches directions such that it begins to travel in the opposite direction (in this case, forwardly and downwardly) along the linear path defined by the rails 245. Accordingly, the sliding body 288 and the attached portion of the rear frame 214 are configured to move in opposite directions along the linear path defined by the rails 245 during each compression or extension of the shock assembly 220.

FIG. 24 illustrates the shock rate of the rear suspension system 202 shown in FIGS. 11-23. The shock rate of the rear suspension system 202, as defined herein, is the inverse of the leverage ratio of a suspension system 202, or the shock stroke length divided by the distance traveled by the rear wheel. As is shown, the shock rate curve defines a substantially straight line as compared to leverage ratios of existing rear suspension systems.

Figure 25:
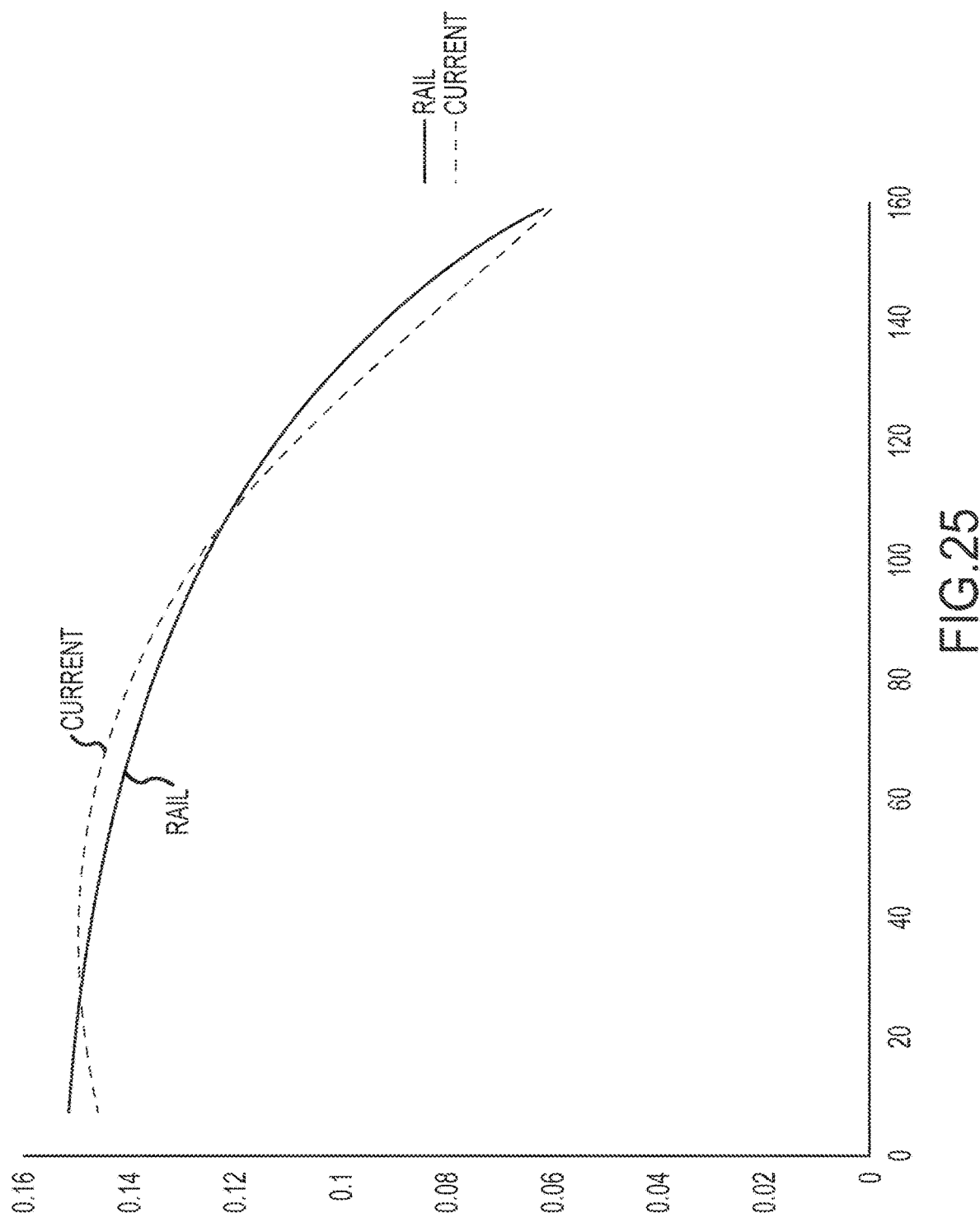
FIG. 25 illustrates the derivative of chain stay length that is achieved in connection with the embodiment of the rear suspension system shown in FIGS. 11-21.

FIG. 25 illustrates the derivative of chain stay length or rate of change in chain stay length of the rear suspension system 202 shown in FIGS. 11-22. As is shown, the derivative of chain stay length deviates from that of current suspension systems, in that the derivative of chain stay length is high at the beginning and at the end of the wheel travel path. The derivative of chain stay length is explained in U.S. Pat. No. 5,628,524, entitled "Bicycle Wheel Travel Path for Selectively Applying Chainstay Lengthening Effect and Apparatus for Providing Same," which is incorporated by reference in its entirety herein. As is shown in FIG. 23, the derivative of chain stay length begins above 0.14, and has a negative slope throughout the entire range of wheel travel (i.e., through one full compression of the shock assembly), and in some cases, may end below 0.1. This can be contrasted to the derivative of chain stay length of existing rear suspension systems, also shown in FIG. 25, in which the derivative of chain stay length initially rises (i.e., has a positive slope) and then falls.

FIGS. 26-37 illustrate another example of a rear suspension system 302, similar to the second example just described. This rear suspension system 302 is highly similar to the rear suspension system 302 shown in FIGS. 11-23, with some differences in the configurations of some of the components of the sliding body assembly 310, which will be further described below. As is shown, the rear suspension system 302 includes a front frame 312 coupled with a rear frame 314 through a rear suspension system 302 including a rocker link 319, as well as sliding body assembly 310 that includes a mount 390 supporting a sliding body 388. Like the other examples of rear suspension systems 102, 202 previously described, the rear suspension system 302 also includes a shock assembly 320 operably connected between the front frame 312 and the rear frame 314. The shock assembly 220 may be similar to the shock assemblies described above.

The front frame 312 may be substantially identical to that described in FIGS. 11-23, and may include a top tube 324, seat tube 330, and a down tube 326 defining a bottom bracket 340. As in the example shown in FIGS. 11-23, the right side of the rear frame 314 may define a partial right rear triangle 357 including a chain stay 360, a seat stay 358, and a broken forward member 379 that extends upwardly from the front end of the chain stay 360 towards the front end of the seat stay 358. The left side of the rear frame 314 may define a left rear triangle 359 including a chain stay 360, a seat stay 358, and a forward member 379 extending between the chain stay 360 and the seat stay 358.

As in the example shown in FIGS. 11-23, the right and left rear triangles 357, 359 may be coupled each other via two axles 381 and 385, which extend across the rear frame 314 to connect the triangles 357, 359. The top ends of the right and left rear triangles 357, 359 may be connected by the first axle 381, which may extend between the two triangles 357, 359 and through an upper end portion of a rocker link 319, which is sandwiched between the triangles. The second axle 385 may be located at the bottom end of the forward member 379 of the left rear triangle 359 and at the top end of the broken forward member 379 of the right rear triangle 357, and extends through a sliding body 388 that is positioned between the forward members 379.

The bottom end of the rocker link 319 may be pivotally connected to the sliding body mount 390 via a third axle 384, which is not directly connected to the rear frame 314. The sliding body mount 390 may be fixedly joined to the seat and down tubes 330, 326 of the front frame 312, such that it does not move relative to the front frame 312 as the rear wheel is deflected. The top end of the rocker link 219 may be pivotally connected to the rear end of the shock assembly 320 via a fourth axle 386. The forward end of the shock assembly 320 may be pivotally connected to the down tube 326 of the front frame 312 via a fifth axle 382.

As in the embodiment shown in FIGS. 11-23, the sliding body assembly 310 may include a mount 390 configured to support a sliding body 388 that is configured to move relative to the mount 390 along a pair of spaced-apart rails 345 that extend between the top and bottom portions of the mount 390 in response to deflection of the rear wheel. Similar to the prior embodiment, and as shown in FIG. 37, the rails 345 may be configured to receive a pair of upper bushings 383 and a pair of lower bushings 383 that are spaced apart from and positioned below the upper bushings 383 along the lengths of the rails 345 to facilitate sliding of the sliding body 388 along the rails 345. A comparison of FIGS. 34-37 and FIG. 21 reveals that the rails 345 and the mount 390 shown in FIGS. 26-36 may have different configurations than that shown in FIGS. 11-23. For example, each of the spaced-apart rails 345 may define top and bottom attachment end portions 344, 343, each of which defines a fastener-receiving aperture 306. Similar to the crowns 244, 243 joined to the ends of the rails 245 of the sliding body assembly 210 shown in FIGS. 11-23, the top and bottom attachment end portions 344, 343 of the rails 345 allow for joining the rails 345 to the sliding body mount 390.

Figure 35:
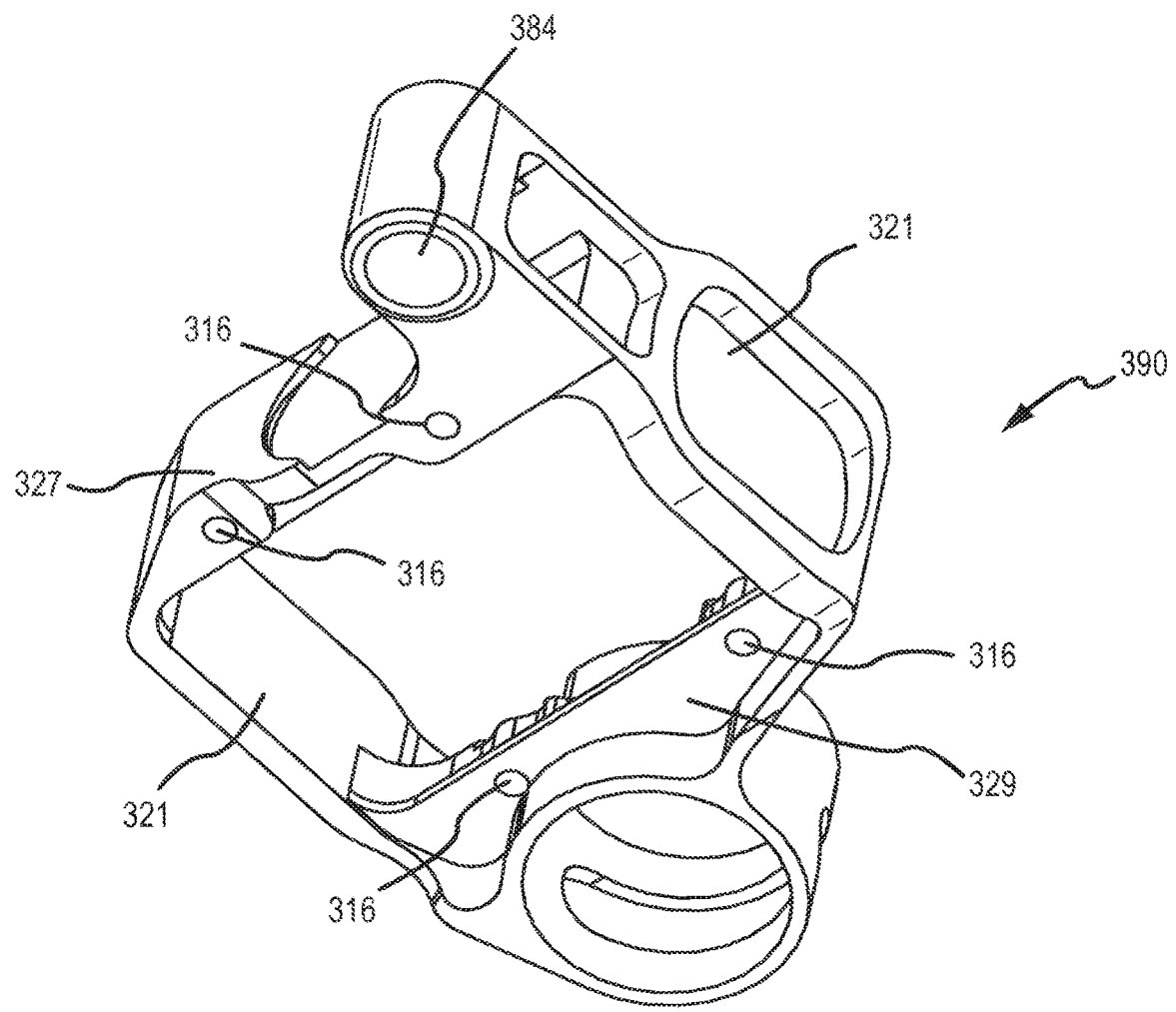
FIG. 35 illustrates a right perspective view of the sliding body mount shown in FIG. 26.
Figure 36:
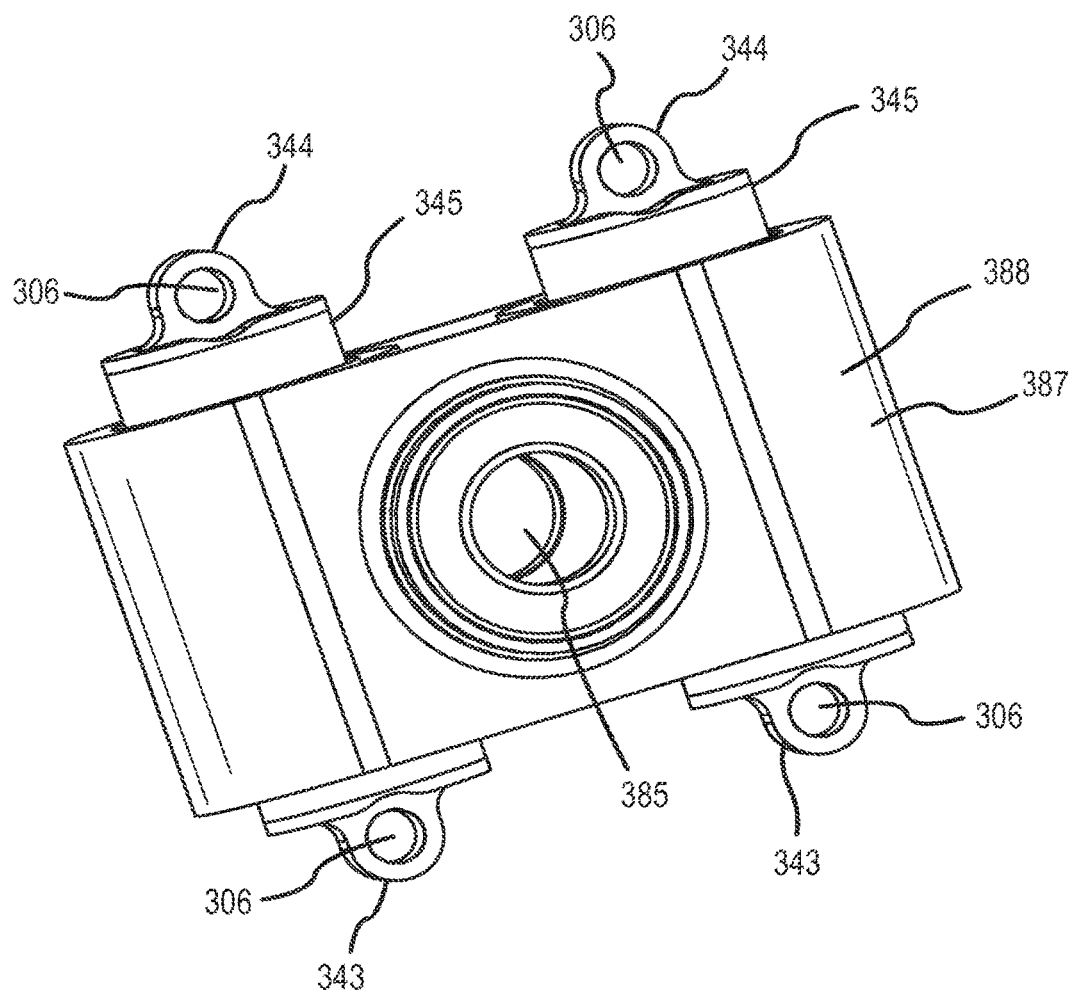
FIG. 36 illustrates a right side perspective view of the sliding body and rails shown in FIG. 26.
Figure 37:
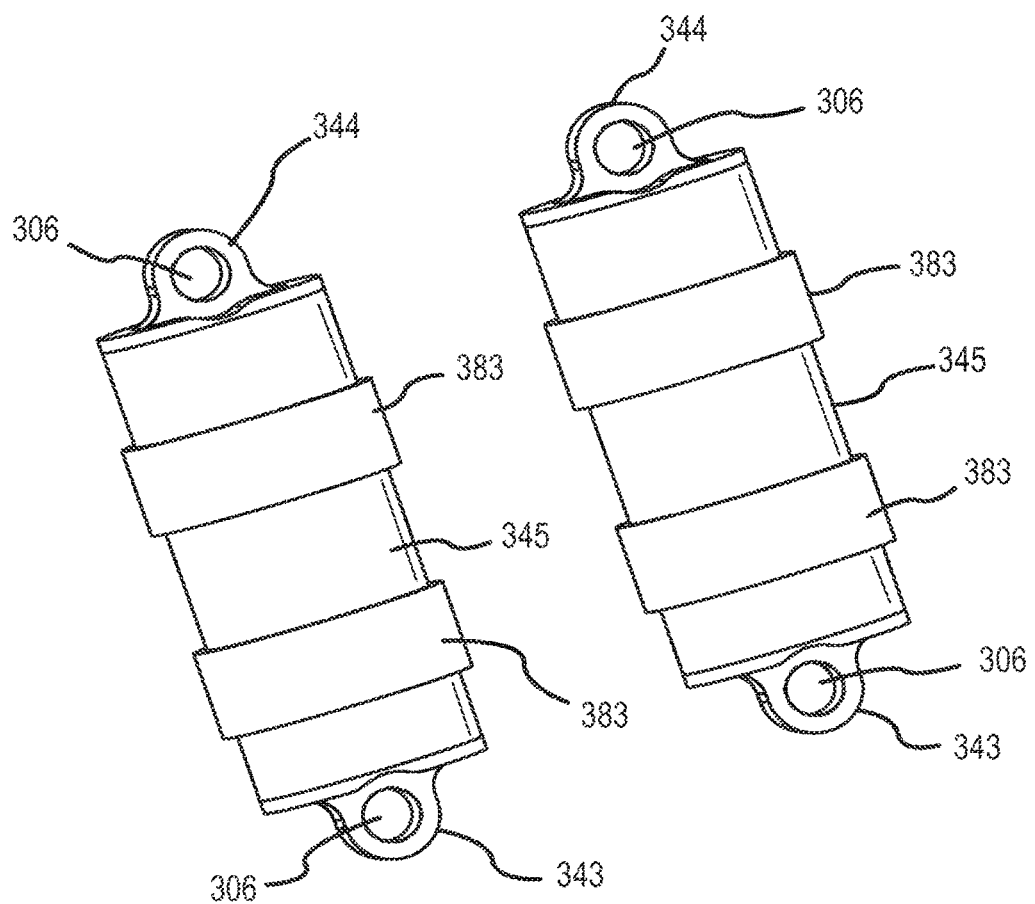
FIG. 37 illustrates a right side perspective view of the rails shown in FIG. 26.

As best shown in FIGS. 35-36, the sliding body mount 390 may have a top mounting portion 327, a bottom mounting portion 329, and two parallel connecting portions 321 that extend between the top and bottom mounting portions 327, 329, such that the connecting portions 321 and top and bottom mounting portions 327, 329 together define a rectangular-shaped body that surrounds the sliding body 288. The top mounting portion 327 of the sliding body mount 390 may define two apertures 316 that correspond to the apertures 306 defined by the top end portions 344 of the rails 245, and the bottom mounting portion 329 of the sliding body mount 390 may define two apertures 316 that correspond to the apertures 306 defined by the bottom end portions 343 of the rails 245. As previously discussed with respect to the embodiment shown in FIGS. 11-24, fasteners may be inserted through the apertures 306, 316 defined by the top and bottom end portions 344, 343 of the rails 245 and by the sliding body mount 390 to join the rails 245 to the mount 390. The sliding body mount 390 may further be contoured to receive the top and bottom attachment end portions 344, 343 of rails 245, which may serve to further prevent the rails 245 from moving relative to the sliding body mount 390, as forces are applied to the rear suspension system.

Figure 26:
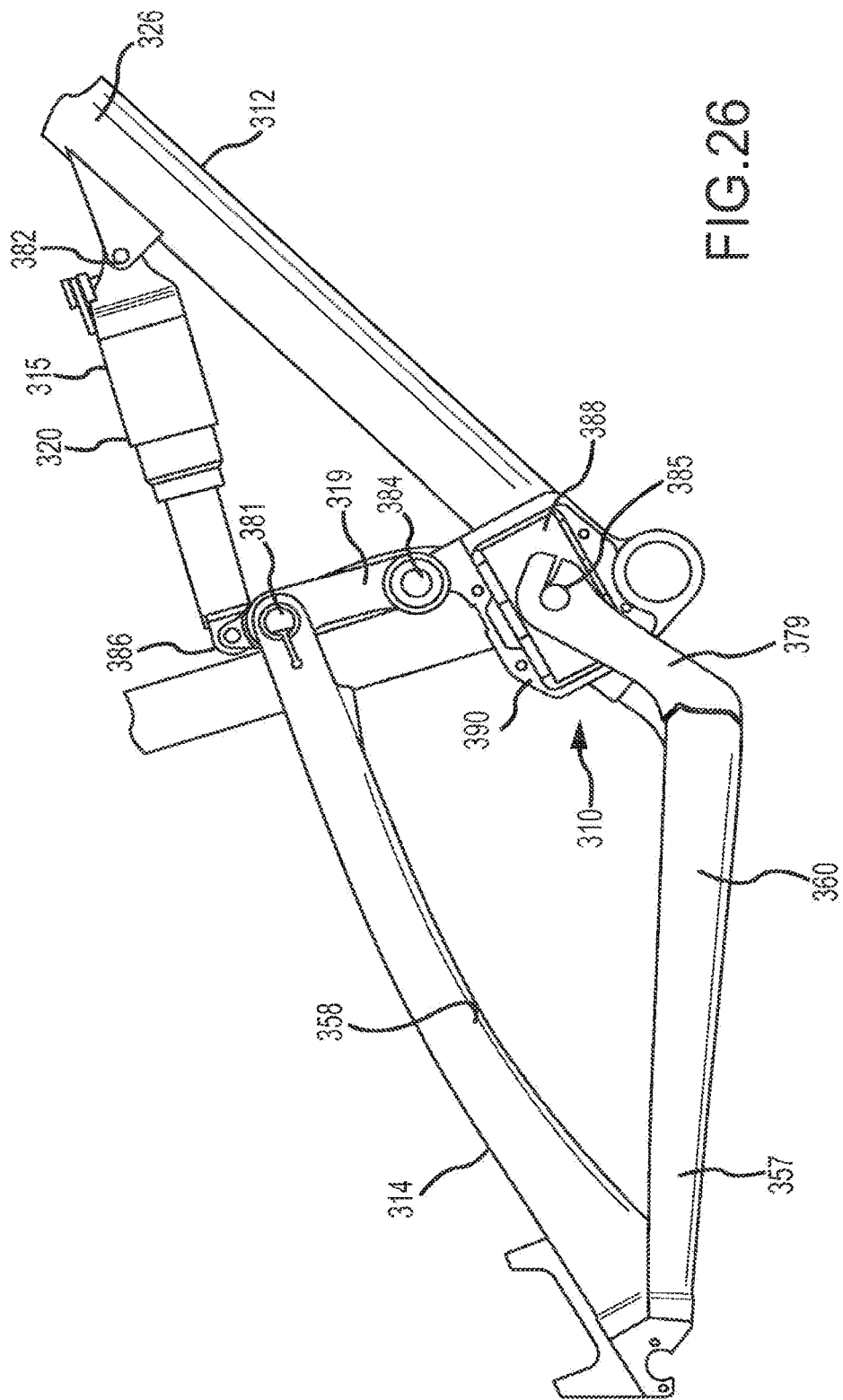
FIG. 26 illustrates a right side view of another example of a front frame and rear suspension system.
Figure 27:
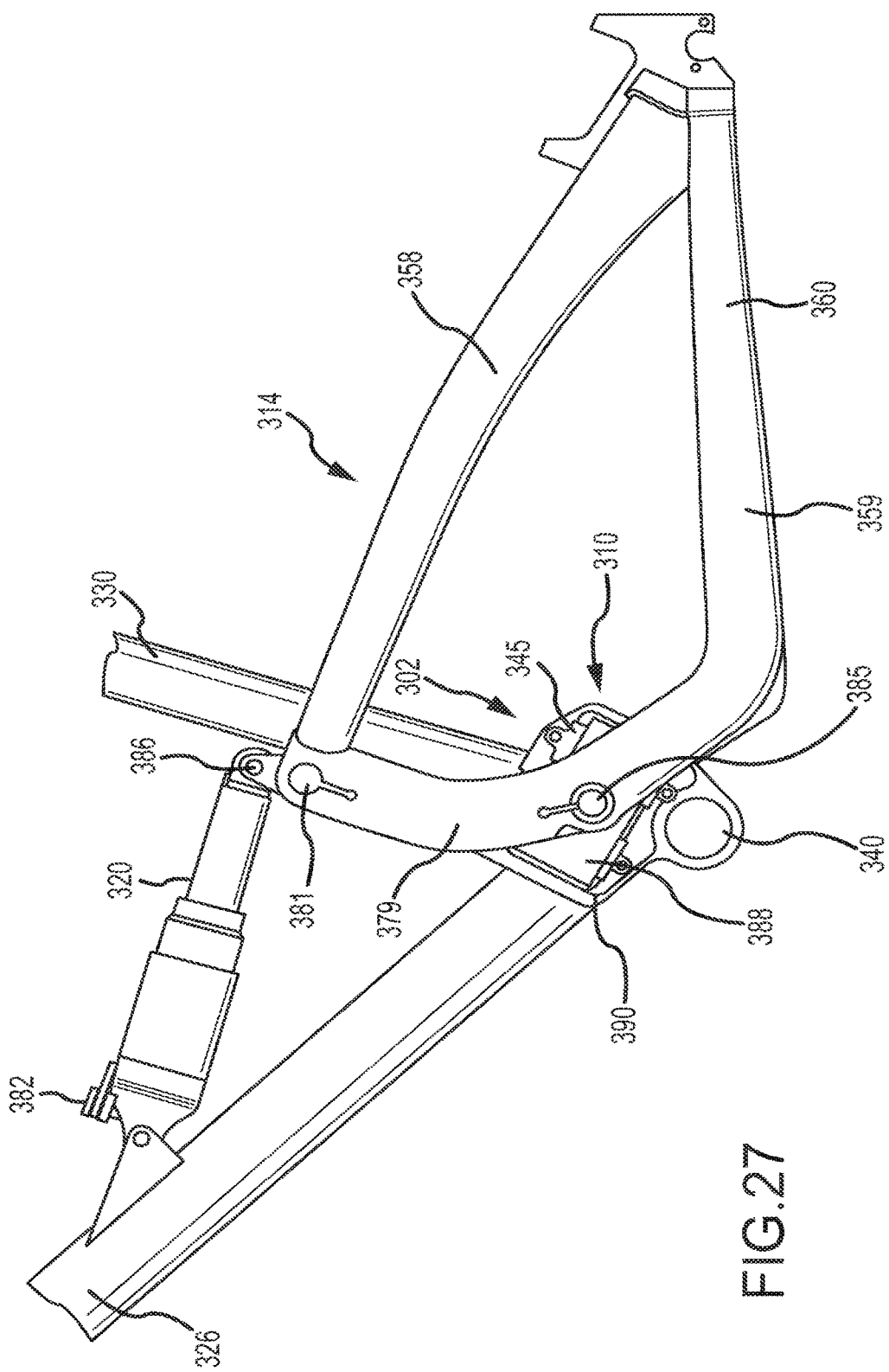
FIG. 27 illustrates a left side view of the front frame and rear suspension system shown in FIG. 26.
Figure 28:
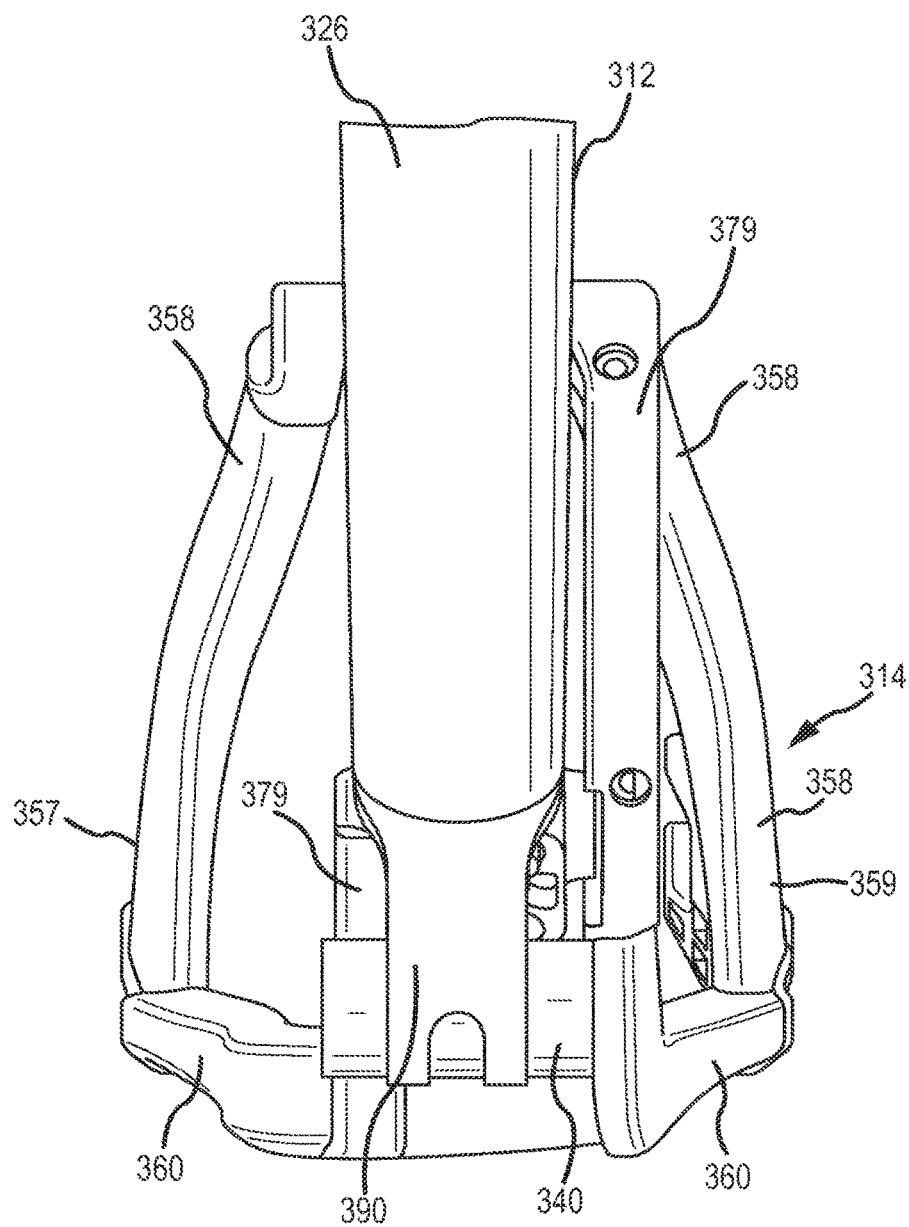
FIG. 28 illustrates a front view of the front frame and rear suspension system shown in FIG. 26.
Figure 29:
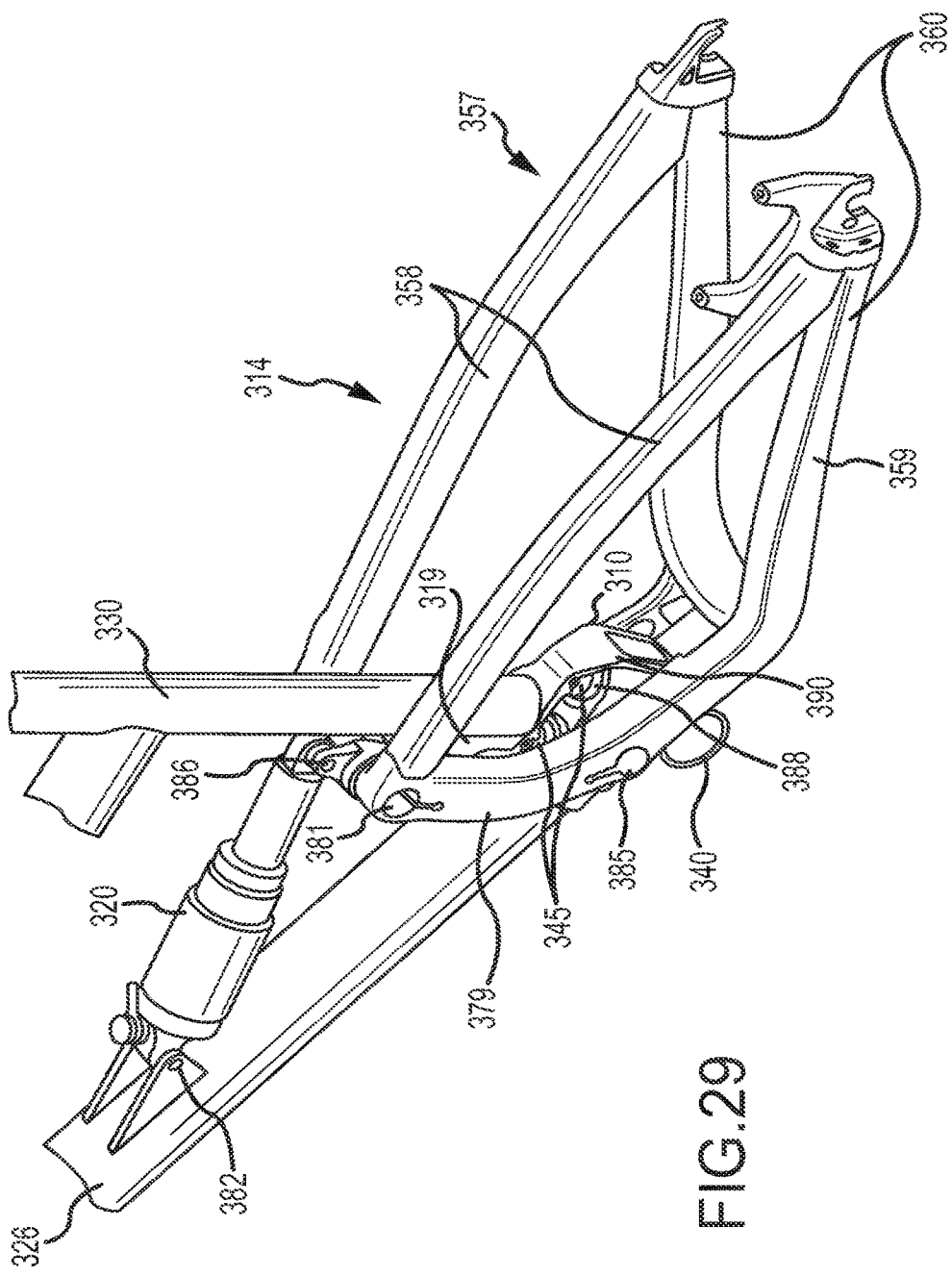
FIG. 29 illustrates a rear left perspective view of the front frame and rear suspension system shown in FIG. 26.
Figure 34:
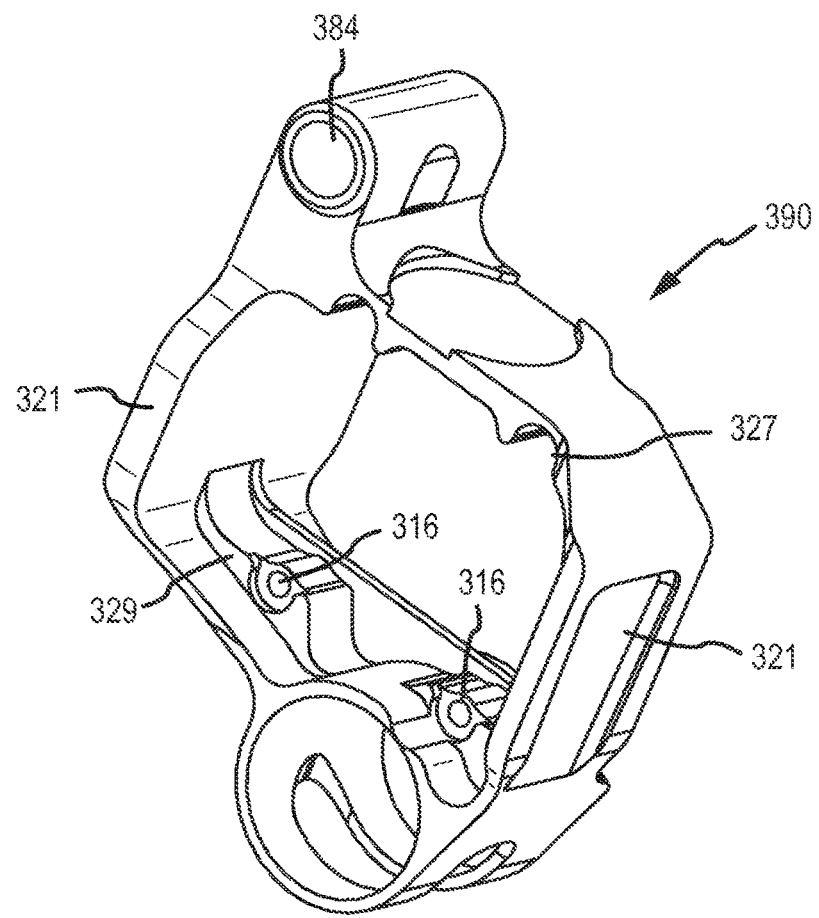
FIG. 34 illustrates a left perspective view of the sliding body mount shown in FIG. 26.

A comparison of the mount 390 shown in FIGS. 34-35 to the mount 290 shown in FIGS. 11-23 reveals several distinctions. Specifically, the attachment portions where the rails 345 are joined to the mount 390 (i.e., via fasteners inserted through apertures 316 defined by the mount 390 and the rails 306) are more evenly spaced, in that the attachment portions are located on opposite sides of the mount 390. In contrast, the bottom crown 243 of the sliding body assembly 210 shown in FIGS. 11-23 is attached to the mount 290 on only one side. In some cases, this even spacing of the attachment portions may allow for more even distribution of the stresses imparted by the rear wheel onto the mount 390, which may help prevent detachment of the rails 345 from the mount 390. Additionally, the sliding body 388 of the rear suspension system 302 shown in FIGS. 26-28 is fully encased on its sides by the mount 390, which has a rectangular configuration rather than the truncated C-shape of the mount 290 shown in FIGS. 11-23. As such, the mount 390 may occupy more space than the mount 290 shown in FIGS. 11-23, and may require additional material for its manufacture, but may also provide for increased load capabilities and structural reinforcement. Further, the mount 390 shown in FIGS. 34-35 includes a bottom bracket support that encircles the bottom bracket 340. In contrast, the mount 290 shown in FIGS. 11-23 did not support the bottom bracket 240.

As discussed above, the rear suspension system 302 illustrated in FIGS. 26-28 operates in an identical manner to the rear suspension system 202 shown in FIGS. 11-24. As such, FIGS. 23A-23D (and the description above describing these figures), which illustrate the rear suspension system 202 in various stages of compression, are equally applicable to the rear suspension system 302.

Figure 38D:
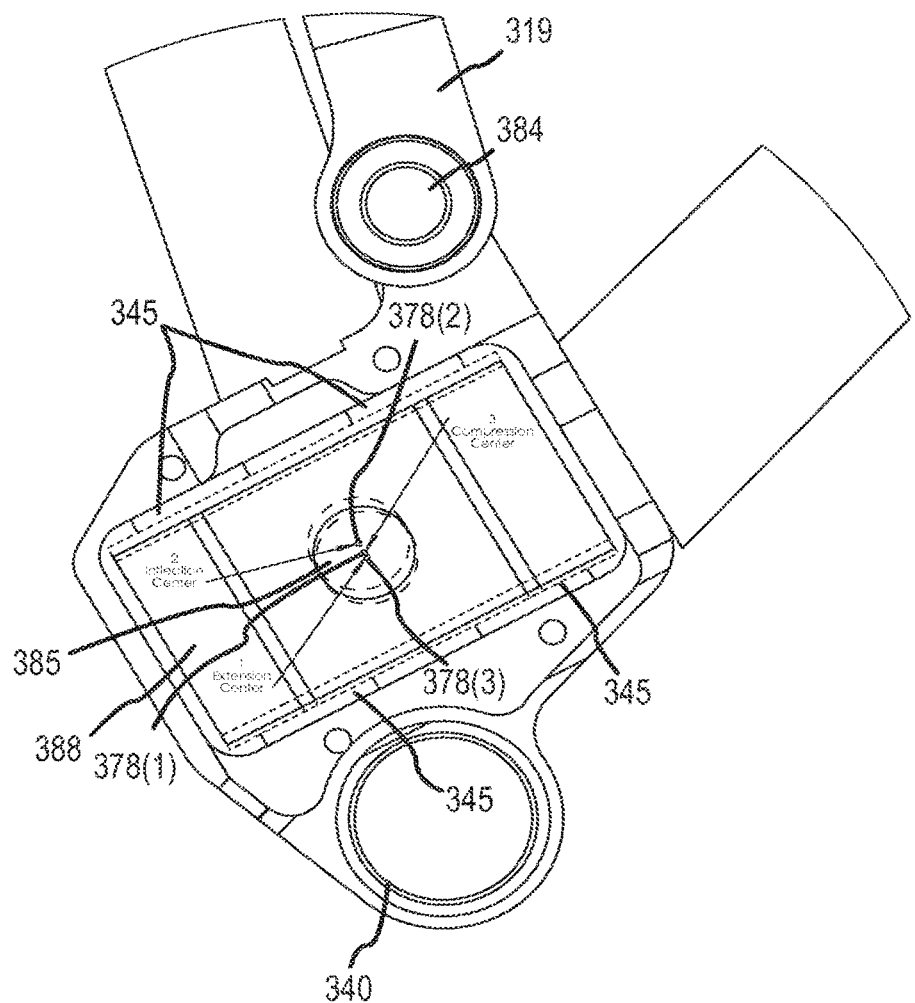
FIG. 38D illustrates a right side view of the sliding body and axle extending through the sliding body in an uncompressed stage shown in solid lines, in a partially compressed stage shown in dashed lines, and in a fully compressed stage shown in dashed lines.

FIGS. 38A-38C illustrate the relative motion of the shock 320, link 319, sliding body 388, and rear frame 314 relative to the front frame 312 as the shock 320 is compressed. Specifically, FIG. 3A illustrates the rear suspension system 302 when the shock 320 in an uncompressed state, FIG. 38B illustrates the rear suspension system 302 when the shock 320 is in a partially compressed state, and FIG. 38C illustrates the rear suspension system 302 when the shock 320 is in a fully compressed state. FIG. 38D illustrates a comparison of the three states shown in FIGS. 38A-38C, with the sliding body 388 axle 385 shown in solid lines in the uncompressed state, and in dashed lines in the partially compressed and fully compressed states. A comparison of FIGS. 38A and 38B illustrates that partial compression of the shock 320 causes the rocker link 319 to pivot in a clockwise direction around fixed pivot axle 384. The pivot axis 386 located at the top end of the link 319, and the pivot axis 381 located along the length of the link 319 are configured to move along substantially parallel arcuate paths defined by the rotation of the link 319 around the fixed pivot axis 384. The rear end of the shock 320 and the top end of the rear triangle 314, which are coupled to the rocker link 319 via axles 381 and 386 are also configured to move along the arcuate paths defined by the pivot axes 381, 386. At the same time, the sliding body 388 is configured to travel in an upward and rearward direction, such that the pivot axis 385 defined between the sliding body 388 and the rear frame 314 travels along the linear path defined by the rails 345.

Figure 30:
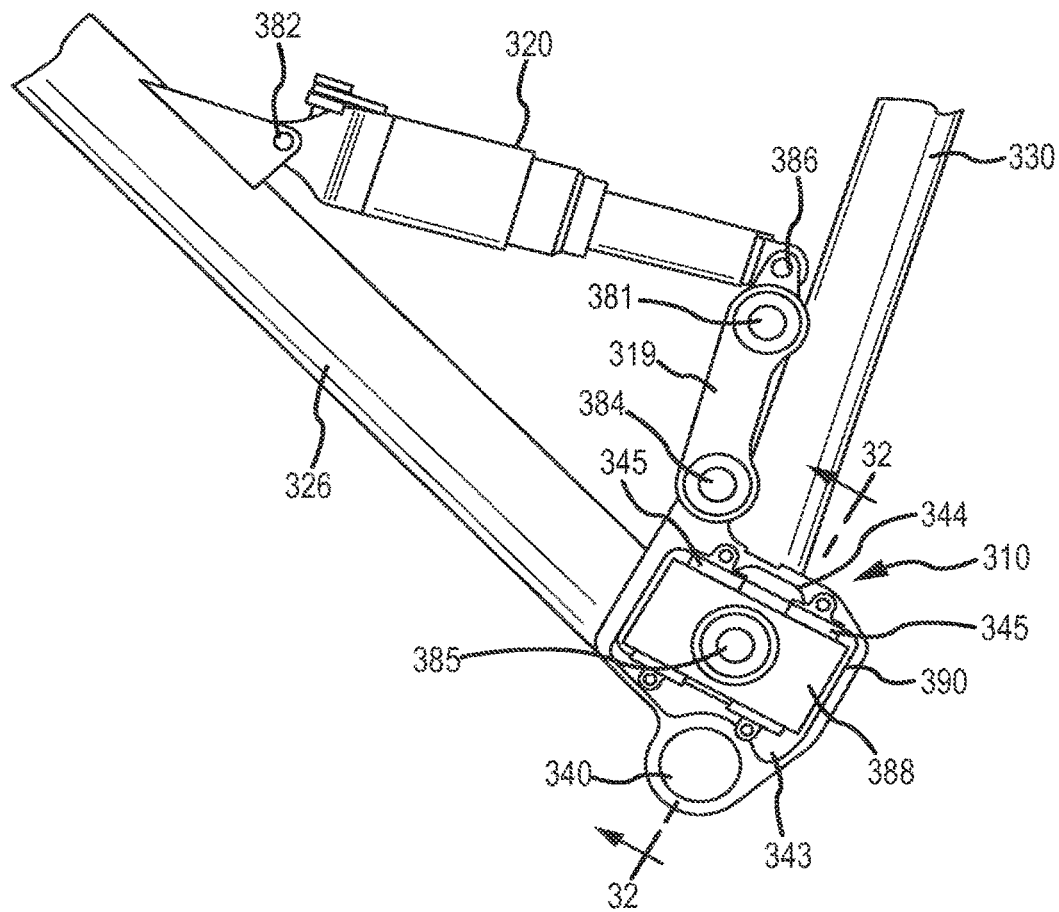
FIG. 30 illustrates a left side view of the front frame and rear suspension system shown in FIG. 26, with the rear frame removed.
Figure 31:
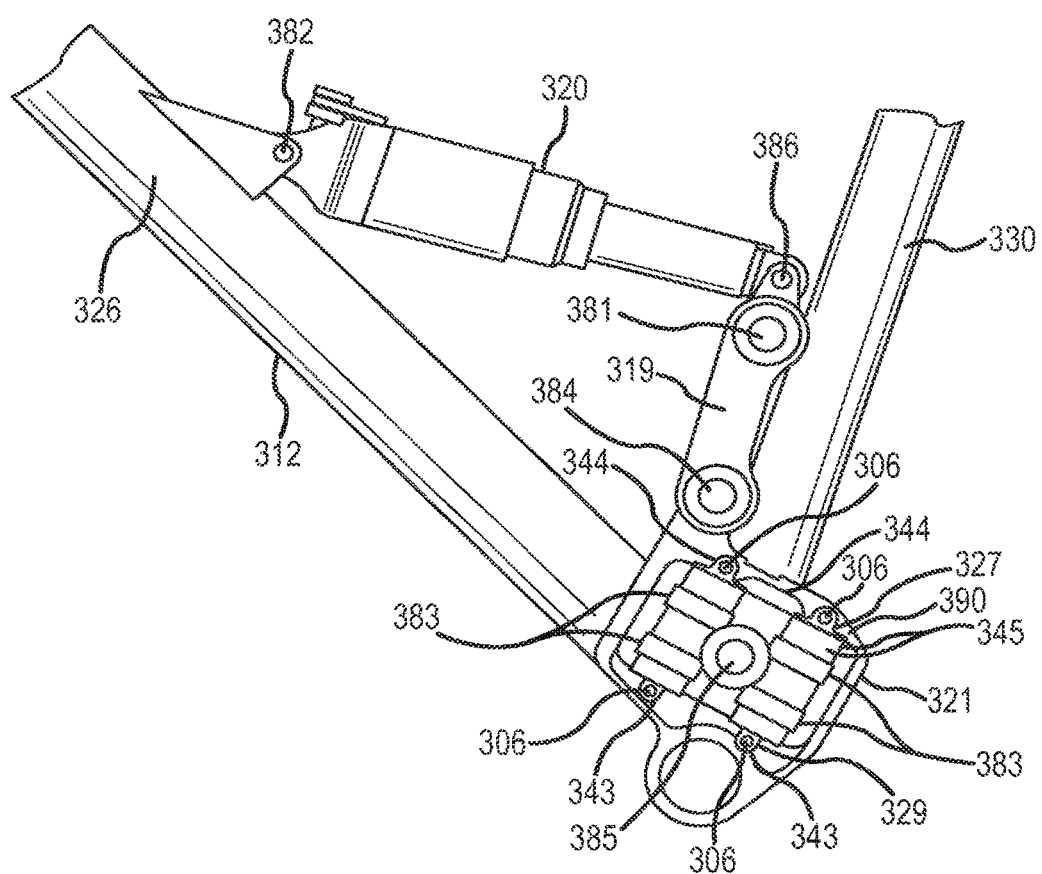
FIG. 31 illustrates a left side view of the front frame and rear suspension system shown in FIG. 26, with the rear frame and sliding body housing removed.
Figure 32:
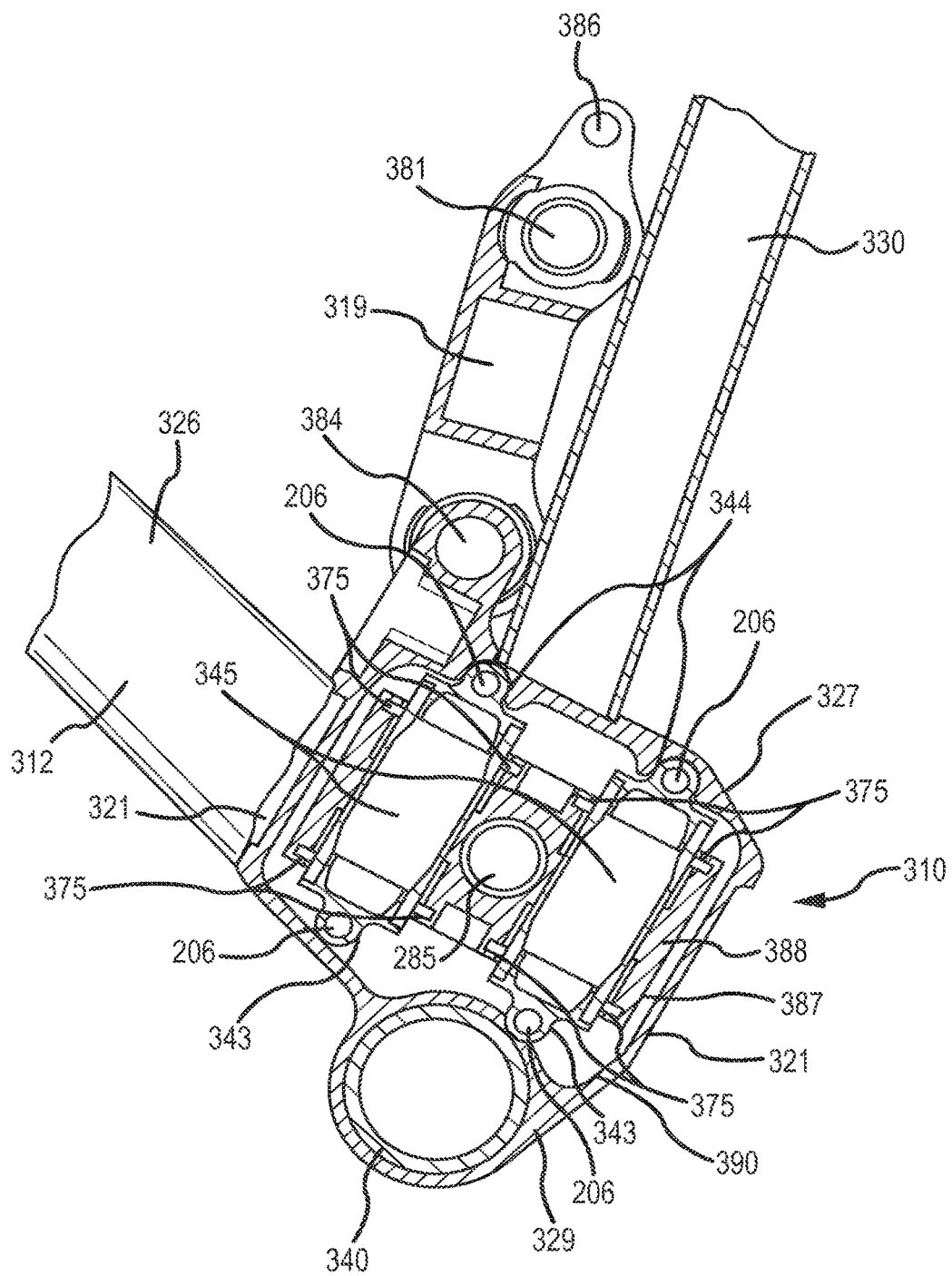
FIG. 32 illustrates a cross-sectional view of the front frame and rear suspension system shown in FIG. 26, with the rear frame removed, as taken along like 32-32 of FIG. 30.
Figure 33:
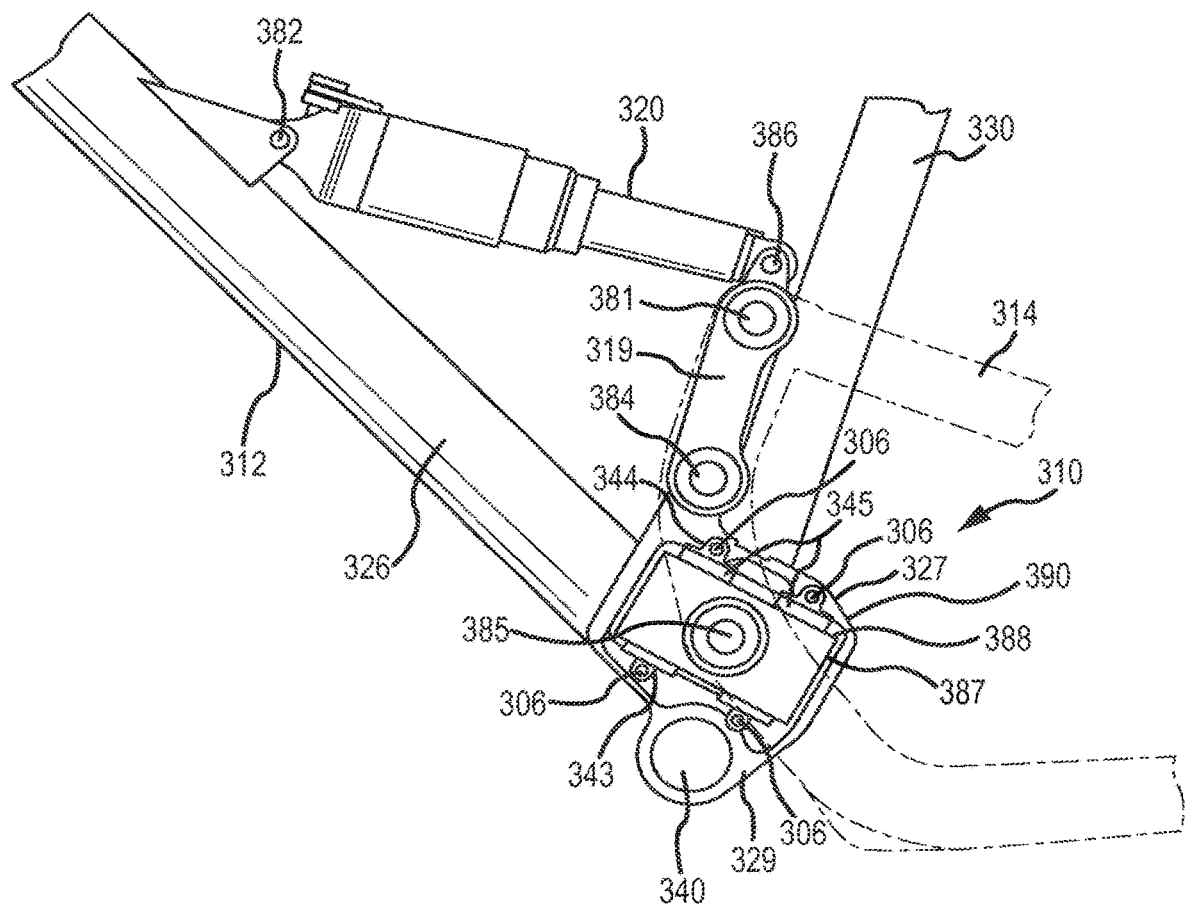
FIG. 33 illustrates a left side view of the front frame and rear suspension system shown in FIG. 26, with the rear frame shown in dashed lines.

A comparison of FIGS. 38B and 38C illustrates that further compression of the shock 320 due to impaction forces on the bicycle causes the rocker link 319 to rotate further in a clockwise direction around the fixed pivot axis 384, such that the shock 320 is also rotated in a counterclockwise direction around fixed pivot axis 382 (shown in, e.g., FIG. 30). Additionally, the sliding body 388 is configured to switch directions, such that the pivot axis 385 defined between the sliding body 388 and the rear frame 314 travels downwardly and forwardly along the linear path defined by the rails 345.

FIG. 38D illustrates a magnified view of the second pivot axle 385, which defines the pivot axis of the rear frame 314 around the sliding body 388. As discussed above, the sliding body 388 may be configured to travel in both upwards and downwards directions along the substantially linear path defined by the rails 345 (in this example) as the shock 320 transforms between the uncompressed and fully compressed states. In other words, the sliding body 388 and the attached portion of the rear frame 314 are configured to move both upwardly and downwardly along the substantially linear path as the rear wheel travels along the full wheel path during one of compression or extension of the shock 320. The back and forth motion of the sliding body 388 and rear frame 314 are best shown in FIGS. FIGS. 38A-38C. In FIG. 38D, the position of the second pivot axle 385 and sliding body 388 as the shock is being compressed is represented by numerals 378(1), 378(2), 378(3). Prior to compression of the shock, the second pivot axle 285 is located at a first position 378(1) along the guide rails 345. As the rear wheel moves upwardly along the wheel path, the sliding body 388 initially moves upwardly and rearwardly along the linear path defined by the rails 345. At the same time, the top end of the rear frame 314 travels forwardly along the arcuate path defined by the link 319. Once the sliding body 388 reaches a transition position 378(2) (or particular location), such as, in one non-limiting example, the point at which point the body 388 switches directions along the rails 345, it may begin to travel in the opposite direction (in this case, downwardly and forwardly) along the linear path defined by the rails 345. It should be noted that the transition position 378(2), or the point at which the sliding body 388 switches directions and re-traces its path in the opposite direction, is created by the structural and dimensional configuration of the components of the rear suspension system, and may be designed to occur at a desired or select position along the reciprocating motion of the sliding body along the rail to obtain the resulting suspension performance. In other words, the sliding body 388, which initially moves in an upward and rearward direction, and continues to be subjected to forces in the upward direction, but is pulled downwardly by the compression of the shock to a third position 378(3), which is the position 378(3) of the second axle 385 when the shock is fully compressed.

The description above with respect to FIGS. 38A-38D is also applicable to the example shown in FIGS. 24-37, which embodies generally the same linkages, axles, and connection points between the rear 214 and front 212 frames.

Figure 39B:
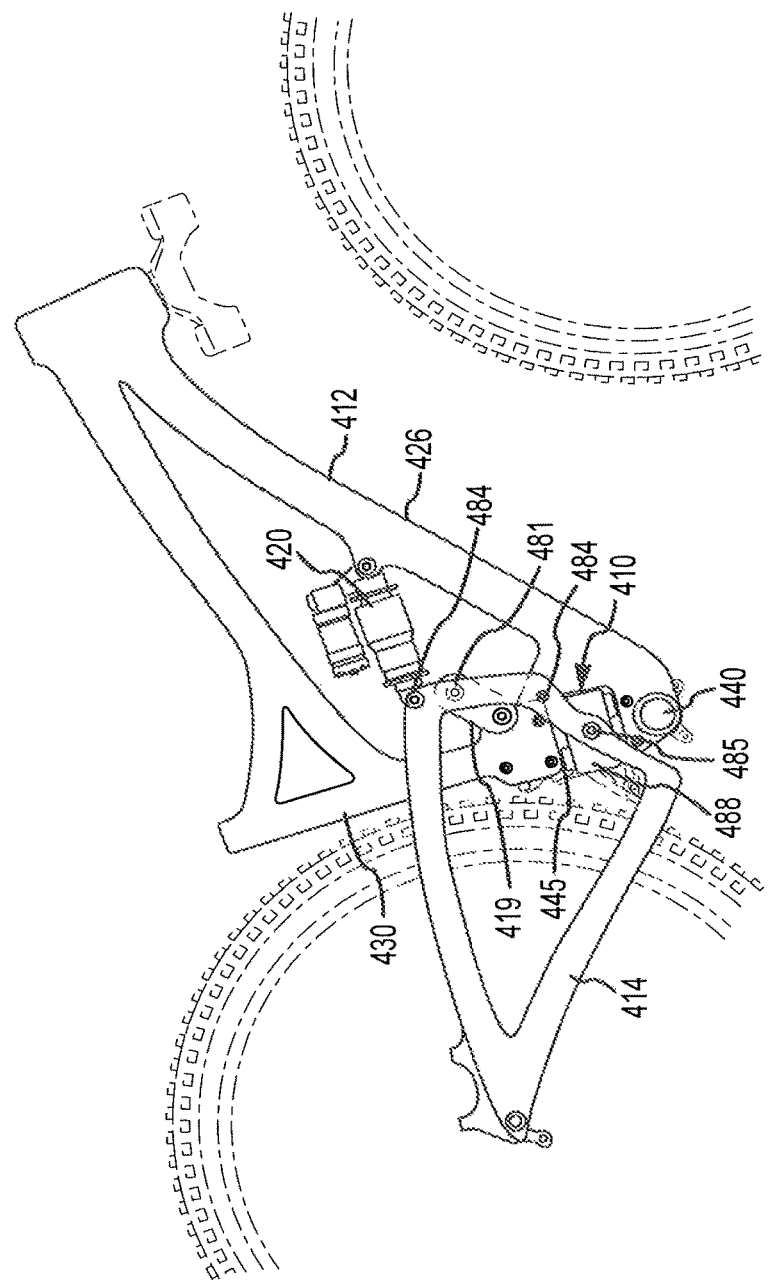
FIG. 39B illustrates a right side view of another example of a front frame and rear suspension system, when fully compressed

While the examples shown in FIGS. 1-11, 11-23 and 26-38 all include a rocker link (119, 219, 319) that is coupled to the rear frame (114, 214, 314) and to the shock assembly (120, 220, 320), other examples may include a system in which the rocker link is not directly coupled to the shock assembly, but is instead is only coupled at one end to the front frame at a fixed pivot axis and to the rear frame at the other end. One such embodiment is shown in FIGS. 39A-39B, which illustrate a system in which the rocker link 419 is pivotally coupled to the front frame 412 via fixed axle 484, located at the bottom end portion of the link 419, and to the rear frame 414 via axle 481, located at the top end portion of the link 419. In such embodiments, the rear end portion of the shock 420 may not be directly connected to the rocker link 419, but may instead be only coupled to the rear frame 414. In such examples, travel paths of the pivot axle 484 connecting the shock 420 and rear frame 414 and the pivot axle 481 connecting the rocker link 419 and the rear frame 414 may be different from the prior-described examples, since the path of the axle 484 connecting the shock 420 and the rear frame 414 is no longer confined by the link 419. This is apparent in comparing FIG. 39A, in which the shock 420 is fully extended, with FIG. 39B, in which the shock 420 is fully compressed.

Also notable in the example shown in FIGS. 39A-39B is the lack of a mount, which in prior examples was used to couple the sliding body 488 to the front frame 412. As shown in the example shown in FIGS. 39A-39B, the rails 445 of the sliding body assembly 410 may be directly coupled to the front frame 412, rather than to a mount that is, in turn, coupled to the front frame 412. In this example, the down-tube 426 forms a mounting block which surrounds the top, bottom, and forward-facing sides of the sliding body 288. The mounting block forms a solid piece that connects the down tube 426 and the seat tube 430, with a cut-out portion configured to receive the sliding body 488 and rails 445. Other examples of front frames 526, 626 which may be coupled to the sliding body 288 are shown in FIGS. 40 and 41. In these examples, a connecting tube 525, 625 extends between the seat tube 530 and the down tube 526. The connecting tube 625 may be substantially linear, as shown in FIG. 41, or may be bent or curved, as shown in FIG. 40. The examples shown in FIGS. 40 and 41 may, in some cases, be formed by welding (or otherwise joining) multiple pre-formed hollow tubes together to form the front frames 512, 612. In contrast, the front frame 412 shown in FIGS. 39A and 39B may be formed by welding (or otherwise joining) multiple pre-formed hollow tubes together, along with one or more sheets of material over the tubes in order to form the solid mounting block portion.

FIG. 42 illustrates another example 702 of a rear frame, front frame, and rear suspension system. Similar to the example shown in FIGS. 11-23, this example 702 may include a first sliding body 788 that is configured to engage a first rail 713. However, this example 702 may further include a second sliding body 789 that is configured to engage a second rail 712 that is positioned above the first rail 713, such that the first sliding body 788 is positioned above the second sliding body 789. In contrast to other examples, in which the rear frame is pivotally coupled to a rocker link and to a sliding body, the rear frame 714 in this example is pivotally coupled to two sliding bodies, with each sliding body 788, 789 being configured to engage a corresponding rail 713, 712. The second (upper) sliding body 789 may further be pivotally coupled to the rear end of the shock assembly 720, such that when the shock 720 is compressed, the second sliding body 788 travels forwardly along the second (upper) rail 712. This may, in turn, cause the first sliding body 788 to move rearwardly along the lower guide rail 713. As the shock is further compressed, the second sliding body 789 may move further in a forward direction along the upper rail 712. At the same time, the first (lower) sliding body 788 may switch directions, such that it travels forwardly along the first guide rail 713. Similarly, extension of the shock assembly 720 may cause the upper sliding body 789 to travel rearwardly along the second upper rail 712, while the lower sliding body 788 travels rearwardly and then forwardly along the first lower guide rail 713 during a single compression of the shock 720. In other examples, the lower and upper guide rails 713, 712 and sliding bodies 788, 789 may be otherwise configured and positioned so as to result in other wheel paths. Further, while the illustrated rails are substantially linear, other examples may include rails which are curved, bent, or otherwise configured. The rails may be parallel to one another, or may extend at different angles relative to one another. Additionally, in other embodiments, the rails 713, 712 may extend at different angles than shown. For example, the lower guide rail 713 may extend downwardly in a forward direction or upwardly in a forward direction, and the upper guide rail 712 may extend downwardly in a forward direction or upwardly in a forward direction.

It will be appreciated from the above noted description of the various arrangements and examples of the present disclosure that a rear suspension system for a bicycle has been described which includes a first link assembly and a sliding body assembly. The rear suspension system can be formed in various ways and operated in various manners depending upon a user's desired rear wheel path and leverage ratio curve. It will be appreciated that the features described in connection with each arrangement and example of the disclosure are interchangeable to some degree so that many variations beyond those specifically described are possible. It should also be understood that the above-described component parts of the rear suspension need not be connected with the bicycle in the manners described and depicted above, and as such, can be connected with the frame and with each other in various additional locations. It should also be understood that the physical shapes and relative lengths of the rear suspension components are not limited to that which has been depicted and described herein.

Although various representative examples of this disclosure have been described above with a certain degree of particularity, those skilled in the art could make numerous alterations to the disclosed examples without departing from the spirit or scope of the inventive subject matter set forth in the specification and claims. All directional references (e.g., upper, lower, upward, downward, left, right, leftward, rightward, top, bottom, above, below, vertical, horizontal, clockwise, and counterclockwise) are only used for identification purposes to aid the reader's understanding of the examples of the present disclosure, and do not create limitations, particularly as to the position, orientation, or use of the invention unless specifically set forth in the claims. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other.

In some instances, components are described with reference to "ends" having a particular characteristic and/or being connected with another part. However, those skilled in the art will recognize that the present invention is not limited to components which terminate immediately beyond their points of connection with other parts. Thus, the term "end" should be interpreted broadly, in a manner that includes areas adjacent, rearward, forward of, or otherwise near the terminus of a particular element, link, component, part, member or the like. In methodologies directly or indirectly set forth herein, various steps and operations are described in one possible order of operation, but those skilled in the art will recognize that steps and operations may be rearranged, replaced, or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

The foregoing has been generally described with respect to particular examples and methods of manufacture. It will be apparent to those of ordinary skill in the art that certain modifications may be made without departing from the spirit or scope of this disclosure. For example, a fiber other than carbon may be used as a strengthening or stiffening element. As one example, certain metals may be used instead, or another type of plastic may be used. Accordingly, the proper scope of this disclosure is set forth in the following claims.

What is claimed is:

1. A suspension system for a two-wheeled vehicle comprising:
   a front frame;
   a rear frame operably coupled to the front frame by a sliding body assembly including:
      a mount operably coupled to the rear frame and the front frame via first axle,
      a pair of rails operably coupled to the mount,
      a sliding body configured to slidably engage the pair of rails and including a second axle pivotally coupled to the rear frame, wherein the second axle is disposed below the first axle and between the pair of rails.

2. The suspension system of claim 1, wherein the sliding body travels in a first direction along a substantially linear travel path and in a second direction opposite the first direction along the substantially linear travel path as the suspension system moves from an at least partially extended state to an at least partially compressed state.

3. A suspension system for a two-wheeled vehicle comprising:
   a front frame;
   a rear frame operably coupled to the front frame by a sliding body assembly including:
      a mount operably coupled to the rear frame and the front frame via first axle,
      a pair of rails operably coupled to the mount,
      a sliding body configured to slidably engage the pair of rails and including a second axle pivotally coupled to the rear frame, wherein each of the rails includes a top attachment portion and a bottom attachment portion configured to attach the rails to the mount.

4. The suspension system of claim 3, wherein the top attachment portion is a top crown that couples the rails together at a first end, and the bottom attachment portion is a bottom crown portion that couples the rails together at a second end opposite the first end.

5. The suspension system of claim 3, wherein the top attachment portion includes an aperture configured to couple the respective rail to the mount at a first end, and the bottom attachment portion includes an aperture configured to couple the respective rail to the mount at a second end opposite the first end.

6. A suspension system for a two-wheeled vehicle comprising:
   a front frame;
   a rear frame operably coupled to the front frame by a sliding body assembly including:
      a mount operably coupled to the rear frame and the front frame via first axle,
      a pair of rails operably coupled to the mount,
      a sliding body configured to slidably engage the pair of rails and including a second axle pivotally coupled to the rear frame, and
      an upper bushing and a lower bushing slidably coupled each of the rails, wherein the lower bushing is spaced apart from and positioned below the upper bushing along a length of the respective rail to facilitate sliding of the sliding body along the rails.

7. A suspension system for a two-wheeled vehicle comprising:
   a front frame;
   a rear frame operably coupled to the front frame by a sliding body assembly including:
      a mount operably coupled to the rear frame and the front frame via first axle,
      a pair of rails operably coupled to the mount,
      a sliding body configured to slidably engage the pair of rails and including a second axle pivotally coupled to the rear frame; and
   a rocker link, wherein the mount is pivotally coupled to a first end of the rocker link by the first axle.

8. The suspension system of the claim 7, wherein the rocker link is pivotally coupled to the rear frame by a third axle between the first end of the rocker link and a second end of the rocker link opposite the first end.

9. The suspension system of claim 8, wherein the second end of the rocker link is pivotally coupled to a rear end of a shock assembly by a fourth axle, wherein the front end of the shock assembly is pivotally coupled to the front frame, and the shock assembly resists motion between the front frame and the rear frame.

10. The suspension system of claim 9, wherein as the rear frame moves relative to the front frame, the shock assembly moves from an at least partially extended state to an at least partially compressed state, wherein the partial compression of the shock assembly causes the rocker link to pivot in a first direction around the first axle.

11. The suspension system of claim 10, wherein as the rocker link pivots in the first direction around the first axle, the sliding body moves in a first direction along a substantially linear travel path.

12. The suspension system of claim 11, wherein the third axle and the fourth axle to move along respective arcuate paths defined by the pivoting of the rocker link around the first axle.

13. The suspension system of claim 12, wherein the rear end of the shock assembly and a portion of the rear frame pivotally coupled to the rear frame by the third axle move in a first direction along the respective arcuate paths defined by the respective third and fourth axles.

14. The suspension system of claim 13, wherein as the shock assembly moves further from the least partially extended state to an at least partially compressed state, the rocker link to rotates further in the first direction around the first axle, such that the shock assembly rotates along the arcuate path of the fourth axle in a second direction opposite the first direction.

15. The suspension system of claim 14, wherein as the shock assembly rotates along the arcuate path of the fourth axle in the second direction, the sliding body travels in a second direction opposite the first direction along the substantially linear travel path.

16. The suspension system of claim 15, wherein the first direction of the sliding body is a downward and forward direction.

17. The suspension system of claim 16, wherein the second direction of the sliding body is an upward and rearward direction.

18. The suspension system of claim 11, wherein the substantially linear travel path is defined by the pair of rails.

19. A suspension system for a two-wheeled vehicle comprising:
   a front frame;
   a rear frame operably coupled to the front frame by a sliding body assembly including:
      a mount operably coupled to the rear frame and the front frame via first axle,
      a pair of rails operably coupled to the mount,
      a sliding body configured to slidably engage the pair of rails and including a second axle pivotally coupled to the rear frame, wherein the rear frame includes a rear wheel axis, and an instantaneous center of curvature (ICC) with respect to the rear wheel axis moves rearward as the suspension system begins to be compressed.

20. A suspension system for a two-wheeled vehicle comprising:
   a front frame;
   a rear frame operably coupled to the front frame by a sliding body assembly including:
      a mount operably coupled to the rear frame and the front frame via first axle,
      a pair of rails operably coupled to the mount,
      a sliding body configured to slidably engage the pair of rails and including a second axle pivotally coupled to the rear frame, wherein the sliding engagement of the sliding body with the pair of rails has a vertical component and a horizontal component, wherein the vertical component is greater than the horizontal component.

21. A suspension system for a two-wheeled vehicle comprising:
   a front frame;
   a rear frame operably coupled to the front frame by a sliding body assembly including:
      a mount operably coupled to the rear frame and the front frame via first axle,
      a pair of rails operably coupled to the mount,
      a sliding body configured to slidably engage the pair of rails and including a second axle pivotally coupled to the rear frame, wherein the mount defines a body that surrounds the sliding body and the pair of rails.

22. The suspension system of claim 21, wherein the sliding body assembly comprises a modular unit received in the front frame.

23. The suspension system of claim 21, wherein the sliding body assembly is removably coupleable to the front frame.

* * * * *